(12) United States Patent
Farb

(10) Patent No.: US 8,143,736 B2
(45) Date of Patent: *Mar. 27, 2012

(54) CONVERSION OF OCEAN WAVE ENERGY INTO ELECTRICAL POWER

(76) Inventor: Daniel Farb, Beit Shemesh (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/997,906

(22) PCT Filed: Jan. 2, 2007

(86) PCT No.: PCT/IL2007/000003
§ 371 (c)(1),
(2), (4) Date: Feb. 5, 2008

(87) PCT Pub. No.: WO2007/077555
PCT Pub. Date: Jul. 12, 2007

(65) Prior Publication Data
US 2009/0243293 A1    Oct. 1, 2009

Related U.S. Application Data

(60) Provisional application No. 60/755,846, filed on Jan. 4, 2006, provisional application No. 60/805,875, filed on Jun. 27, 2006, provisional application No. 60/823,256, filed on Aug. 23, 2006, provisional application No. 60/864,792, filed on Nov. 8, 2006.

(51) Int. Cl.
*F03B 13/12* (2006.01)

(52) U.S. Cl. .......................................... 290/53; 290/42

(58) Field of Classification Search ................ 290/42, 290/43, 53, 54; 417/330, 331; 415/3.1
See application file for complete search history.

(56) References Cited

U.S. PATENT DOCUMENTS

| | | | | |
|---|---|---|---|---|
| 3,746,875 A * | 7/1973 | Donatelli | | 290/42 |
| 4,179,886 A * | 12/1979 | Tsubota | | 60/398 |
| 4,208,875 A * | 6/1980 | Tsubota | | 60/495 |
| 4,301,377 A * | 11/1981 | Rydz | | 290/43 |
| 4,389,843 A * | 6/1983 | Lamberti | | 60/507 |
| 4,408,455 A * | 10/1983 | Montgomery | | 60/505 |
| 4,843,249 A * | 6/1989 | Bussiere | | 290/53 |
| 5,311,064 A * | 5/1994 | Kumbatovic | | 290/53 |
| 5,789,826 A * | 8/1998 | Kumbatovic | | 290/53 |
| 6,551,053 B1 * | 4/2003 | Schuetz | | 415/3.1 |
| 6,849,963 B2 * | 2/2005 | Grinsted et al. | | 290/42 |
| 7,525,214 B2 * | 4/2009 | Atilano Medina et al. | | 290/53 |
| 7,602,076 B1 * | 10/2009 | Sipp | | 290/54 |
| 7,656,051 B2 * | 2/2010 | Perin | | 290/43 |
| 7,768,143 B2 * | 8/2010 | McCague et al. | | 290/42 |

* cited by examiner

Primary Examiner — Nicholas Ponomarenko
(74) Attorney, Agent, or Firm — Mark M. Friedman

(57) ABSTRACT

Devices and methods for capturing electrical energy from ocean and other waves at improved cost and efficiency are presented. The major innovations include capturing energy in two vectors simultaneously and connectedly, new applications of Bernoulli's principle, and an application of the breaker effect. The invention presents devices using related principles for use in surface and subsurface waves, and the placing of the devices in the water and wave farms. The full system of wave capture includes many connected parts and power generators.

16 Claims, 65 Drawing Sheets

Relationship between speed, length, and period of waves in deep water based on the theoretical relationship of period and length

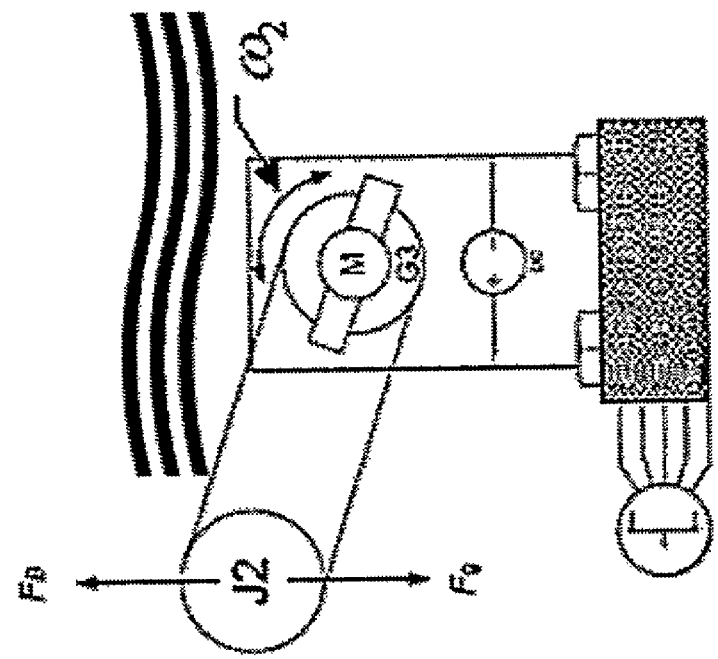
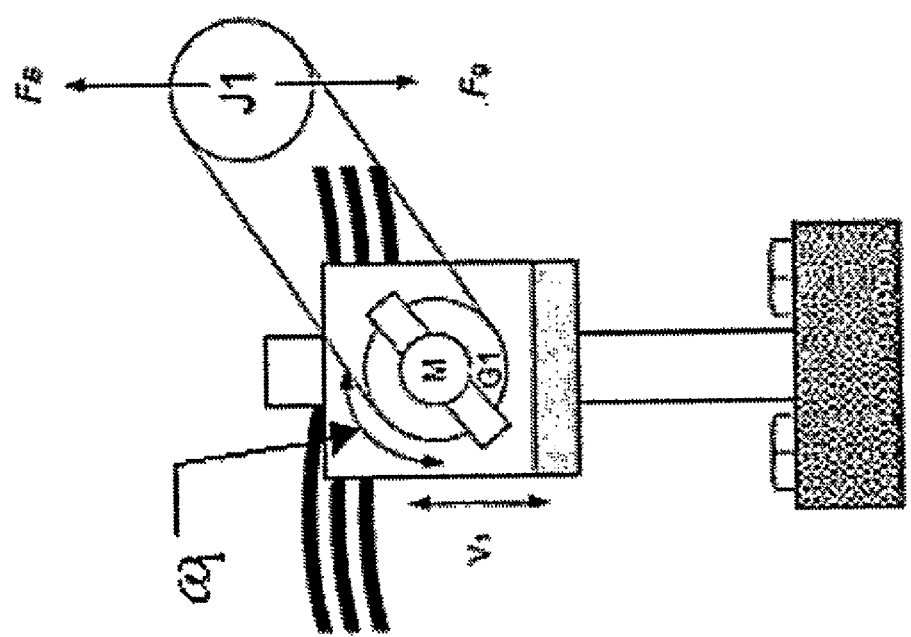
Figure 17

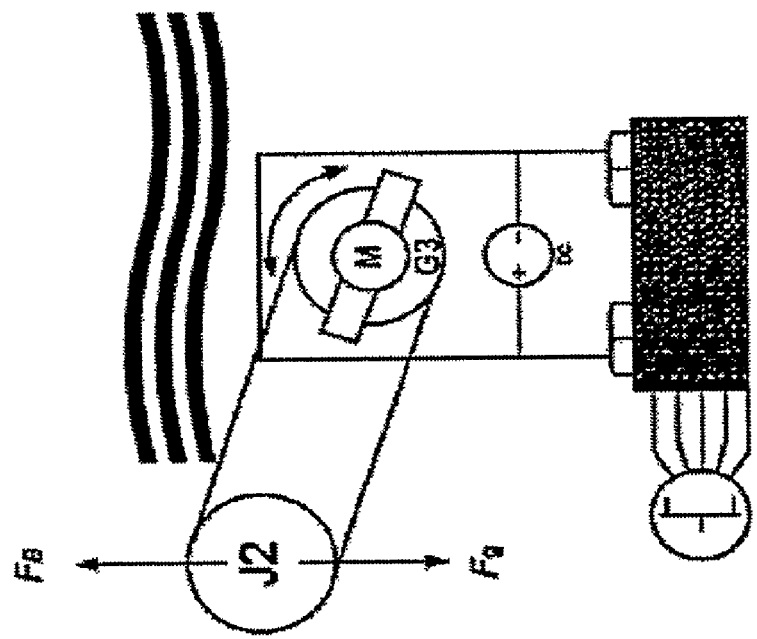
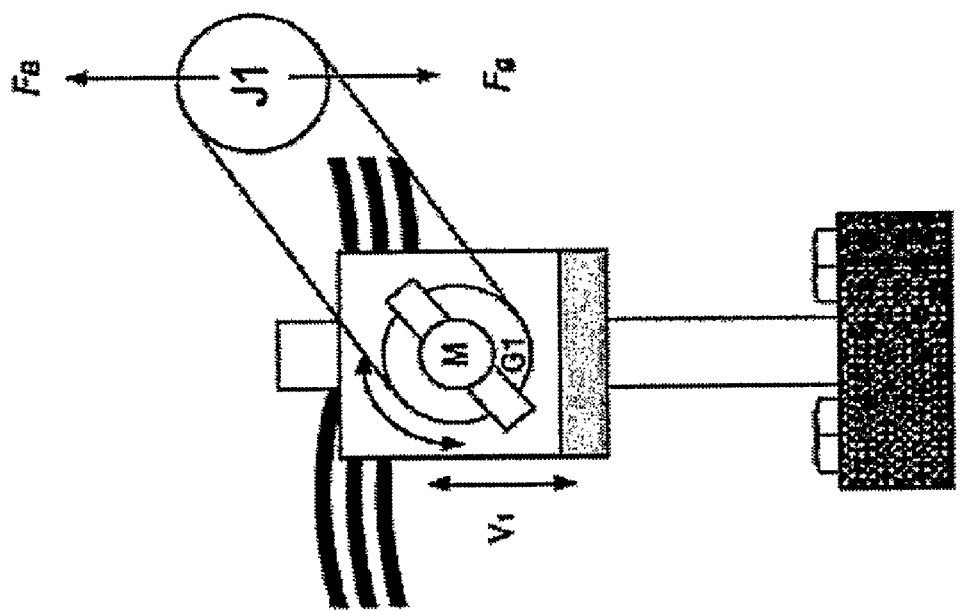
Figure 18

The flow around the wing causes higher speed on the top side and higher pressure at the bottom side.

Figure 25  Energy losses from a hydro

Flow direction

Figure 36 Rotating paddles and gravity

Figure 38 Water Orbits in Waves
http://www4.ncsu.edu/eos/users/c/ccknowlc/public/chapter10/part1.html Figure 39 Shallow Area Addition Figure 40 Turbine Just Below Surface Figure 45 Unipile Wave Farm with Undertow Capture Figure 46 Unipile Wave Farm with End Drop Buoys with Flow Deflection Buoys not fixed horizontally Ice barrier

US 8,143,736 B2

CONVERSION OF OCEAN WAVE ENERGY INTO ELECTRICAL POWER

FIELD AND BACKGROUND OF THE INVENTION

The present invention relates to solutions for capturing energy from fluid flow and, more particularly, to systems for turning wave and fluid energy into electrical energy. The main focus of the invention is on wave energy from oceans, rivers, lakes, and dams, but the principles are meant to apply to other liquids and gases and the invention has other applications. The present invention covers the numerous parts that make this invention work, and some variations of the devices, but in all cases the invention deals with the problem of obtaining electricity from waves in a better manner than what is currently available.

Sources of renewable energy have been widely sought after, but each one has its own problems. Recently, interest has increased in the possibility of obtaining electrical energy from ocean waves. Current art machines have at least one of the following defects: they are large, expensive, hard to construct, waste thermodynamic energy through crashing of waves, do not make full use of both the horizontal and vertical vectors of wave movements, and do not exploit principles of fluid motion such as the Bernoulli and Navier Stokes principles (increased flow speed and lift superior to a wing and improved flow from adjacent structures) and Green's Law (that a shallower bottom increases the amplitude of the wave) to make the energy in waves easier to capture.

The present invention describes several devices and methods of obtaining energy from wave flows and improving the efficiency of existing devices at the same time. (The current patent uses terms such as water, liquid, and fluid interchangeably, since the major embodiment of the patent is envisioned to be water, but in other embodiments the current patent can apply to other fluids and gases.) The present invention also applies Green's law of the amplitude of waves (that amplitude increases by h to the negative ¼, where h is the water depth) by confining the vertical space near a rotational device to make wave energy easier to capture by increasing the wave amplitude. Innovations of the present invention include devices and methods to maximize the utilization of wave energy in both horizontal and vertical vectors simultaneously. Very simply, the present invention makes the energy easier to capture, and then captures it.

No equivalent or near-equivalent system for wave energy capture has been found in the current art.

There is thus a widely recognized need for, and it would be highly advantageous to have, a more efficient and cheaper method of obtaining energy from fluid motion.

BRIEF DESCRIPTION OF THE DRAWINGS

The invention is herein described, by way of example only, with reference to the accompanying drawings, wherein:

FIG. 17 is a diagram of vertical motion energy.

FIG. 18 is a diagram of forces.

DESCRIPTION OF THE DRAWINGS

Figure 1:
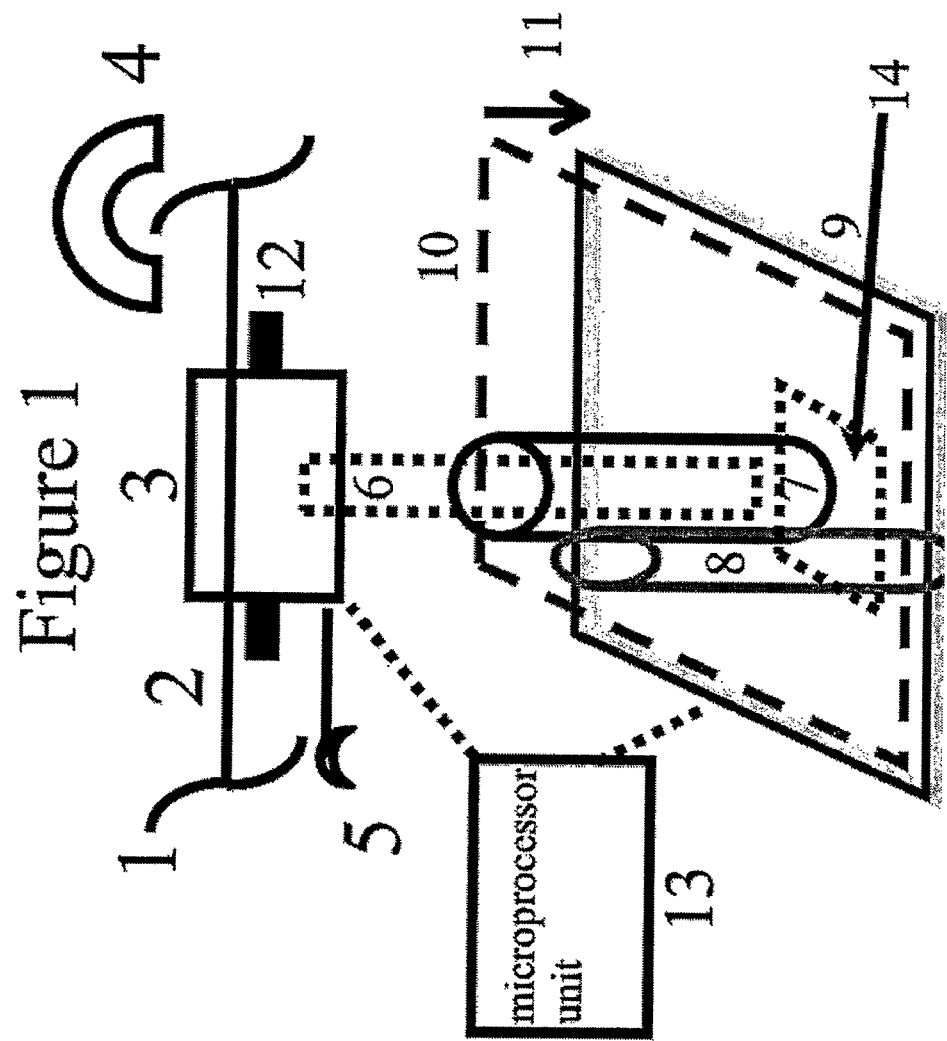
FIG. 1 is a figurative outline of the major components of a wave energy capture system.

The present invention is of a series of devices and methods that can be used to capture wave energy.

By convention here and for the convenience of the reader's understanding, the term "horizontal" refers to an x-axis or a first axis (and the terms are used interchangeably) and "vertical" to a y-axis or a second axis in any orientation (and the terms are used interchangeably). Z-axis refers to a third axis. "Inferior" and "superior" may refer to a y-axis orientation without one object necessarily being higher than the other. Most uses of "horizontal" and "vertical" are meant literally, particularly when they refer to a relationship to the earth, surface waves, or ocean floor.

The terms "functionally adjacent" or "contiguous" or "functional congruity" are used to mean that the object is close enough to have an effect on another object. For example, if an airfoil shape is functionally adjacent to a turbine, it is close enough to affect a parameter relevant to that turbine, such as velocity of flow.

A "flow deflection device/structure" can refer to any structure that affects the flow into another object. It can be an airfoil shape, a wing, a ramp, a platform, a ramp with a lower horizontal level, or any other shape or more than one shape in combination. It usually affects the velocity and/or the locations and/or physical dimensions of the flow. The words "platform" or "ramp" may be used to emphasize the flat surface of a flow deflection structure, but is intended to be synonymous with "flow deflection device/structure." "Wing-shaped," "ramp," and "airfoil" are terms that are included in the category of "flow deflection structure."

When the term "unipile" is used in the context of a pile structure distinct from the unipile piston and surface rotational device alone, and the pile allows for several attached devices at different depths, it also refers to what is called a "polypile"—a vertical structure that holds several devices for energy capture.

We use the phrase "on or near the wave surface" to describe the location of the surface wave energy capture machine; it can be mostly on top of the surface, mostly below, or completely below, or beneath the surface and on the surface of underwater waves.

The flow of energy from waves is often referred to here as "horizontal" in one of its components. That is meant to refer to the propagation of the waves in a horizontal direction, in contrast to the vertical flow of energy of an object moving from the wave crest to trough. In fact, the so-called horizontal component of wave energy is mostly made up of circular paths of water molecules. In order to differentiate the vertical aspect of energy capture from crest to trough from the other movements of the wave, we use the terms "horizontal" or "horizontal/rotational" even if the movement of the particles is circular, because the actual capture of that energy is from a straight horizontal line that would produce, for example, torque on a paddle.

The principles and operation of energy conversion devices according to the present invention may be better understood with reference to the drawings and the accompanying descriptions.

FIG. 1 is a figurative outline of the major components of a wave energy capture system as shown in the present invention. It does not show all the inventions in this one picture, and all the components shown do not have to be present at one time. Other variations shown here all have the common theme of obtaining energy from waves in a better fashion, both underwater and on the surface, and of being compatible with important parts of the present invention. For example, since the pile (or vertical structure extending from a surface platform) is an important part of the current invention, inventions to take advantage of subsurface waves from that infrastructure are shown. Another major common theme of the inventions shown here is the emphasis on understanding energy flow in waves and designing inventions that make use of that. There are several variants of the inventions here for the capture of energy from waves, but this one picture will give an overview of the most important ones.

One crucial solution of the invention is the capture of wave energy in both horizontal and vertical directions. That requires, in most embodiments, two generator systems, one for the horizontal and one for the vertical. Parts (1), (2), and (3) are the essential parts of the horizontal system; (1) and (2) represent the energy capture means, shown here as a rod (2) connecting paddle wheels (1), and (3) representing a generator. Any kind of energy capture system is suitable as part of the invention, but paddle wheels are a preferred embodiment. Any kind of generator system connected to the energy capture system is suitable as part of the invention, but the most likely embodiment is that of a permanent magnet rod spinning inside a coil. This patent does not address the types of generators that are available. Other kinds of horizontal energy capture/generator systems may be used; one presented as a variant of the current invention is the use of a paddle wheel connected to a universal joint for milder waves.

The configuration of parts (1), (2), and (3) may also be immediately sub-surface, as shown later.

Elaborations on the horizontal system include a way of minimizing the resistance as the paddles (1) turn. That can be solved by altering their shape, providing a hood (4), or by enabling them to fall into a central cylinder by the force of gravity as they face upwards. (FIGS. 35, 36, 37) Part (12) represents a flotation device. Since the greatest rotational energy is on the outside of each wave, this device helps assure proper weighting of the energy capture/generator system.

The vertical component of energy capture is represented in this picture as a pile (7) fixed in the sea floor; other variants include a vertical system suspended from a buoy or platform. (Here, the term "platform" does not refer to a flow deflection device.) In certain locations, one may work better than the other. In addition, the energy capture structure shown (7) may be attached to a pile (8); that may be particularly useful for deeper water so that other energy capture devices can be placed below the surface system shown here. A variant of the device shown in this figure can also be placed underwater. The crucial action is for part (6) to move up and down as a result of its-attachment to the horizontal system (3) on the surface of the waves. Its piston-like vertical motion can result in the generation of energy; any suitable method may be used. Other vertical variants that are part of the current invention will be shown later.

Figure 51:
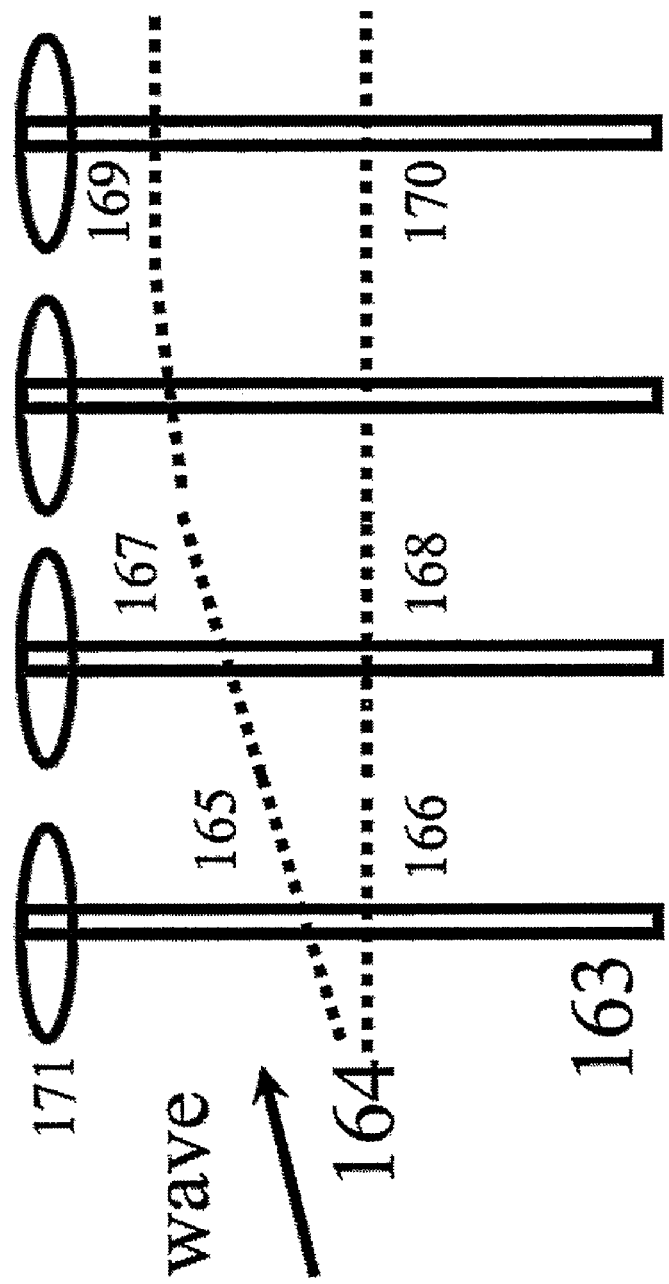
FIG. 51 is a side view of a ramp structure.

The next major advance of the current invention is the application of flow principles to the extraction of energy. Flow deflection devices placed appropriately around the system shown here—and any other energy capture system for waves—make the energy easier to capture. Using principles based on Bernoulli's equation, the Navier-Stokes equation, and Green's Law, this invention presents the use of flow deflection devices in two major ways of using a wing-shaped, airfoil-shaped, or other structure to accelerate the velocity surrounding it. Here that is done on a large scale through the use of large, semi-horizontal platforms (9, 10) that surround the vertical structures and/or are beneath the horizontal energy capture devices. In the case of a single unipile, the edges of two platforms, (9) and (10) are adjacent on one side facing the direction of oncoming wave energy and farther apart on the other, the difference being shown by number (11). This concept works best in a farm of devices where the platforms are placed so that the lower ones are horizontal and the upward ones slope gradually up and level off at the appropriate height (FIG. 51). Part (10) can simultaneously perform the function of a ramp and create an artificial breaker effect that increases the apparent amplitude of the wave. One fault of current art for the capture of wave energy is that the majority of the wave is below the surface and its energy is therefore less available for capture unless a measure is taken to make it available. The artificial breaker effect has to stop before the wave breaks, or else the wave energy is squandered. Therefore, the ideal embodiment of the invention requires movement of the ramp/wing deflection structure via microprocessor control. In summary, these parts function together to increase the ability to capture both horizontal and vertical energy. They can also be used independently with current art to improve the efficiency of current art. Part of the invention is the use of many adjacent "unipiles," which is a name for the group of structures shown here.

The efficiency of energy capture can also be improved by placing a smaller flow deflection device (5) functionally adjacent to the surface energy capture system. As shown in this picture, the local effect of the leading edge increases the velocity according to the Bernoulli and Navier-Stokes equations, and therefore the power output increases. In addition, the use of an airfoil or wing shape decreases the pressure superior to it and adds some extra lift for the benefit of the vertical energy capture system.

An attached microprocessor unit can perform many enhancement functions in addition to the one already mentioned. For example, it can control the orientation of the horizontal energy capture system. It can control the degree of flotation in order to maximize the power captured on the surface, since the paddles ideally should contact the outer portion of the wave. It can control the orientation of the ramps/platforms.

Many groups of just two of these components are novel, as in the following examples: a paddle wheel system combined with part (5), an energy capture system combined with part (5), a paddle wheel system combined with part (10), an energy capture system combined with part (10), the use of parts (9) and (10) together in a wave capture environment, part (5) connected to part (3), part (1) on both sides of part (3) connected by part (2), part (4) covering part (1), part (12) in association with part (3), part (6) in association with part (3), part (6) in association with parts (1) and (3), parts (9) and/or (10) in association with part (7) or part (8), part (13) in association with part (3), part (12), part (7), part (8), part (9), or part (10), part (7) in association with part (8).

Part (14) represents another generating system operating from the back and forth motion of the water particles at the upper surface of the ramp in shallowed sections of water immediately superior to the ramp. It is shown in more detail in FIG. 39.

Figure 2:
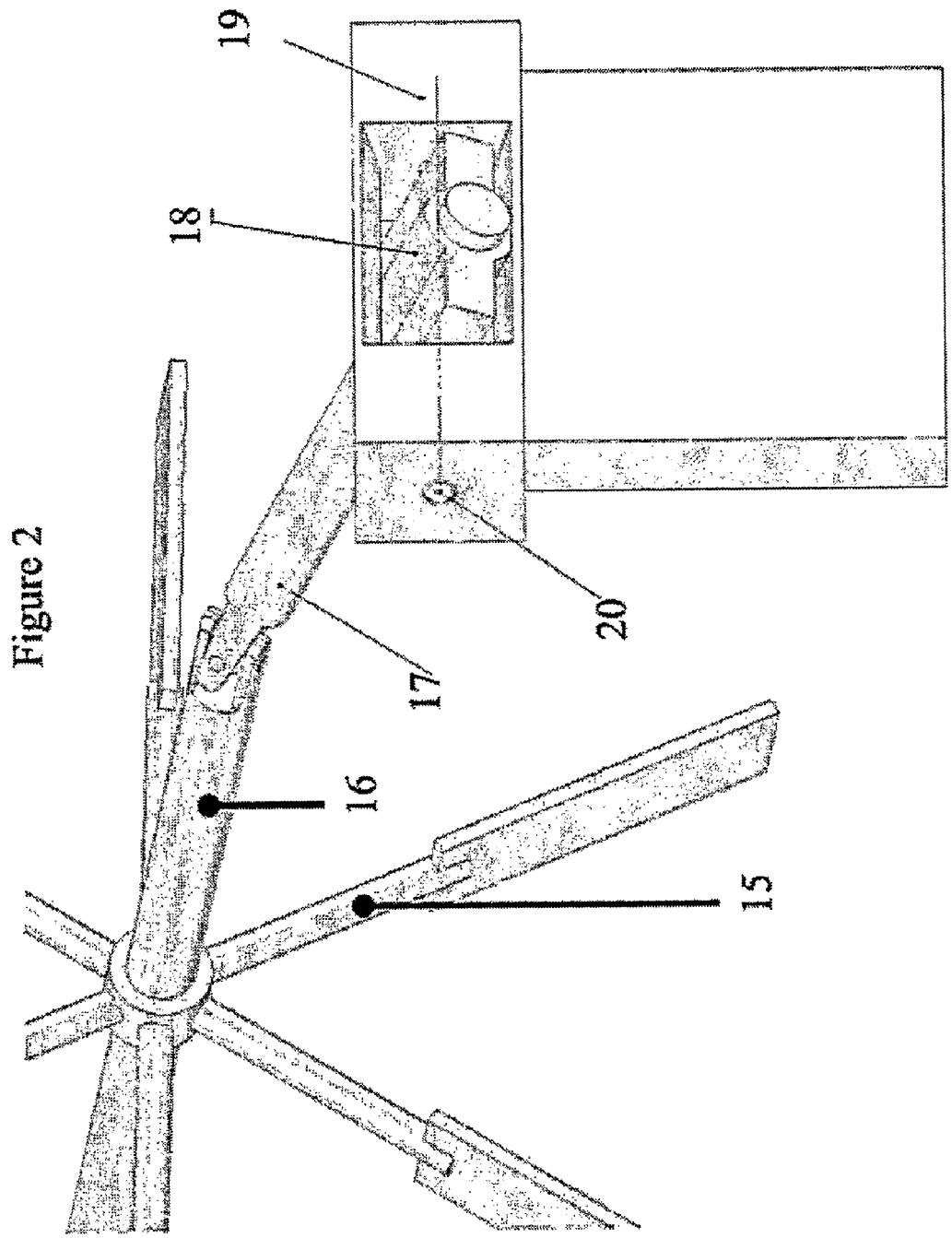
FIG. 2 is a view of a paddlewheel rotational device attached to electrical converters by joints.

FIG. 2 shows another variation of the surface structure for milder waves that uses the same principles. We will describe this, build up to the system of FIG. 1, and then return to FIG. 1 in more detail.

Referring now to the other drawings, FIG. 2 illustrates (15) a paddle wheel with blades that are driven by wave motion. (We will call the system a Vertical Twister Generator or a Universal Joint Generator.) That is illustrative; part (15) can be any rotational or energy conversion device such as a paddle wheel, propeller, or turbine. The main point is that there is ideally a flow that drives the energy conversion device. In the ideal embodiment, it rests on the surface of a liquid. In the paddle wheel configuration shown, the energy conversion device is fixed to the central rod or connecting piece (16). Part (16) ideally moves up and down and rotates with the paddles, but it may also hold another device. Part (16) may also be attached to a flotation device. The central rod (16) attaches it to another rod (17) via an attachment of a universal joint. In this manner, the rotation of the paddle wheel turns rod (17) to generate energy through its rotation at the same time that rod (17) conveys vertical motion to a separate energy conversion generator. In this way, the energy from the vertical and horizontal motion from the wave is captured. Other methods of attachment are possible. The electrical power generation is ideally contained within a housing (19). Part (18) is a rotor-stator that rotates with the rotational device along the axis of (17) and simultaneously rotates on the axis of (20) from vertical motion, ideally of the waves. The movements on axes (17) and (20) connect to electrical generating devices well known in current art. The bars shown could, in one embodiment, be made of aluminum covered by plastic. The joint between parts (16) and (17) enables the rotational device to remain substantially parallel to the surface of the wave motion and benefit fully from the energy of said wave. A part (17) may be attached to the rotational device (parts 15 and 16) on one or both sides. The rotational device (15) may be connected on two sides to housings (19) with similar configurations for the production of electricity. A connection on one side only is also an embodiment, but will likely be more useful for milder water conditions. It does have the advantage of not requiring extra sliding length for rod (17), however, as the waves move up and down.

Figure 3:
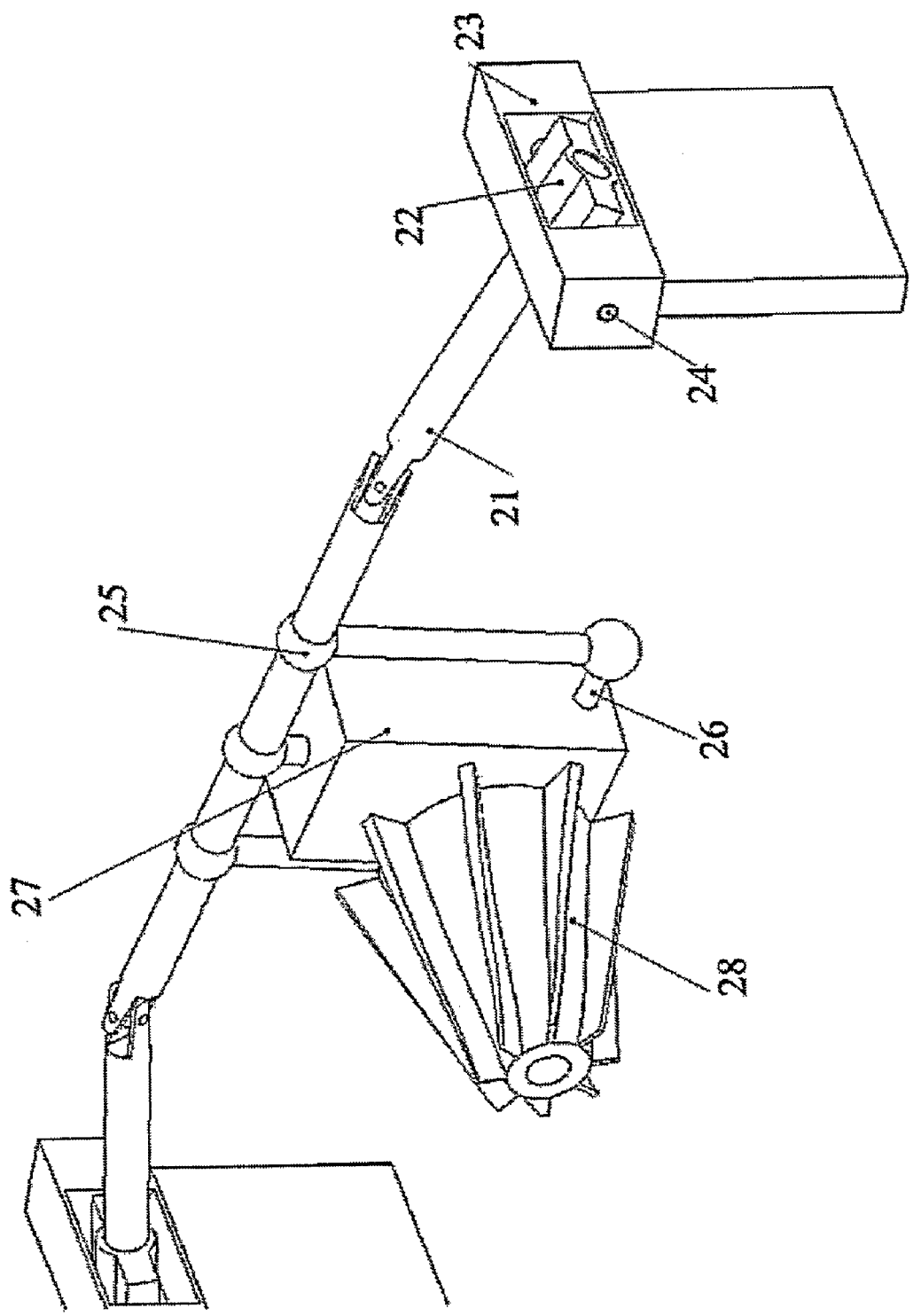
FIG. 3 is a view of a turbine rotational device attached to electrical converters.

FIG. 3 illustrates another device and method of handling the system of FIG. 2. A turbine (28) converts fluid flow, ideally near the surface, from mechanical energy into electrical energy within converter (27). Said turbine may be placed in any orientation to the wave flow and the turbine as shown may be substituted by any energy capture device. Vertical (25) and horizontal (26) bars, in one embodiment, hang the converter in the proper place. The joint of rod (21) enables simultaneous vertical motion. Vertical energy is captured as illustrated earlier through parts (22), (23), and (24). Various components such as bars (25) and (26) may also be attached to flotation devices to maintain the correct height within the water. Correct height here and in other embodiments refers to the best location to obtain maximum energy at optimal cost from the waves. In all the embodiments of the current invention, flotation devices are an option. In the ideal embodiment, a microprocessor-controlled flotation device maintains the devices at a height to maximize their capture of the rotational motion of waves. In one embodiment, instructions are written onto the microprocessor-controlled device to adjust the amount of flotation with variables such as wave amplitude.

Figure 4:
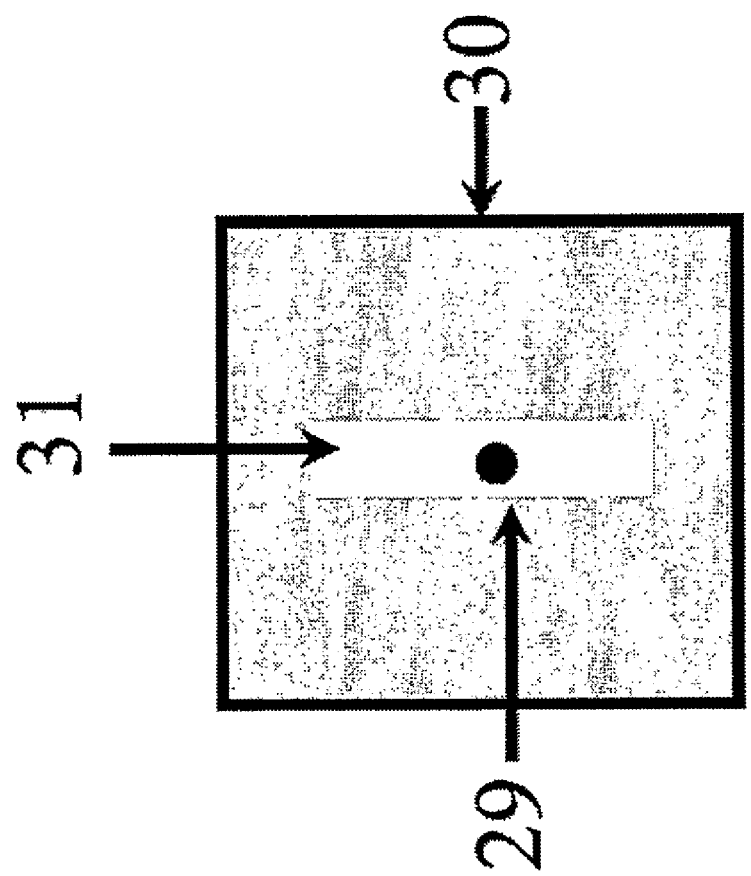
FIG. 4 is a diagram of a guide for a sliding rod.

FIG. 4 is a side view of one embodiment of the housing (30) that allows a rotating rod to move up and down through a looser area (31) that may, in one embodiment, consist of a material that apposes the surface of (29) and enables vertical motion without letting in fluid.

Figure 5:
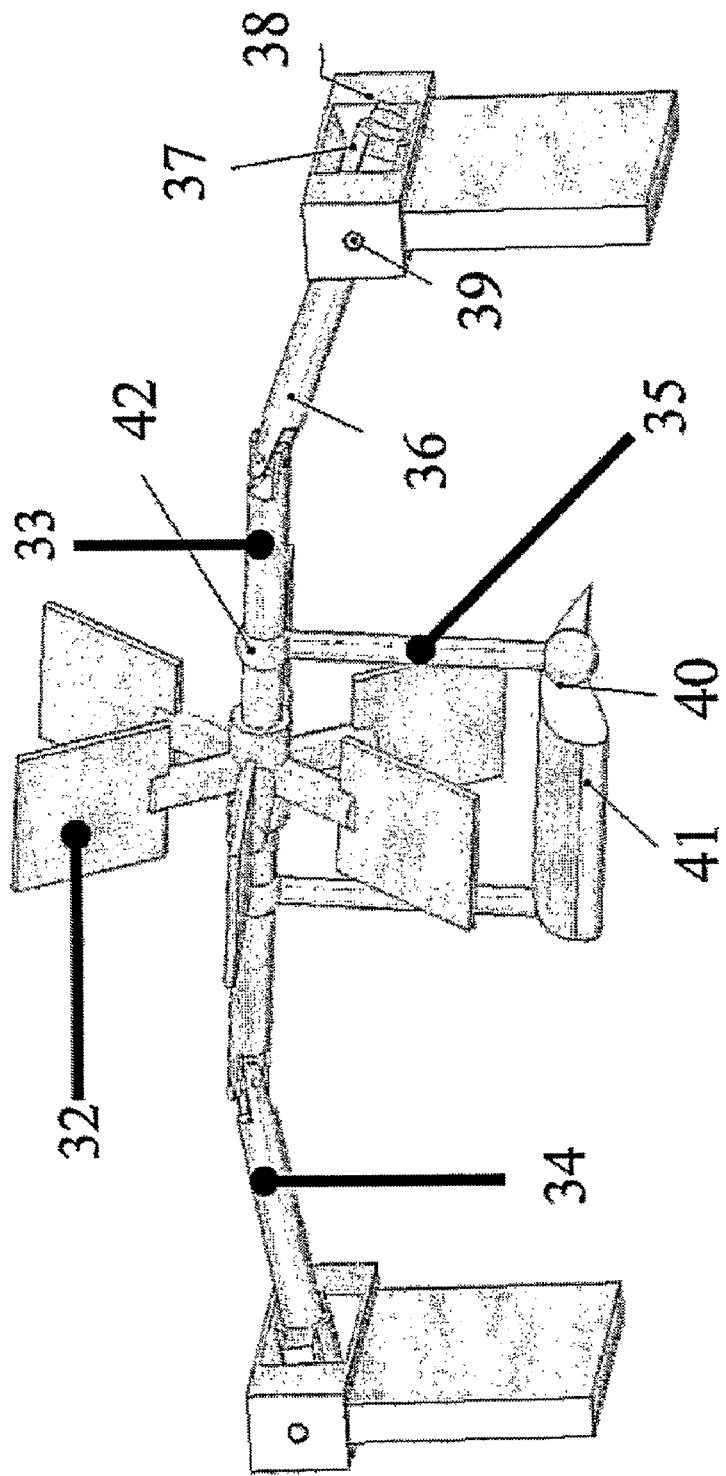
FIG. 5 is a diagram of the components of a universal joint apparatus.

FIG. 5 illustrates the use of a wing-like device (41) or flow deflector attached to bars (40) via a bar (35). [This is for illustrative purposes. The wing-like device need not be connected to parts 40 and 35 and may even be connected to a different piece of the device or to a separate structure such as the structure of part (38). The purpose is to increase speed and lift superior to the wing-like device.] The wing-like device may consist of a number of shapes, in the ideal embodiment with a greater upper camber and a lesser or non-existent lower camber, and minimally of presenting a leading edge surface. This wing decreases the pressure and increases the speed superiorly, thereby enabling the rotational device to rotate at a greater speed and for it to rise up and down more in a vertical direction. Part (41) may be attached to the rotational device or to a platform, pile, generator structure (37, 38, 39), or buoy, or any other means of placing an object. In the ideal embodiment, computerized controls will determine the exact depths and angles of these components. Rod (36) in one embodiment rotates through connection (42) while (33) rotates through part (42) so that gravity maintains part (41) in the optimal location. There will be less friction in the embodiment where part (41) is attached at a different point.

Figure 6:
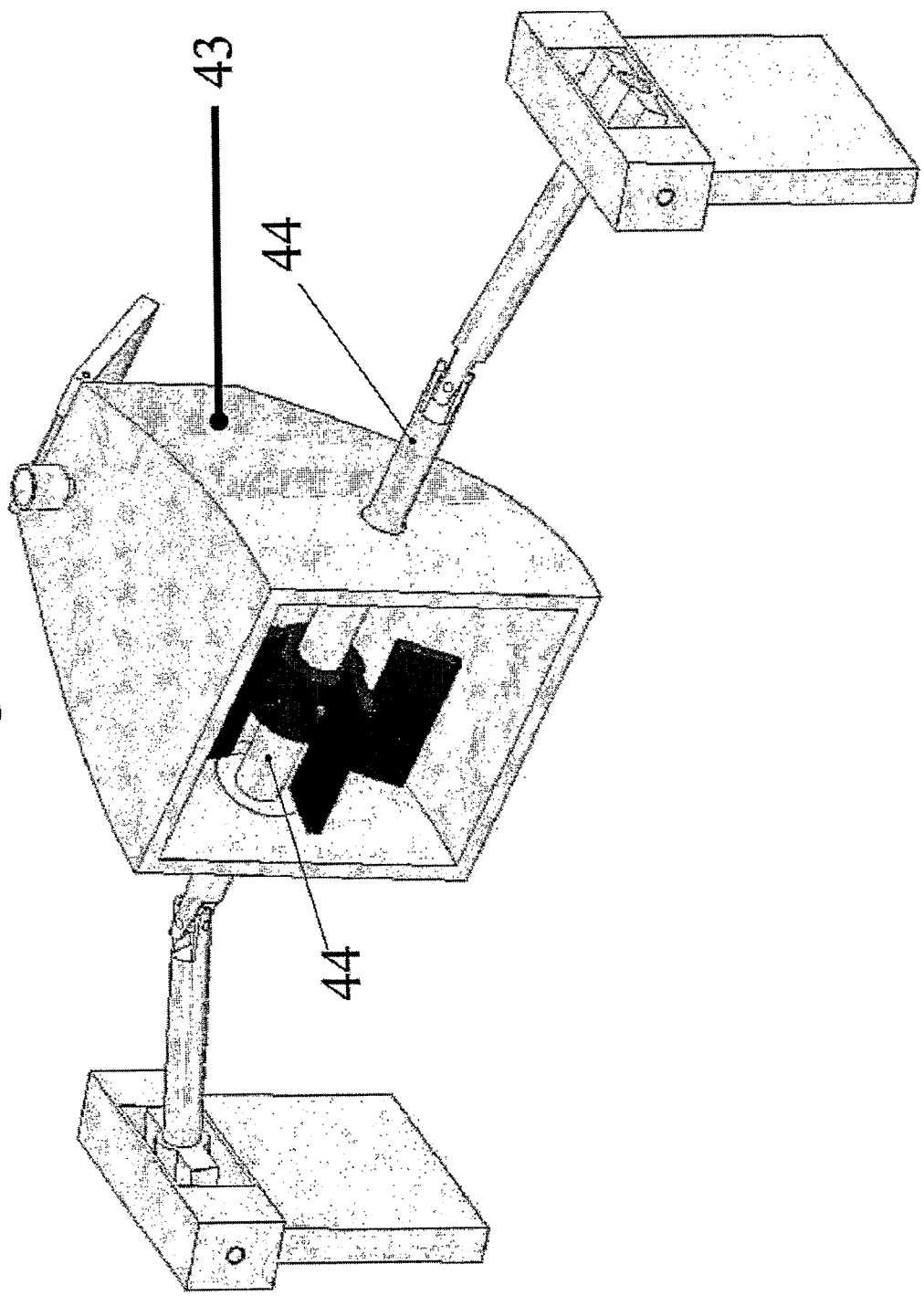
FIG. 6 is a view of a housing that narrows fluid flow.

FIG. 6 illustrates a rotational device, a paddle in one embodiment, within a housing (43) attached to the components illustrated in previous figures. An inferior sloped flooring operates to increase the amplitude of waves flowing through the device. If part (44) is inserted in the housing to enable vertical movement vis-à-vis the housing (not shown in the picture), the vertical motion may be captured by the devices on the side of the picture as previously illustrated. In another embodiment, the housing is close to the surface and the entire housing rises and falls with the surface waves. In one embodiment, the narrowing within the housing is only from the flooring. In other embodiments any of at least one of the walls may narrow. In another embodiment, more than one rotational device may be present in the housing. In the ideal underwater embodiment, bar (44) is completely within the housing (43) and the vertical motion of the wave is turned into electrical energy by a structure that is attached directly to the housing.

Figure 7:
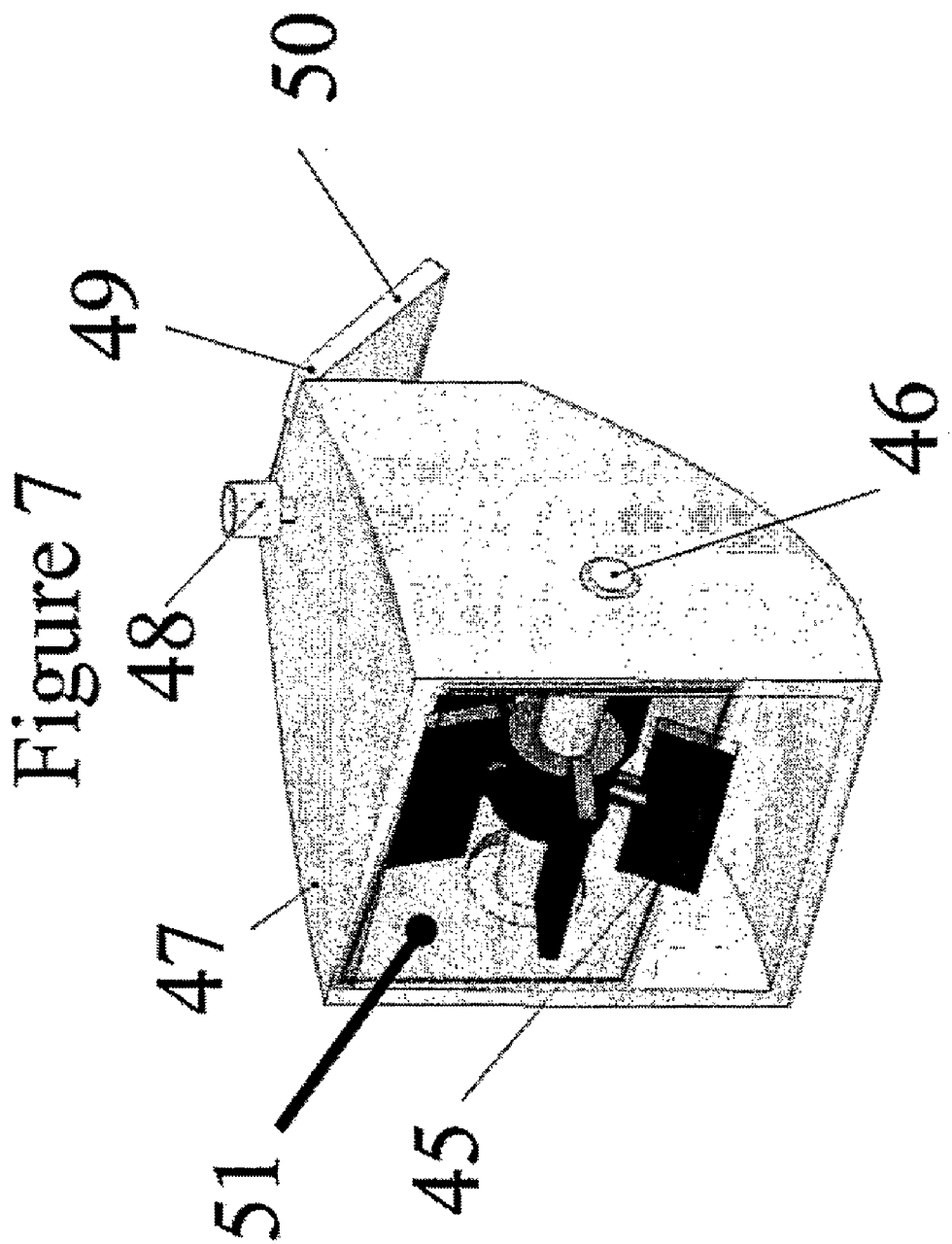
FIG. 7 is a view of the underwater system with additional flaps.

FIG. 7 illustrates one embodiment of FIG. 6, again using a rotational device (45) connected to rod (46) within housing (47). In other embodiments, the sides of the housing may be adjustable by computer control and are not necessarily fixed together. An optional inlet (48) provides a gas interface superiorly within the housing. This embodiment is most useful in a submerged configuration. Creating an air/water interface decreases friction of the paddles and enables the greater capture of energy from surface waves. After fluid enters from the left in this figure, it exits to the right, and pushes open a flap or one-way valve (50), connected via hinged part (49) in one embodiment. This enables outflow and prevents reverse flow. An optional stationary flap (51) at the entry point to the housing can help contain the gas in the housing. Rod (46) is not necessarily at a fixed location in the housing, but can also in another embodiment move up and down. The rotational device on the inside in the ideal embodiment does not extend anterior to the entry point to the housing.

Figure 8:
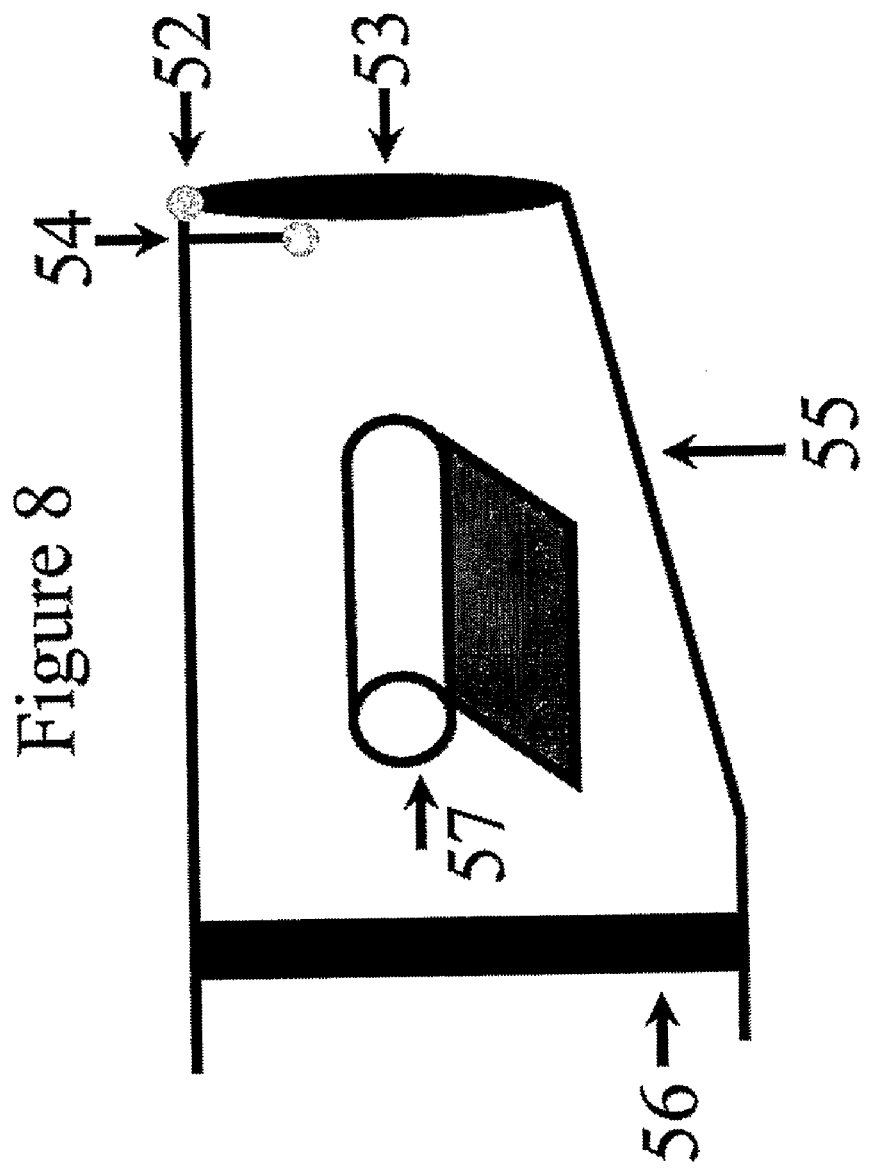
FIG. 8 is a cross-sectional view that illustrates different flap configurations.

FIG. 8 illustrates that the flap joint (52) and its connector (53) to the housing may also be connected at a lower point than previously shown, from stationary piece (54), which will help contain the gas. The inferior surface (55) of the housing is slanted upward from the opening at the left. It rises vertically in the direction that the water flow proceeds (56) into the energy capture component (57). This creates a breaker effect and Bernoulli effect, particularly if the inferior surface also has a thickness on the outside of the housing, and enables more surface and vertical energy to be captured. Part (55) may also be thickened at different locations in order to create pressure and speed differentials.

Note that the term "breaker effect" is used to indicate that visible wave amplitude is increased, thereby enabling better energy capture, but the actual breaking of the wave is always to be avoided, as the energy dissipates at that point.

Another embodiment is for an array of rotational devices to be located within the housing.

All embodiments noted here may be partially or completely submerged.

Discussion of Engineering Application of the Concepts

We built the 3D computerized model of the unit with the mechanisms described so far and with the elaborations that follow. An ideal embodiment using the principles already discussed will be illustrated.

Figure 28:
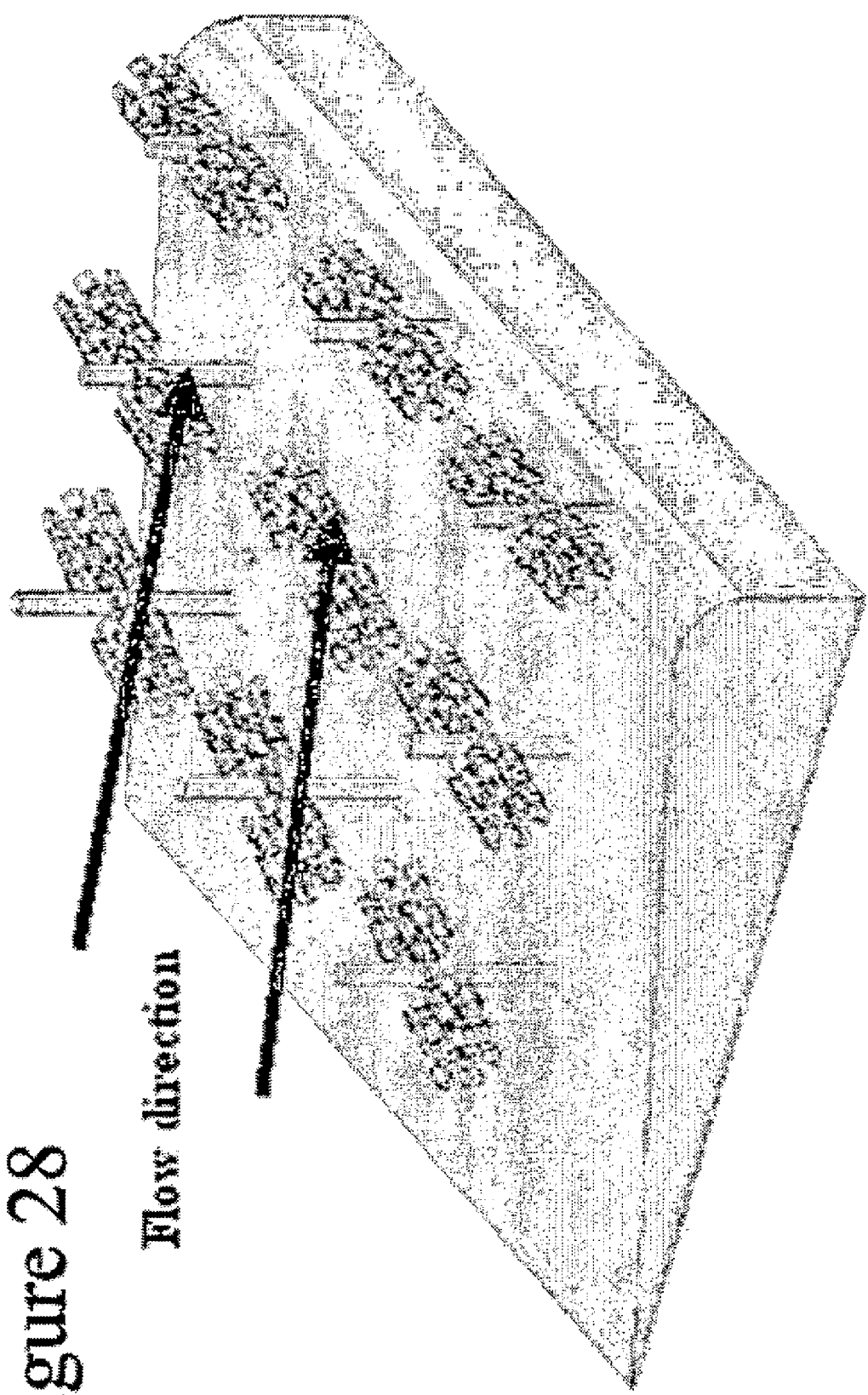
FIG. 28 is a diagram of a field of unipiles combined with a ramp.

A few options are available for locating the apparatuses in the sea at the right level and distance. One is a quay or pier that should extend into the sea so that energy can be sent back to the shore. That concept would possibly require sinking piles onto the sea floor or using a pre-existing structure as a base. Another option could be cables and buoys. Another option would be pre-existing oil rig and offshore wind platforms. Another embodiment is a single long pile sunk into the sea floor (FIG. 41), to which at least one device would be attached. This large pile is referred to as a "polypile" since it enables the attachment of many devices at different vertical positions. Another embodiment is to combine the pile and energy capture devices into a single system called the "unipile" (FIG. 28). All the above options are embodiments of the current invention. The infrastructure concept works best with a series of units (wave farm) located in the sea to lower the cost of each unit and to increase the effect of the flow deflection platforms.

The concept involves extracting the energy from two perpendicular directions of motion to obtain the maximal electromechanical energy from waves. In most cases, one is horizontal and the other is vertical. Extraction of energy from both directions of flow is based on known wave physics and characteristics.

All concepts illustrated here can be applied in embodiments of different fluids, or in a gaseous environment with wave characteristics, and in different orientations.

Figure 9:
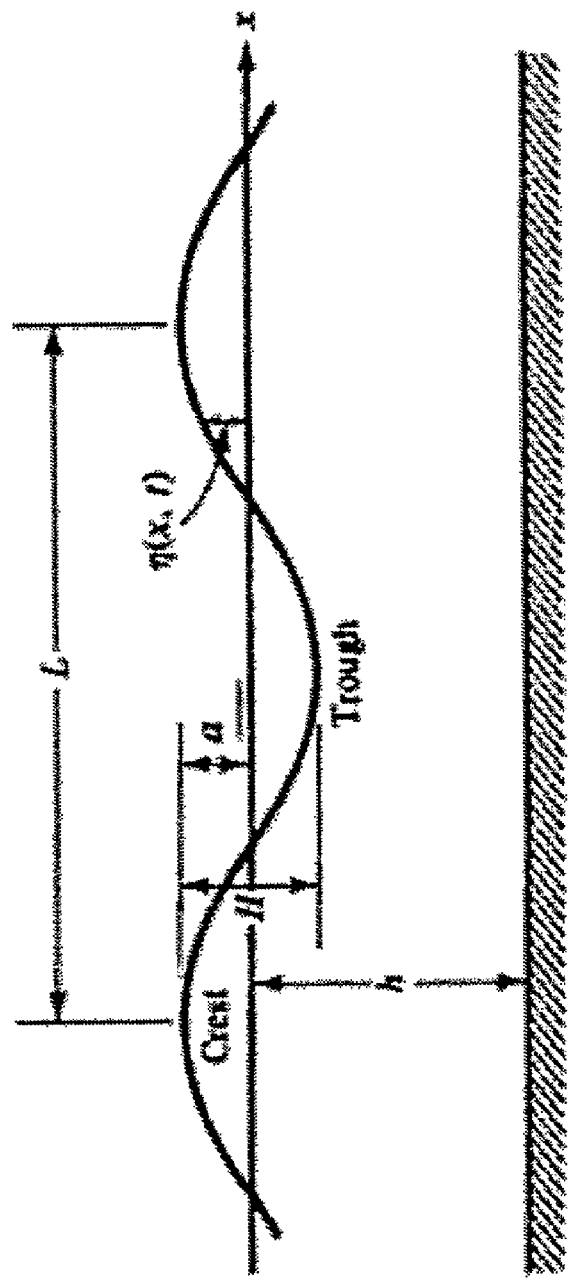
FIG. 9 is a diagram of wave characteristics.

The wave is characterized by the length (L), height (H), and the water depth (h) over which they are propagating, as is illustrated in FIG. 9.

Figure 10:
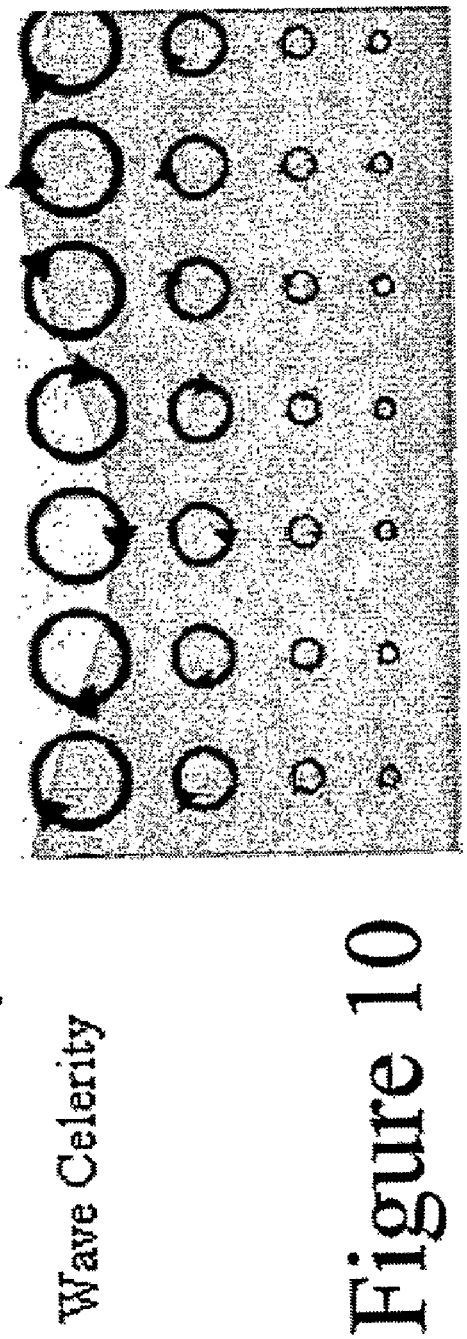
FIG. 10 is a diagram of wave rotational characteristics.

The waves have also unseen movement as illustrated in FIG. 10. The particles on the surface and below are moving in a circular movement and their radius decreases farther from the surface. When wave energy passes through water, the water particles move in a circular motion. Energy passes from left to right in FIG. 10, but the water particles themselves stay in the same general location. One method of the current invention is to locate energy capture devices in the ideal embodiment at the outer part of this radius so as to maximize the greater rotational energy and avoid the friction from lower rotational energy.

The Energy Apparatus Model

The apparatus model uses the circular movement of particles as horizontal energy to rotate, in some embodiments, a paddle wheel, submerged turbine device, propeller, or other energy capture device, and the wave amplitude (H) provides vertical energy. (In this invention, the terms paddle, paddle wheel, rotational device, energy capture device, and turbine are used interchangeably to indicate energy transfer devices all applicable to the current invention. We will see that the paddle wheel system works best in theory.) Under the rotational device, there is a breaker and/or flow deflection device to produce higher speed upstream below the paddles. The provision of said breaker and/or flow deflection device is ideally configured to increase the wave amplitude without reaching the amplitude at which the wave breaks. The paddles are free to rotate and are floating on the surface to benefit from the particles' circular movement, while the structure, including the paddle wheels, moves up and down for vertical energy generation. The rotational energy device itself is part of the system that translates motion to the vertical energy capture system.

Figure 11:
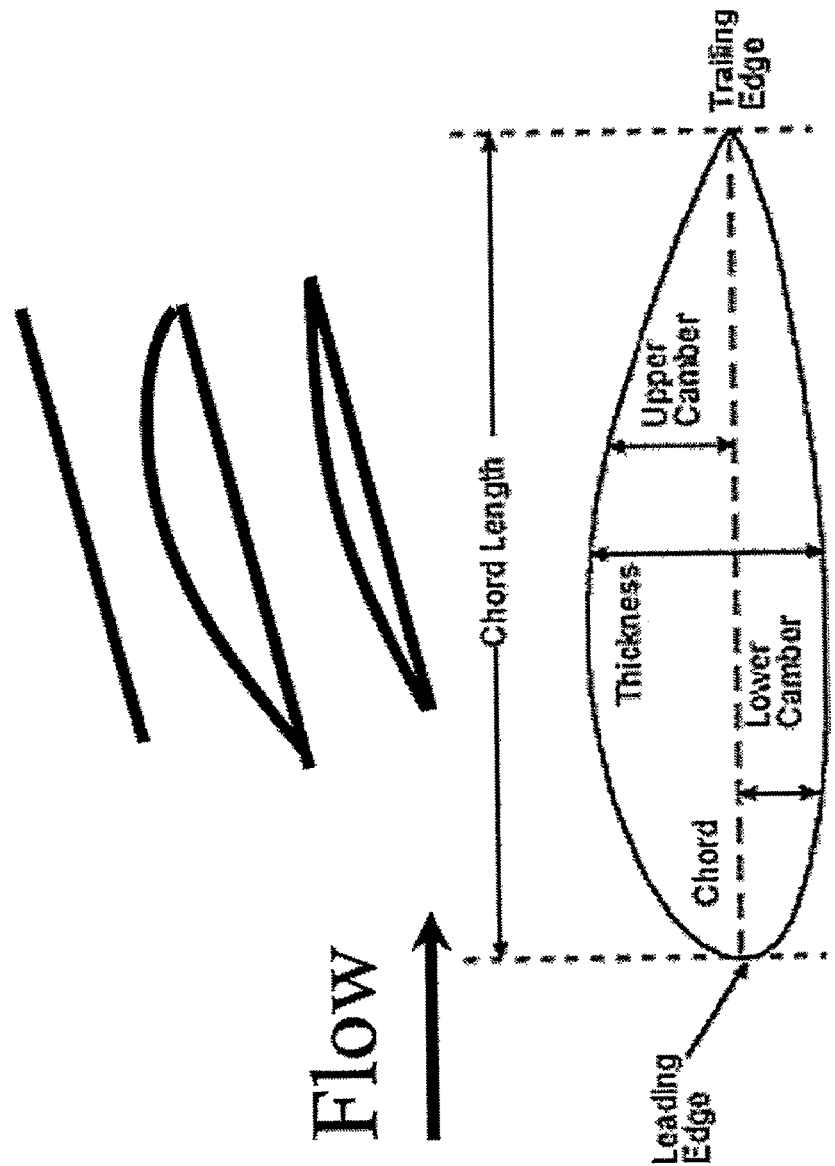
FIG. 11 is a diagram of ramp and wing variations.

Note that the effect of the wave breaker device is not considered in the initial calculations. It will be considered later in the calculation of the energy obtained from the "unipiles." In all cases, it increases the energy substantially. We refer to it sometimes as a wave breaker device (even though it is not meant to break the wave but rather to reveal its amplitude) or a wing-like device, or a ramp, or a flow deflection device. In all cases, the upper camber needs to be greater than the lower camber, as shown in FIG. 11.

Figure 12:
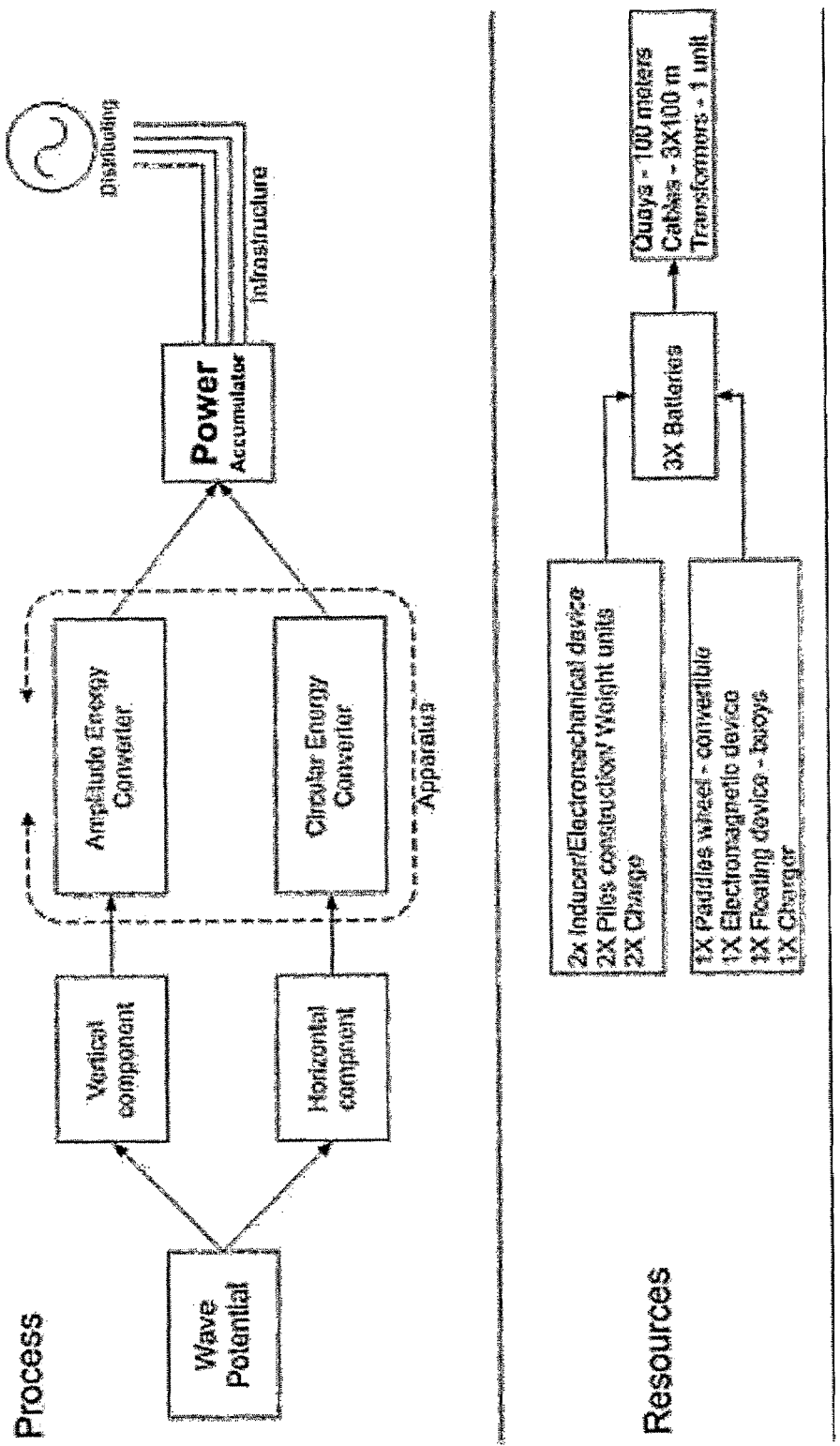
FIG. 12 is a Concept Block Diagram.

This block diagram in FIG. 12 summarizes the basic method and overall concept of the energy creation using the current apparatus in the ideal embodiment. It is also correlated with the assumed resources so one can see the investment needed at every step. We made basic assumptions to calculate the theoretical power that can be produced but it is clear that real testing and trials in field are necessary in later stages.

Calculations

We shall first calculate the forces acting on the energy producer devices and the energy produced by those devices. The next step is to deduct the estimated losses due to mechanics or wind drag forces. Finally, we shall calculate the Work per Time period to get the power in Watts. The calculations will use metric units unless otherwise specified.

For easier demonstration and explanation purposes we used the paddle wheel and not the turbine.

Figure 13:
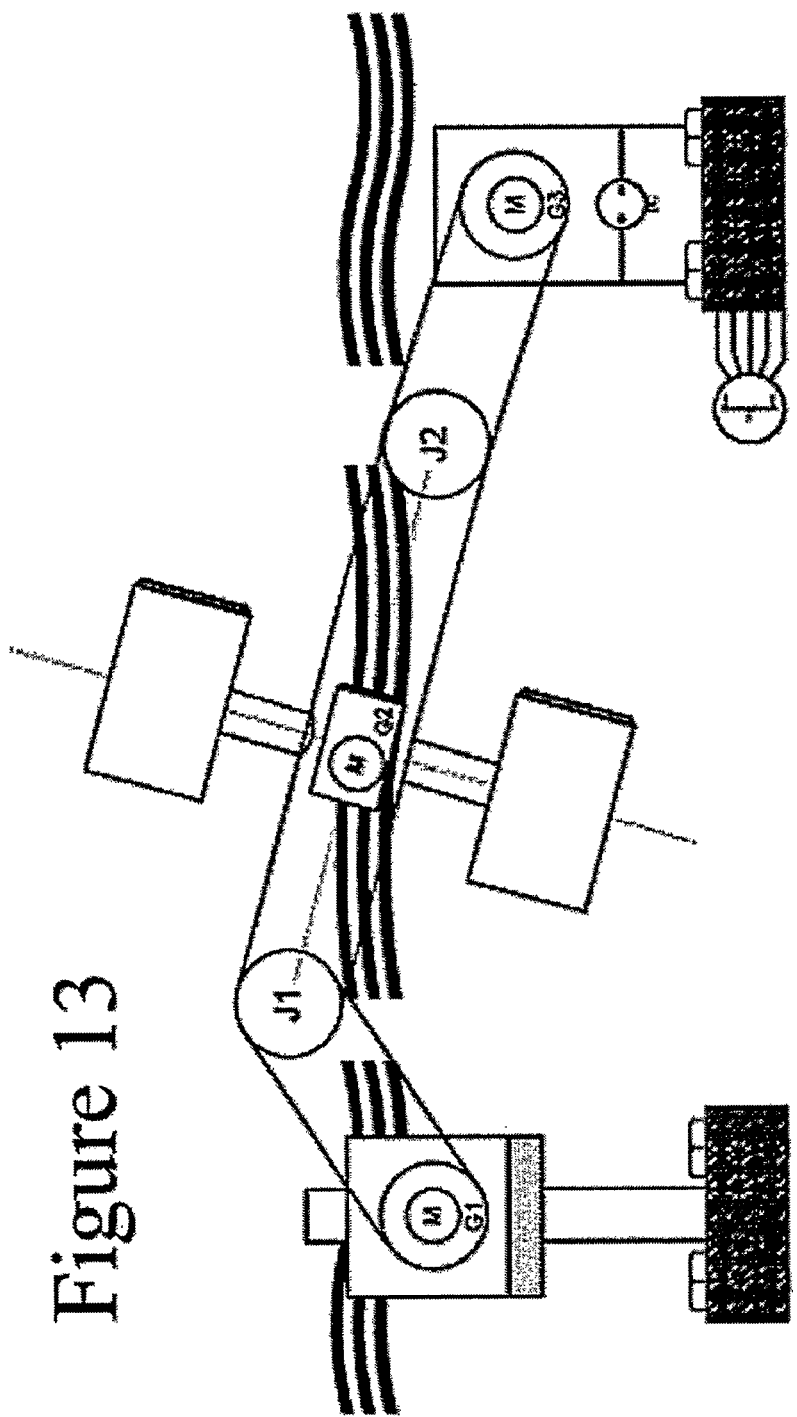
FIG. 13 is a diagram of oscillator models.

Physics Assumptions
1. Small Amplitude Theory
2. Two dimensional progressive surface gravity waves.
3. The amplitude of waves is much smaller than the length of the wave.
4. The amplitude of waves is much smaller than the water depth.
5. Natural wave frequency changes with time but we will use average values in respect to time.
6. Power generated by G1, G2, & G3 as illustrated in FIG. 13.
7. Joints J1, J2 represent the mechanical universal joints.
8. Each mechanism (mechanical and electromechanical) has losses.

FIG. 13 illustrates schematically the apparatus parameters and the way it works mechanically in one illustrative embodiment. There are 3 generating devices on the apparatus, G1, G2, and G3. G1, located on the left side, producing work from swinging movement and vertical movement of the connected rod. G2 generates work from the rotational movement of the paddles. G3 generates work only by the swinging rod on the right side of the apparatus. G2, connecting G1 and G3, sits on a rod between two universal joints J1 and J2.

Energy Producers

In the apparatus of FIG. 13 there are 2 types of energy producers, one paddle wheel and two oscillators.

The paddle wheel rotates with changing speed due to wave surface particle movement. The paddle surfaces use the pressure to convert dynamic flow into rotational kinetic energy. That is a gross-motion system.

The oscillator's action is achieved by the up and down movement of the wave. The forces influencing the floating paddle wheel linked to the oscillators are gravity and buoyant forces. Those are incremental-motion systems.

Another energy conversion component is the piston motion shown on the left side of FIG. 13, which can produce high energy if we shall introduce the apparatus into an area with higher waves. We shall use known electromagnetic device parameters for our calculations. (Versions of this embodiment can include any of the energy conversion components listed above: paddle wheel, at least one oscillator, and at least one piston. Here, and in all places in this patent, a connection to a generator at the appropriate point is part of the system, even if not specifically mentioned on each occasion.)

Paddle Wheel Analysis

Figure 14:
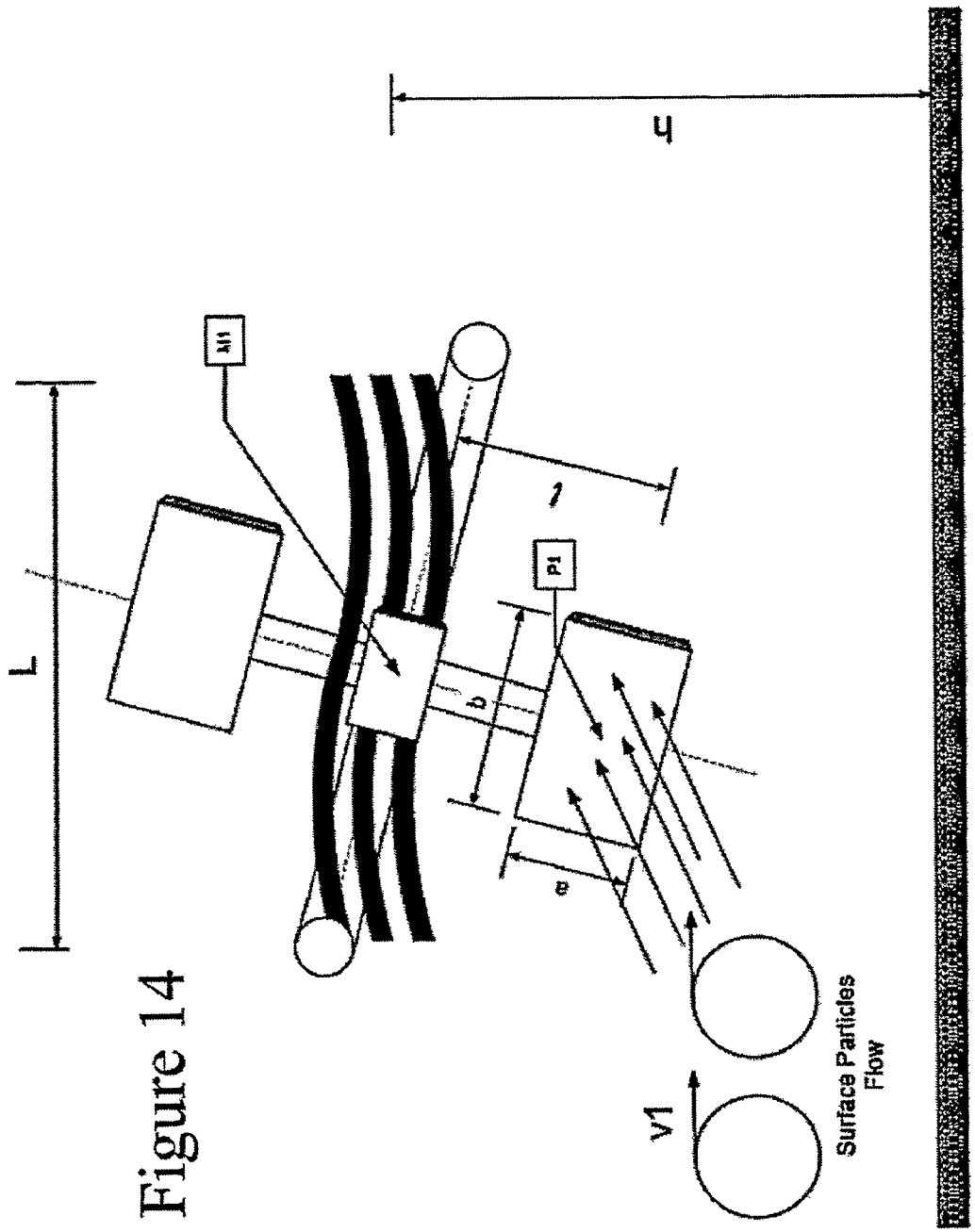
FIG. 14 is an oscillator free body diagram.

FIG. 14 illustrates several parameters of the wave and the forces acting on the paddles to generate the rotational forces. The particles' flow velocity (v1) acts on the paddles and generates pressure that can be assumed to produce a unit force at point P1.

The forces change with time, paddle position, and the pressure of static and dynamic fluid forces. The paddles approach the water at a horizontal position. Then they incline and reach the maximum horizontal force at a submerged vertical position. Then they rotate and incline till they get back to a horizontal position and leave the water.

Paddle Shape

Figure 15:
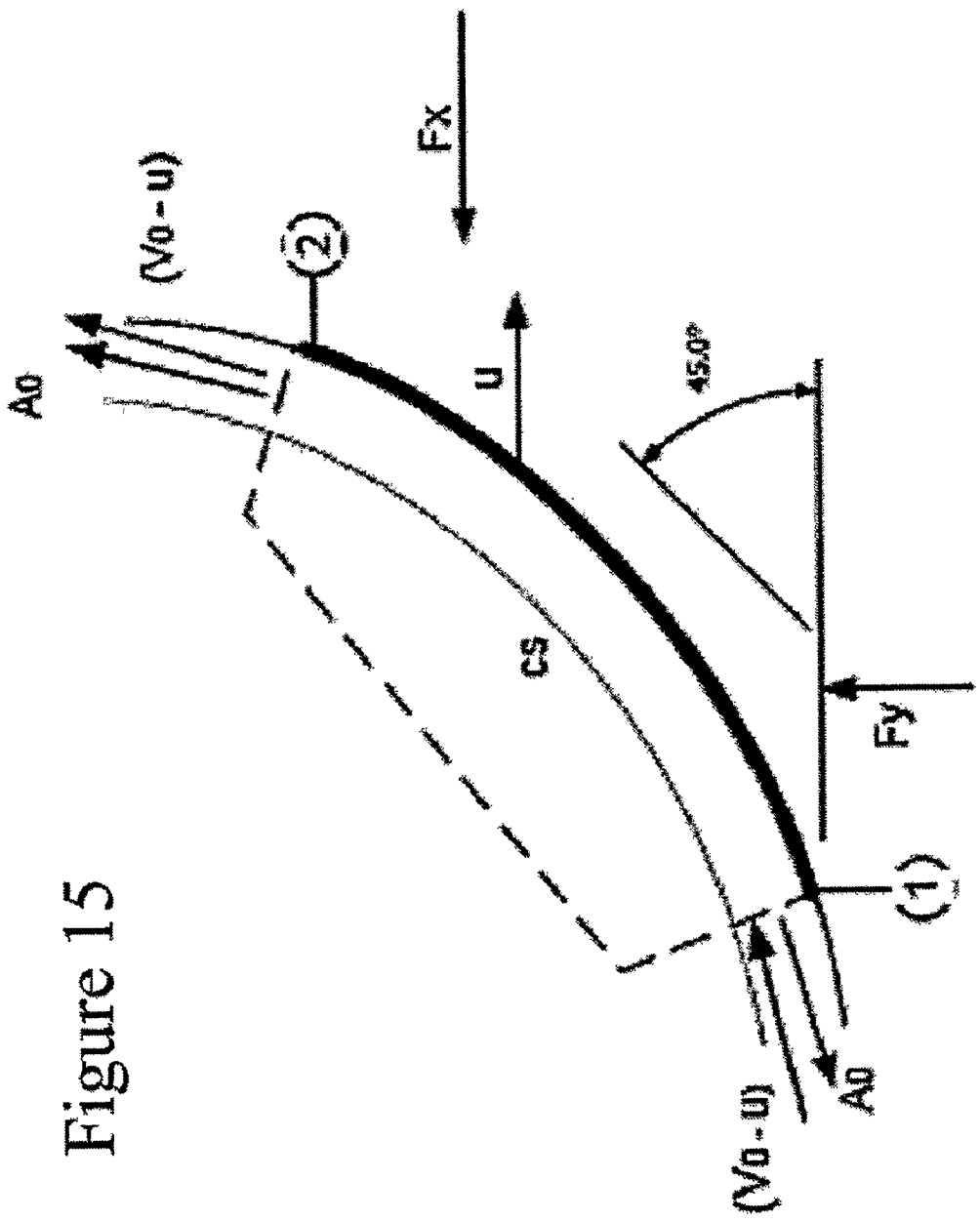
FIG. 15 is a diagram of the paddle wheel model.

The shape of the paddle is of importance and we define its preferred embodiment. Using a flat paddle is not efficient. We noted earlier that the particles with the highest energy and speed are located underneath the water surface. We have to use them maximally and therefore the shape of the wheel paddles is important. Another reason for the importance of the shape is the wind force acting on the paddles outside the water. Therefore in FIG. 15 we define an optimal shape for those purposes. (Not discussed in these calculations are the optional embodiments discussed later of extensions onto the paddles, which would enable them to adjust to increases in wave amplitudes.) A method of the current invention is the customization of the paddle shape to average wave conditions at a certain location. The standard configuration is what is about to be calculated, and it generally allows the selective capture of only the outer radius area of the waves.

The forces acting on the shape lead the wheel to rotate and get work done by rotating the wheel. This work can be evaluated and then multiplied by using many more vanes.

The Linear-Momentum equation for the control volume will be used to evaluate the power that can be obtained from this vane.

$$\sum F = \frac{d(mv)}{dt}$$
$$= \frac{\partial}{\partial t}\int_{cv} \rho v \cdot dV + \int_{cs} \rho vv \cdot dA$$

When dividing the forces acting on the vane as a reaction of the flow hit we get for single vane:

$$F_x = \rho(V_0-u)^2 \cdot A_0(1-\cos\theta) \text{ and } F_y = \rho(V_0-u)^2 \cdot A_0(\sin\theta)$$

Where
$V_0$ is the absolute velocity of the flow
$V_0-u$ is the relative velocity
$\rho$ is the Density
$A_0$ is the flow jet cross section area The relevant equation for the wheel direction power exerted on the vane (paddle) will be:

$$P = u \cdot F_x$$

Using the equations above one can optimize the parameters to the best power output. In the graphs one can see the power gain with changes of different parameters.

Graph 1: The vane degree is the angle between the flow direction and the vane curve at the entrance. The power increases with the paddle/vane angle growth.

Graph 2: The flow section is the area the flow passes as it hits the vane and makes it rotate. The power increases with larger flow capacity.

Graph 3: The power increases with inlet speed growth while vane angle is unchanged at 45 degrees.

Graph 4: The power increases with inlet speed growth while vane angle is unchanged at 60 degrees.

Graphs 3 and 4 describe the influence of flow speed on the power extracted when 40 or 60 degrees are between the flow and the vane. It is clear that a higher degree creates more potential power from the rotation movement of the wheel.

Figure 16:
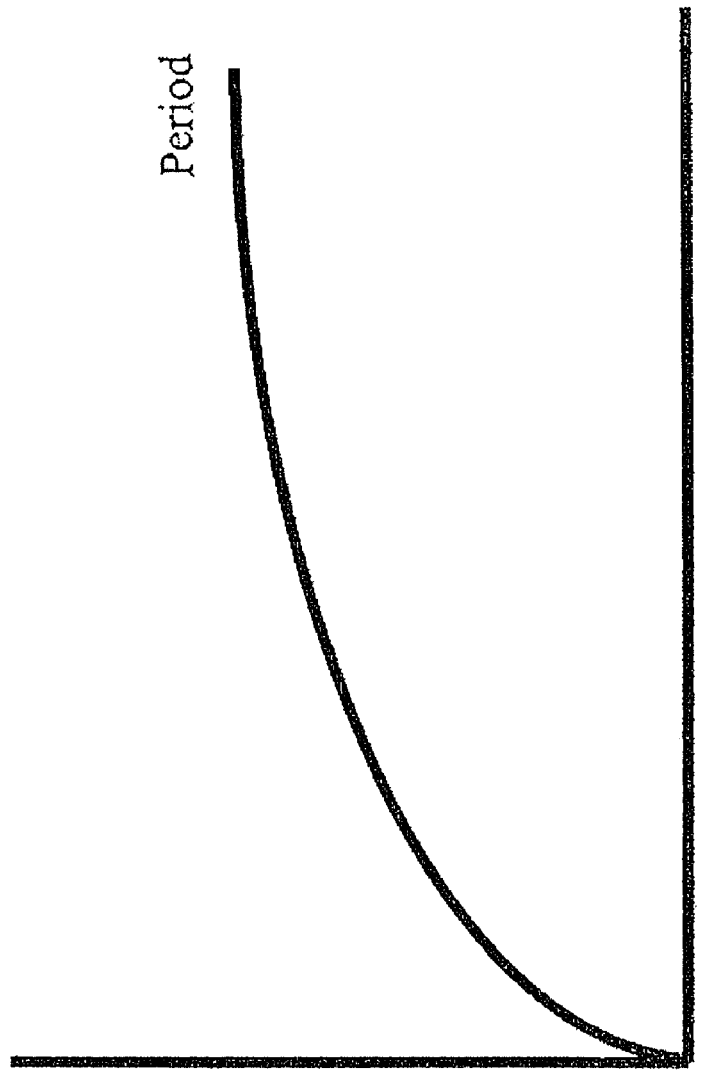
FIG. 16 is a graph of the relationship between speed and wavelength of a wave.

The wave or flow speed based on wind speeds can seen in the following tables and FIG. 16.

| | Sea Height and Period As a function of Windspeed, Duration and Fetch | | | | | | |
|---|---|---|---|---|---|---|---|
| Wind Speed | Wind Duration | | | | | | |
| | 6 hrs | 12 hrs | 18 hrs | 25 hrs | 35 hrs | 45 hrs | 55 hrs |
| 22 kts | 5.7@6 43 | 7.8@7.5 100 | 9.0@8 160 | 10@9 250 | 11@10 400 | 12@11 550 | 12@11.5 700 |
| 26 kts | 7@6.6 48 | 10@8 110 | 12@9 170 | 13@10 280 | 14@11 410 | 15@12 600 | 16@13 800 |
| 30 kts | 7.5@7.2 51 | 12@9 125 | 14@10 210 | 16@11 300 | 18@12 500 | 20@13 700 | 20@14 900 |
| 36 kts | 11.6@8 60 | 16@10 140 | 19@11.5 235 | 22@13 360 | 25@14 540 | 27.5@15 800 | 29@16 1000 |
| 40 kts | 14@8.8 64 | 19@11 150 | 23@12.5 260 | 26@14 400 | 29@15 590 | 32@16.2 880 | 34@17 1200 |
| 45 kts | 16@9.3 70 | 23@12 170 | 27@13.5 285 | 31@15 425 | 35@16 630 | 39@18 950 | 41@18.5 1250 |
| 50 kts | 19@10 75 | 27@12.5 180 | 31@14.5 300 | 37@16 450 | 43@17.5 700 | 46@19 1050 | 48@21 1350 |
| 55 kts | 22.5@11 80 | 30@13 190 | 36@15 320 | 44@17 500 | 50@19 760 | 55@21 1150 | 59@22 1450 |
| 60 kts | 25@11.5 83 | 35@14 200 | 42@16.5 350 | 50@18 510 | 56@20 800 | 67@22 1200 | 70@23.5 1500 |
| 65 kts | 27.5@12 88 | 39@15 220 | 48@17 380 | 55@19 560 | 65@21 850 | 75@22 1250 | 80@25 1600 |
| 70 kts | 30@13 91 | 43@16 235 | 55@18 395 | 62@20 600 | 71@22 880 | 82@25 1325 | 90@26 1600 |
| 75 kts | 34@14 96 | 50@17 245 | 60@19 405 | 70@21 620 | 80@23 900 | 90@25.5 1400 | 99@27 1700 |
| 80 kts | 37@14.5 100 | 54@17.5 255 | 65@20 425 | 72@22 640 | 85@23.5 975 | 100@26.5 1450 | 107@28 1800 |
| 85 kts | 40@15 103 | 57@18 260 | 74@21 445 | 80@22 680 | 95@25 1000 | 109@27.5 1500 | 122@30 1900 |
| 90 kts | 45@16 110 | 63@19 270 | 80@22 460 | 92@24 700 | 107@26.5 1100 | 120@29 1550 | 130@31.5 2000 |
| Wind Speed | Wind Duration | | | | | |
| | 70 hrs | 80 hrs | 90 hrs | 100 hrs | 120 hrs | 140 hrs |
| 22 kts | 12@12 1000 | 12@12.5 1200 | 12@12.5 1400 | 12@13 1550 | 12@13 1950 | 12@13 2350 |
| 26 kts | 16@13.5 1100 | 16@14 1350 | 17@14.5 1550 | 17.5@15 1850 | 17.5@15 2250 | 17.5@15.5 2600 |

-continued

Sea Height and Period
As a function of Windspeed, Duration and Fetch

| | | | | | | |
|---|---|---|---|---|---|---|
| 30 kts | 22@15 | 22@16 | 22@16 | 23@16.5 | 23@17 | 23@17.5 |
| | 1200 | 1500 | 1750 | 2000 | 2500 | 3000 |
| 36 kts | 30@17.2 | 30@18 | 31@18.5 | 31@19 | 31@19.5 | 31@20 |
| | 1400 | 1700 | 2000 | 2300 | 2900 | 3400 |
| 40 kts | 36@19 | 37@19.5 | 38@20 | 39@21 | 40@21 | 41@22 |
| | 1500 | 1800 | 2200 | 2500 | 3100 | 3800 |
| 45 kts | 45@20 | 45@21 | 47@22 | 49@22.5 | 50@23 | 50@24 |
| | 1600 | 2000 | 2300 | 2700 | 3600 | 4100 |
| 50 kts | 54@22 | 55@23 | 58@23 | 59@24 | 60@25.5 | 60@26.5 |
| | 1750 | 2100 | 2500 | 2900 | 3800 | 4250 |
| 55 kts | 62@23 | 65@24 | 66@25 | 69@26 | 70@27 | 70@28 |
| | 1900 | 2300 | 2600 | 3100 | 3900 | 4600 |
| 60 kts | 75@25 | 79@26 | 80@28 | 80@28 | 82@30 | 85@30 |
| | 2000 | 2450 | 2800 | 3250 | 4000 | 5000 |
| 65 kts | 85@26.5 | 90@28 | 92@28.5 | 95@30 | 100@31 | 100@33 |
| | 2100 | 2500 | 2950 | 3400 | 4200 | 5100 |
| 70 kts | 98@29 | 100@29.5 | 104@30.5 | 109@31 | 115@32.5 | 119@35 |
| | 2250 | 2600 | 3050 | 3600 | 4500 | 5600 |
| 75 kts | 105@29 | 110@31 | 118@32 | 120@33 | 125@34 | 130@36 |
| | 2300 | 2700 | 3150 | 3800 | 4800 | 6000 |
| 80 kts | 119@30 | 121@32 | 133@33 | 136@34 | 140@35 | 140@36.5 |
| | 2400 | 2850 | 3300 | 3900 | 4950 | 6100 |
| 85 kts | 133@32 | 139@33.5 | 140@35 | 145@35.5 | 155@37.5 | 160@39.5 |
| | 2500 | 3000 | 3500 | 4050 | 5050 | 6500 |
| 90 kts | 140@33 | 147@34.5 | 155@36.5 | 165@37 | 170@40 | 190@44 |
| | 2600 | 3100 | 3750 | 4250 | 5200 | 6800 |

These are theoretical values. Actual sea size and period can vary.
Blue cells are what is 'typically' experienced in a storm. The others are provided for informational purposes.

| Sea State | Beaufort Scale | Wind (m/s, knots) | | Sea | Height (m) | Length (m) |
|---|---|---|---|---|---|---|
| 0 | 0 No wind | <0.2 | <0.4 | Smooth sea | 0 | — |
| 0 | 1 Gentle air | 1.5 | 3 | Calm sea | 0.5 | 10 |
| 1 | 2 Light breeze | 3.3 | 6.5 | Rippling sea | | |
| 1 | 3 Gentle breeze | 5.4 | 10.5 | Gentle sea | 0.75 | 12 |
| 2/3 | 4 Moderate breeze | 7.9 | 15 | Light Sea | 1.25 | 22 |
| 4 | 5 Fresh breeze | 10.7 | 21 | Moderate Sea | 2.0 | 37 |
| 5/6 | 6 Strong breeze | 13.8 | 27 | Rough sea | 3.5 | 60 |
| 6/7 | 7 Moderate Gale | 17.1 | 33 | Very rough sea | 6.0 | 105 |
| 7 | 8 Fresh Gale | 20.7 | 40 | High sea | >6.0 | >105 |
| 8 | 9 Strong Gale | 24.4 | 47 | High sea | | |
| 9 | 10 Whole Gale | 28.3 | 55 | Very high sea | | |
| 9 | 11 Storm | 32.7 | 64 | Extremely heavy sea | 20 | 600 |
| | 12 Hurricane | >32.7 | >64 | Extremely heavy sea | | |

Oscillator Analysis

The forces generating the oscillating motion create movements at the end of the rods on both sides. These forces oscillate with the same frequency as that of the waves.

FIG. 17 shows the oscillator device in two variations. The one on the right has a fixed position and the one on the left has a piston-like vertical movement. It might be possible to use either one or their combination, depending on the sea level and wave characteristics and flow regimen. The forces and velocity are the parameters that are most relevant for our calculations.

The arrows designated with Fg and FB are reflections of the forces acting on the wheel. The universal joint transforms mechanical moment, not forces, from one rod to the other but, for easier understanding, the illustration refers to forces. The V1, ω1, and ω2 are the meaningful parameters as they provide the kinetic energy and are the power producers in this case. The forces Fg and FB are parameters to be determined in a later stage of detailed design.

Next we should find the power gain of wave energy while transforming its work to kinetic energy. From the principle of work and energy of rigid bodies we can obtain the equation that all the kinetic energy and the work of all the forces acting on the system conserved are described in $T_1 + U_{1 \to 2} = T_2$ or only with energy expression
$T_1 + V_1 = T_2 + V_2$ Where, T1, T2=the initial and final values of total kinetic energy of the body.

V1, V2=the initial and final values of total potential energy of the body.

U=work of all forces acting on the body

In the case of the kinetic energy of a rigid body in plane motion, as in our case, the total energy of such system is expressed as $$T = \frac{1}{2}m\bar{v}^2 + \frac{1}{2}\bar{I}\omega^2$$

This represents the translational component and the rotational component associated with the system and its motion around a center of gravity.

We assume the complete energy released from the vertical motion of the wave, from peak to valley, transforms to kinetic energy while keeping the rule of conservation of energy.

It's also known that the period of time of each wave concluding a cycle is $t=f^{-1}$ and Velocity=Wavelength×Frequency For the power we shall use Power=F·V Energy Calculations We use the free body diagram (FIG. 18) to solve the kinematics of motion and continue with kinetic energy and conservation of energy to obtain the amount of work and power we gain from this device. In the schematics there are two positions, one when the point B is in the Wave upper position and the other when it is in the Wave lower position.

Kinematics of Motion
Provided:

$$\overline{v}_{AB} = \left(\frac{1}{2}l\right) \cdot \omega \text{ and } V_B = l \cdot \omega$$

Position 1
Potential Energy

Choosing the data as shown, and observing that W=9.81m [N], where m is the mass rod, we have $$V_1 = 2W\overline{y}_1 = 2(9.81m)y_1 = 19.6my_1 [J]$$

Kinetic Energy

Since the system is at rest in position 1 (start position), T1=0

Position 2
Potential Energy $$V_2 = 2W\overline{y}_2 = 2(9.81m)y_2 = 19.6my_2 [J]$$

Kinetic Energy $$\overline{I}_{AB} = \frac{1}{12} ml^2 \text{ [kg} \ast \text{m2]}$$

$$T_2 = \frac{1}{2}m\overline{v}_{AB}^2 + \frac{1}{2}\overline{I}_{AB}\omega^2$$

After previous terms for v and I we get:

$$T_2 = \frac{1}{2}m\left(\frac{1}{2}l\right)^2\omega^2 + \frac{1}{2}\left(\frac{1}{12}ml^2\right)\omega^2$$

and finally $T_2 = ml^2\omega^2/6$

Conservation of Energy $$T_1 + V_1 = T_2 + V_2: 19.6my_1 + 0 = 19.6my_2 + ml^2\omega^2/6 [J]$$

Velocity of point B

Solving from the conservation of energy the angular velocity of AB is $$\frac{1}{l}\sqrt{12g(y_1 - y_2)} = \omega$$

And the linear velocity at point B at the end of the rod is $$V_B = l \cdot \omega$$

if we substitute ω then $$V_B = \sqrt{12g(y_1 - y_2)}$$

and $$\overline{v}_{AB} = \frac{1}{2}\sqrt{12g(y_1 - y_2)}$$

The rod's mechanical power can be solved now:

$$P = F \cdot v_{AB}$$
$$= W\cos\theta \cdot \frac{1}{2}\sqrt{12g(y_1 - y_2)}$$

This is as long as the only force acting on the rod downwards is W. Indeed the force pulling down the oscillator rod from position 1 to position 2 is due to gravity force only. Using the equations above one can optimize the parameters to the best power output. In the following graphs one can see the power gain with changes of different parameters.

The graphs show the influence of two parameters, rod weight and wave height, on the wave movement and the power output.

Graph 5: The power increases with increased weight of the oscillating rod. It is clear from the graph that the rod weight influences the potential energy and the ability to gain power this way. The drawback is the system's total weight and unit price will increase.

Graph 6: The power increases as wave height increases. In the graph, the higher the wave goes, the more power is obtained, but this is limited by the rotational mechanism, which can not use the complete height for energy.

Vertical Motion Energy

Figure 19:
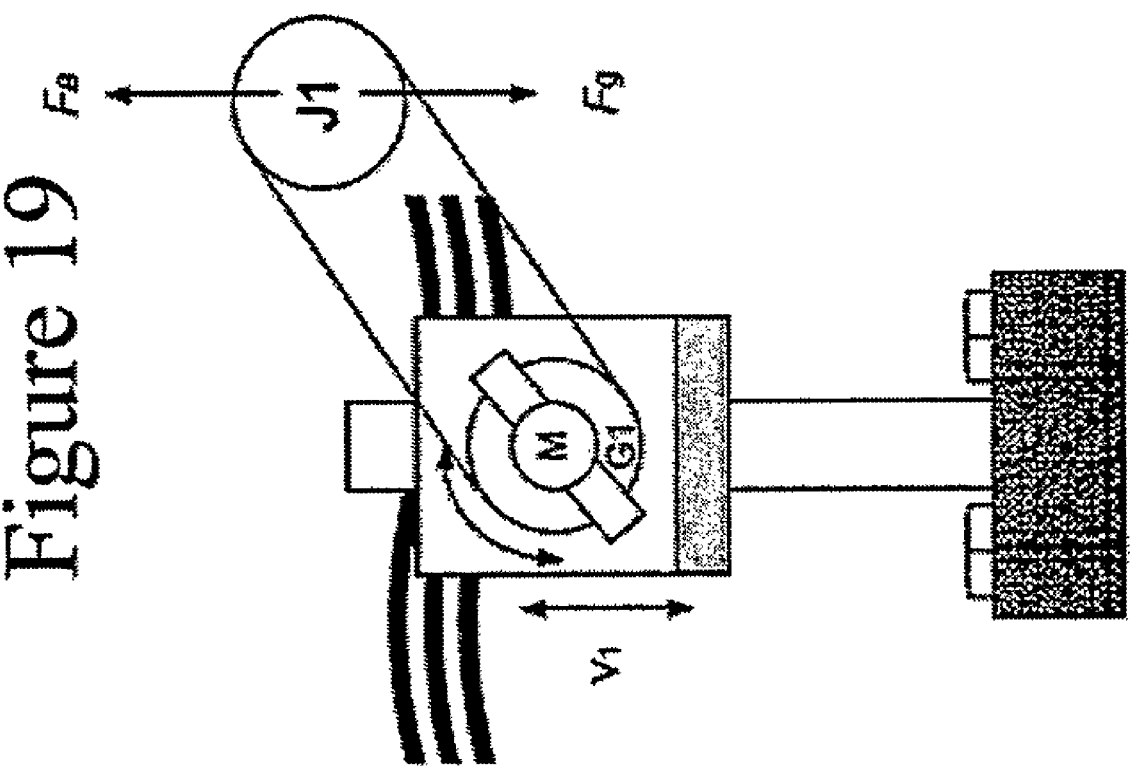
FIG. 19 is another diagram of forces.

There in another option using the motion of the wave if we eliminate the universal joint (J1) or limit it and make a vertical (piston-like) movement (V1) as the wave goes up and down. (FIG. 19) The combination of the piston and paddles is also an embodiment of the invention.

Let us calculate the values of vertical movement in the energy method.

Potential Energy transforms to Kinetic Energy $$V_1 = mgh = W \cdot h(9.81m)h = 9.81mh [J]$$

Becomes $$T_1 = \frac{1}{2}m\overline{v}_1^2 [J]$$

Power Produced $$P = F \cdot v_1 = W \cdot v_1 = W \cdot \sqrt{2 \cdot 9.81h}$$

One can see that as we enlarge both the wave height and the weight of the moving parts we get more power.

Plotting the equations we find that the amount of energy is higher compared to the oscillator device.

$$P_{oscilator} = W\cos\theta \cdot \frac{1}{2}\sqrt{12gh}$$

Compared to $P_{vertical} = W \cdot \sqrt{2gh}$

Graph 7: The power generated with wave height increases as shown.

Note:

The vertical mechanism saves space.

The vertical movement uses the complete height of the wave.

The majority of the potential energy transforms to kinetic energy in it.

To achieve higher power output, the oscillator device will be much larger. For example: wave height of 5 meters will need a rod of 10 meters length. (In another embodiment, an adjustable rod as shown in FIG. 2a can result in a smaller rod length.)

The Unipile Device

Figure 20:
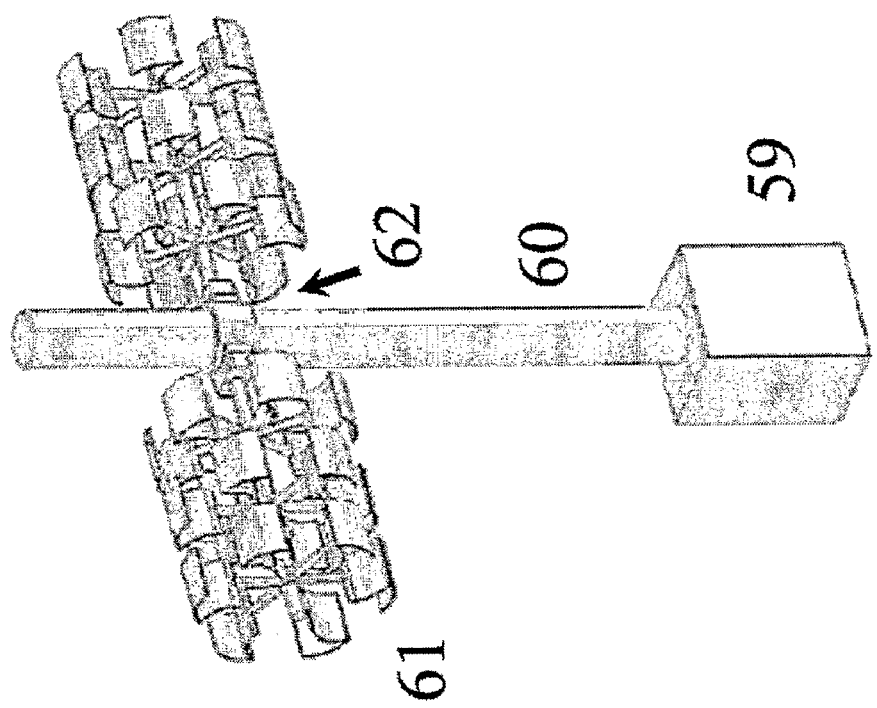
FIG. 20 is a diagram of a "unipile" apparatus.

An embodiment of using pure vertical energy combined with a paddle wheel follows. See FIG. 20. (59) is the pile that attaches to the sea floor. (60) is the piston-like structure that moves up and down as the paddle wheels (61) turn and float and move up and down on the waves. (62) is the point where a generator, not shown specifically, turns the paddle wheel rotation into electric energy and pulls the piston-like structure up and down.

The Wing/Flow Deflection Influence

Figure 21:
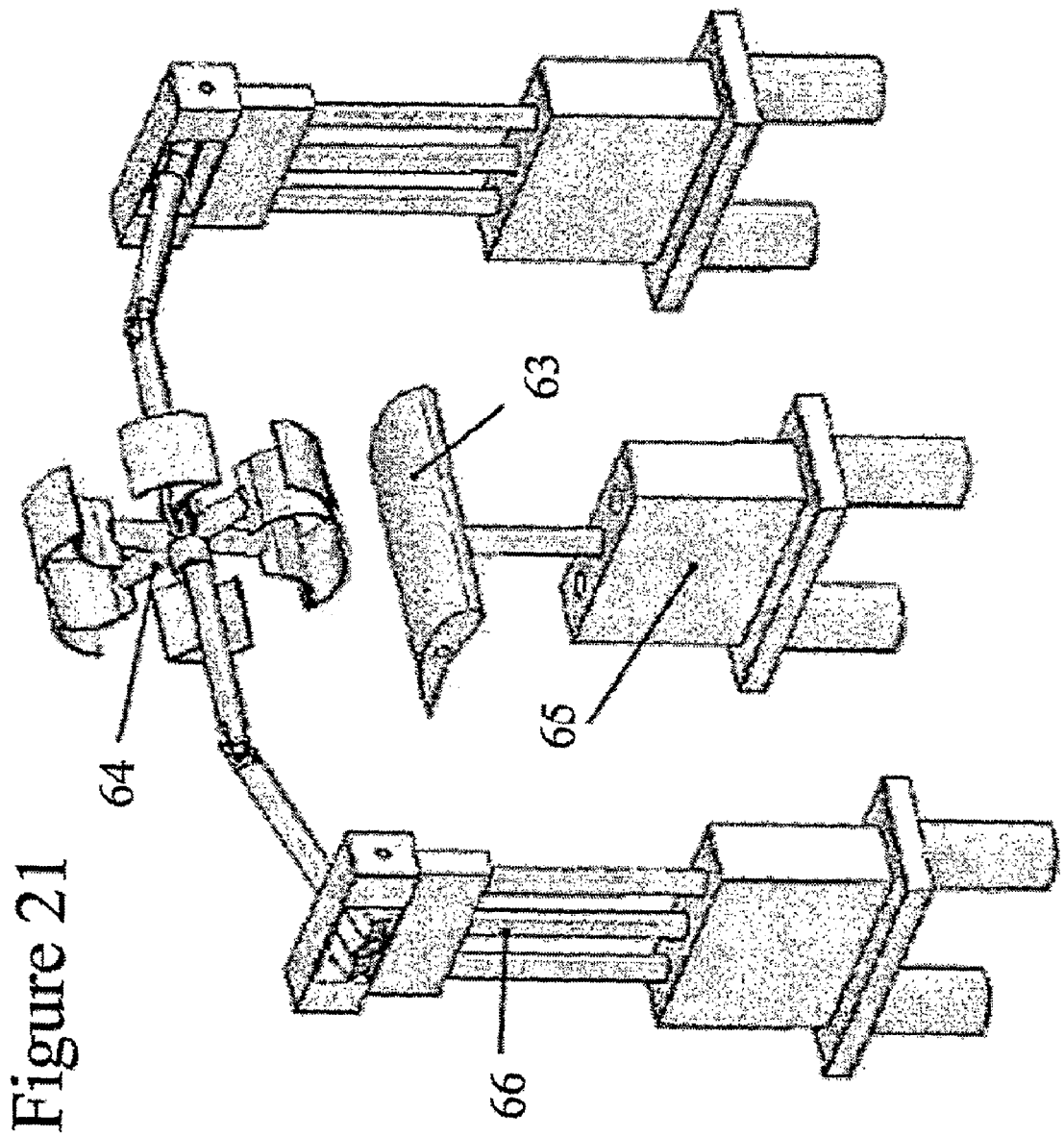
FIG. 21 shows the unipile, wing, and universal joint concepts in one picture.
Figure 22:
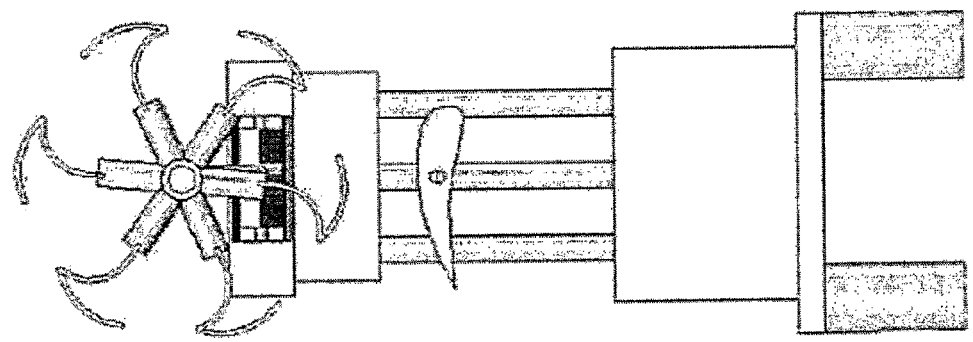
FIG. 22 is a side view of a wing and paddle wheel.

A ramp located under the paddle wheel in the present invention should increase the height of the wave and thus gain more kinetic energy and power output. FIGS. 21 and 22 illustrate the influence of a flow deflection device or ramp. In FIGS. 21 and 22, the use of more than one piston-like process is optional. FIG. 22 is a cross-sectional view.

The flow deflection device (63) in FIG. 21 can be monitored to adjust the optimal position below the wheel (64), which is fluctuating thanks to the 3 vertical rods (66) moving up and down inside the piles. (There need be only one vertical rod. The picture shows one embodiment.) The wing shape can provide the wheel with higher speed if one can keep it at a controlled distance below the wheel. In the other case, we can get elevation force acting on the wing to help the system rise with the wave. The piston sets (66) are in the ideal embodiment just one piston in each set, but in other embodiments can be more than one. Part (63) can be the wing-like device shown, or a more ramp-like device, or a combination of the two. Part (63) can be attached to a separate pile or structure (65), or to the energy capture system more directly. Although the diagrams 21 and 22 show only one paddle, in other embodiments more can be added, or the width of the paddle can be extended along the central rod.

Note that the apparatus of the diagram offers several possibilities for the location of generating devices: the paddles and their rotational energy, the rotor stators at the point where the spinning rods contact the vertical structure, and the lower movements of the piston-like structures.

In this and other diagrams, any combination of the locations for the placement of generators is possible, and any one of them can be eliminated as needed. The ideal configuration for a particular geographic location can depend on local conditions. For example, the rotor stator embodiment is less likely to be useful in a place of high amplitude waves and more useful in a location of low amplitude waves. The piston-like embodiment is less likely to be useful in a place of low amplitude waves and more useful in a location of high amplitude waves. Part of the method of the current patent is the evaluation of wave heights and a determination of the ideal combination. In a location with wave heights that vary from very low to very high, it is possible that both a piston and rotor stator device could be located on the same system.

Figure 23:
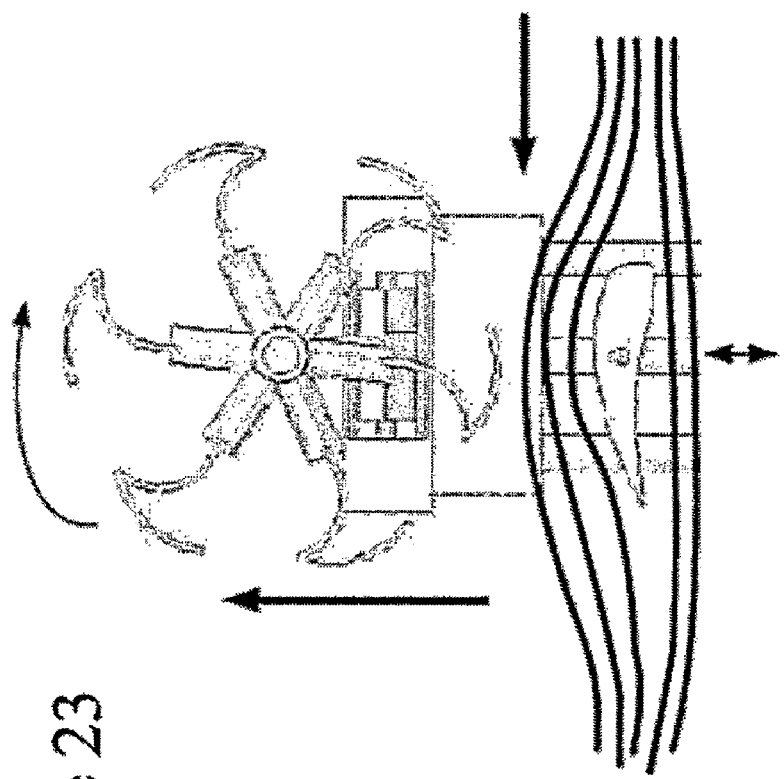
FIG. 23 is a diagram of the effect of the wing on the paddle.

The flow regime is illustrated in FIG. 23. The wing position will be optimized to the point of highest flow velocity, thus helping the wheel rotation and adding elevation force while the speed increases on the vane front. The flow around the wing causes higher speed on the top side and higher pressure at the bottom side. The leading edge of the wing-like structure may be pointed or rounded in different embodiments. In another embodiment, the wing-like structure need not be in a fixed position either relative to the surface energy capture device, or to the sea floor, but can also be connected to a piston and generator. In that case, coordination of the weights and structures of the wing-like structure and the surface energy capture device must occur to avoid collision.

Figure 24:
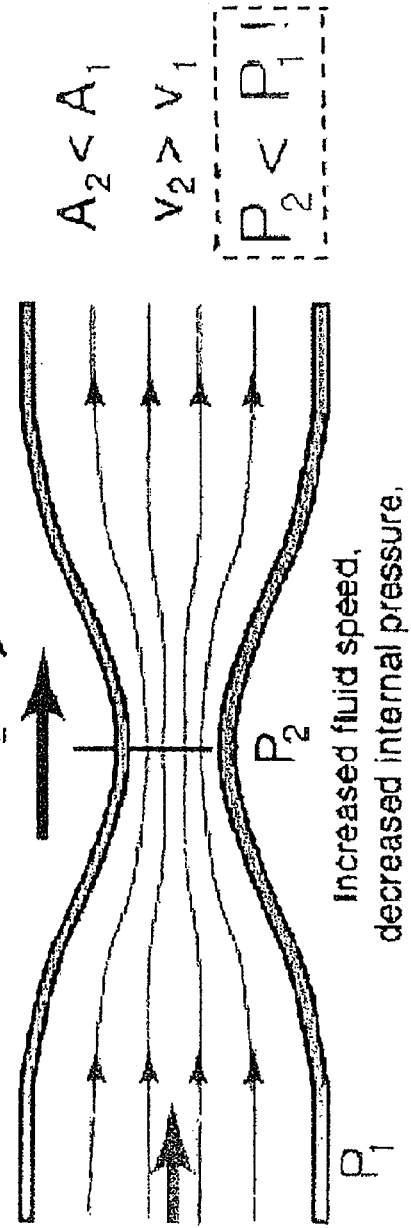
FIG. 24 is a diagram of the Bernoulli effect.

Assuming the laminar flow and streamline conserved by using the Bernoulli equation based on the energy conservation rule, we estimate there is a speed gain which helps the paddles rotate. FIGS. 23 and 24 illustrate the Bernoulli effect.

Power Summary

The different methods of energy introduced here can generate power 24 hours a day and 7 days a week all the year. There are different locations where one can put the devices as described in this patent, such as deep water and shallow water.

The apparatuses described here can be multiplied, located in a row, and used in a long wave front. It is possible that the sea's flow might change and for that reason we discuss average speed and velocities throughout this section.

We can now show the energy-producing power per hour.

Given the following parameters for a model prototype:

Vane angle=60 degrees ($\theta$)
Paddle surface area=0.003 m2
Paddle radius=119 mm (r)
Paddle blades=6
Flow cross section=0.0015 m2
Flow speed=13 m/sec (u) using the wing (assuming moderate sea 10 m/sec without wing).

Assumption: Paddle has relative speed already and not starting from zero

Wave average height=1.2 m
Rod mass=3.5 kg (W) on each side
Rod length=2.4 m
Rod outer diameter=5 cm
Rod inside diameter=4.2 cm
Wave length~40 m (Theoretical)
Wave period=10 sec
Max oscillation angle=30°

We calculate for a period of hour, day, or a year the following:

a) The energy out of the paddle rotation:

$$F_x = \rho(V_0-u)^2 \cdot A_0(1-\cos\theta)$$

where @ 25° C., $\rho$=997 kg/m3 and V0 is 3 m/sec initial paddle speed.

we get Fx=36 N.

Using $P=u \cdot F_x$ we get P=256 Watt.

The linear velocity of 13 m/sec on the wave surface should be translated into angular velocity of the paddle wheel to find how much power is generated.

If $\omega=u/r$ when r is the radius of the paddle wheel.

Then we get that $\omega$=596 RPM or 62 Rad/sec

Using the moment and angular velocity we get power per wheel:

$$P=M*\omega=(Fx*r)*\omega=36*0.119*62=256 \; Watt,$$

And per hour per wheel we get 921 [kW/hr].

Every turbine has inefficiency, which is called coefficient of performance. It can be shown that in such a reaction device at open stream the maximum coefficient of performance (Cp) is 0.59.

Using this factor, the output from the paddle wheel will be 151 kW/hr per wheel.

b) The energy out of oscillator device X 2:

The force acting on its way down is W—the weight of the rod. On the way up, the force acting in the reverse direction is the buoyant force acting on the wheel and is the opposite of the gravity force in a case of equilibrium. To simplify calculation, we will use the same value in both directions and we get in each wave cycle 2 times the force acting on each of the oscillator "wings." For the two sides we get 4 times the value of:

$$P = F \cdot v_{AB}$$
$$= W\cos\theta \cdot \frac{1}{2}\sqrt{12g(y_1 - y_2)}$$

When (y1−y2)=2 m.

And since we know the behavior of $\theta$ as a sinus wave varying $\theta \sim \omega^* t$ then the average power is calculated based on the rod velocity $\omega$.

Using $$\frac{1}{l}\sqrt{12g(y_1 - y_2)} = \omega$$

we get $\omega$=5 Rad/sec.

And the power generated is P=M·$\omega$=Fl·$\omega$

P=3.5 kg*2.4 m*5 rad/sec*4 which provides 168 Watts per apparatus per one wave period.

In an hour we have 360 waves (assuming 10 seconds per wave) and we get 60.5 kW/hr per apparatus oscillator device.

In this case the energy losses are only due to the electrical device transformation.

Overall Energy Output

The overall output per device we get will be the sum of the two components above; thus we get about 210 kW per hour. In a day we get 210 kW/hr*24 hrs=5040 kW.

Figure 25:
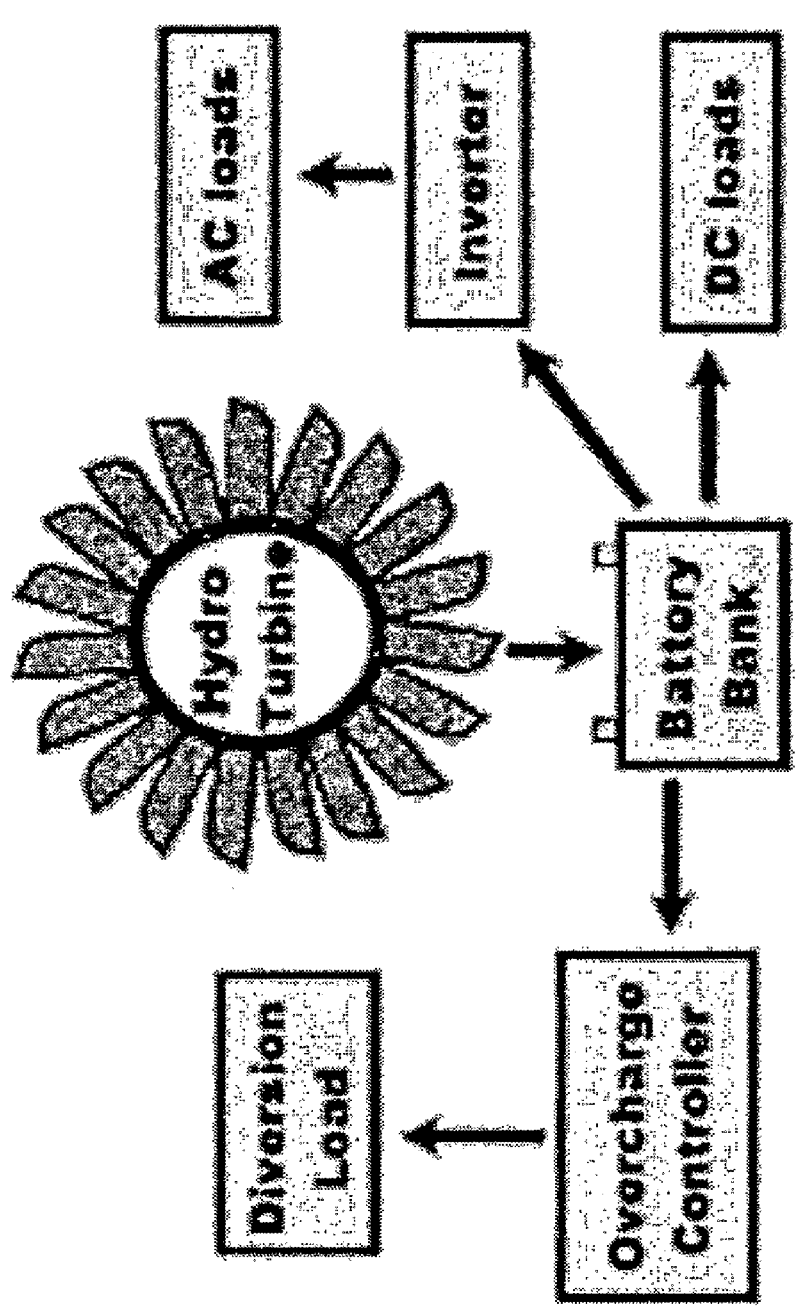
FIG. 25 is a diagram of energy losses from a hydro turbine.

By the time we can produce amperes and volts we get efficiency problems depending on the technology we use. (See FIG. 25 to visualize the sources of the losses.)

We used the pessimistic assumption for the power output because of losses predicted in the worse case, where only 10% of the fluid energy can be transformed to electric energy. On the other hand, we can be more optimistic by optimizing the components and technology, and gain another 15% at the maximum; thus we get 25% usable energy.

Conclusion: per day energy the minimum is 504 kW or maximum of 1260 kW. It can be also represented as a minimum of 21 kW/hr or a maximum of 52.5 kW/hr.

More Energy Gain

There are a few ways we can get more energy:

By a larger vane surface to get more flow on the wheel.

By a field of devices, we get more energy with the same apparatus.

By adding an artificial ramp and controlling devices to get higher waves.

Figure 26:
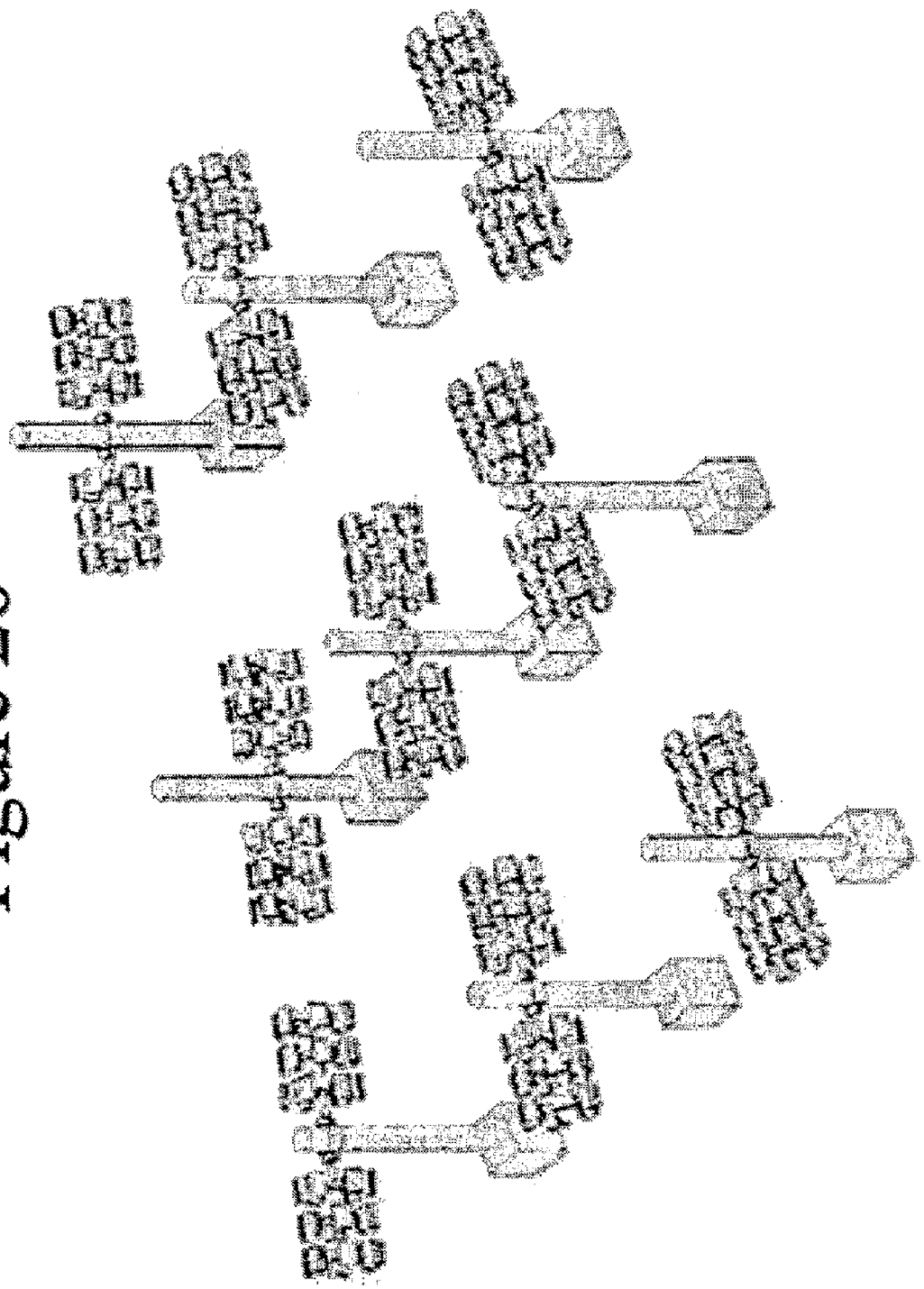
FIG. 26 is a diagram of the superior view of a unipile farm.
Figure 27:
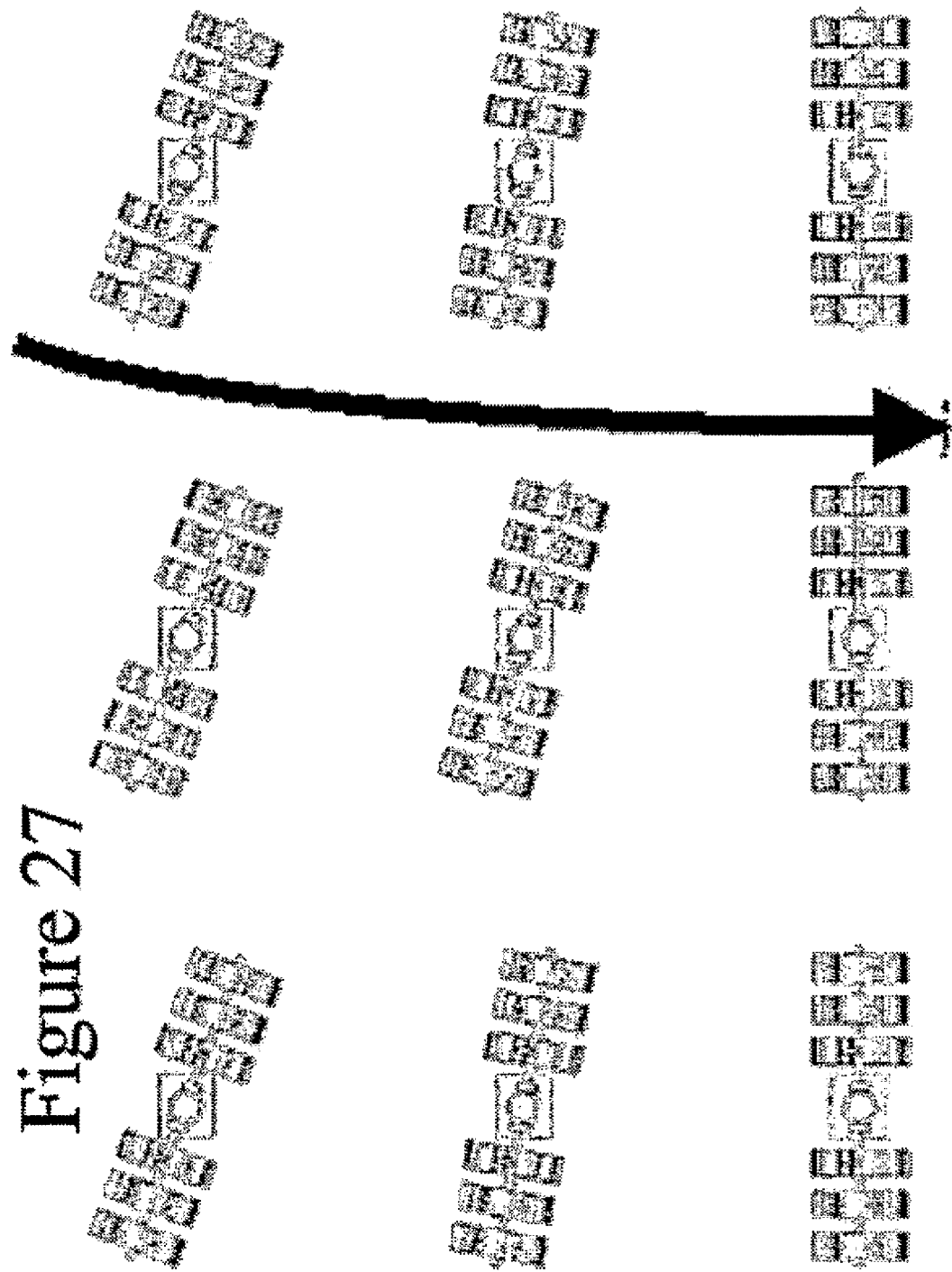
FIG. 27 is a diagram of the superior view of a field of unipiles.

In FIGS. 26, 27, 28 one can see how we gain even more energy in a field of devices.

Larger vanes with more flow capabilities will end up with larger energy and a larger configuration. We can achieve such configuration with a smaller sea bottom area but enlarge the flow per wavelength.

The UNIPILE

The Unipile is a simple vertical rod that can use the wave surface energy and at the same time a piston movement to get the potential energy (using moving parts weighing in one embodiment 80 kg) of the up-down movement. (FIG. 20) In FIG. 20, the paddles or other energy capture device are ideally located near the top of the rod. In the ideal embodiment, a single rod holds the paddles and inserts into a generator system by functioning as a piston. In other embodiments, at least one rod may be part of the piston generator system. There is a minimum of one paddle wheel mounted on the vertical rod. A connection means connects the paddle wheel system to the vertical rod and to a generator. In the ideal embodiment, the number and size of the paddle wheels on each side is balanced. The ideal embodiment is 3 paddles on each side and each set of three paddles is in close proximity to the others. Not shown in this picture are the embodiments of ramps and wing-like structures underneath the paddle systems. In the ideal embodiment, a control means directs the paddles to the ideal position relative to the fluid flow. This control means may either be via the rotation of the vertical rod that functions as a piston, the holder for the piston-like rod, or the holder may be attached to a movement means on a pile. Although named a "unipile," that is the ideal configuration for shallower water; in deeper water, the unipile is ideally connected to a pile that extends to the bottom of the body of water, or to some other supporting structure. We call this a polypile.

We can demonstrate the production of energy from one single post with two arms hanging out and paddles rotating on surface level.

This configuration can combine deep-water energy generators from other inventions or the methods described for obtaining energy in a submerged device in the current invention at greater depths by attachment to the infrastructure of the polypile; by using the same infrastructure one can reduce cost.

The Energy Field

The flow acting on each device will tend to balance the wave forces; thus each device will face the wave front relatively accurately. The energy farm will be set up so that no unipile paddle systems contact each other—in the ideal embodiment, in 360 degrees, if the machines are rotatable. (FIGS. 26-28)

The Ramp Energy Field

Using the ramp to speed up the surface velocity produces more energy (paddle speed) by acceleration of the paddles' rotation and by lowering pressure. It should be noted that the break point of the waves should not be reached. Otherwise we reach the limit of turbulence and loss of energy. Part of the device and method of the current invention is to include a microprocessor that controls the system for different wave conditions.

The major gain in the calculations from the addition of a ramp is a result of effect on the speed.

FIG. 28 shows an embodiment of the ramp concept. The picture shows a single, connected, large ramp. Another embodiment would be for each unipile to have its own ramp, and the unipiles with individual ramps are arranged together to form one substantially contiguous ramp underneath the energy capture devices, whether the devices are on the surface or submerged. The ramp as shown is a hybrid of a ramp and a wing-like structure. The ramp portion—the upper surface—functions to increase wave amplitude and thereby increase the capturable vertical energy. The fact that it is shaped like a wing with a solid or hollow volume superior to the horizontal line enables the application of Bernoulli's principle by increasing the speed of the water above the ramp. Embodiments are also possible with a basically planar set of ramps, wing-like objects without ramps, and wing-like objects inferior to the paddles or other surface energy capture devices in addition to a lower ramp. Part of the method of the ramp use is to determine the ideal configuration under changing wave conditions.

In the case of a unipile with an individual ramp unique to it, a control system can determine its angle and orientation.

Energy Gain Summary

According to the calculation and the assumptions mentioned previously the energy gain from the paddle rotation only in each of the different configurations is summarized in the set of tables below in kilowatts/hour.

| Energy [KW] | Original (1) | Wide Vane (2) |
|---|---|---|
| Min. | 54.4 | 624.6 |
| Max. | 136.2 | 1561 |

| Energy [KW] | UNIPILE (3) 4 paddles | UNIPILE (3) 6 paddles |
|---|---|---|
| Min. | 2498 | 3811 |
| Max. | 3811 | 9369 |

| Energy [KW] | FIELD (4) 4 paddles | FIELD (4) 6 paddles |
|---|---|---|
| Min. | 22,500 | 33,700 |
| Max. | 56,200 | 84,300 |

| Energy [KW] | +Ramp (5) 4 paddles | +Ramp (6) 6 paddles |
|---|---|---|
| Min. | 33,500 | 83,900 |
| Max. | 130,900 | 327,200 |

Notes:
(1) Where effective flow section is 0.0015 m2 and paddle radius 119 mm (r)
(2) Where effective flow section is 0.017 m2 and paddle radius 360 mm
(3) The UNIPILE configuration is symmetric with 4 or 6 paddles
(4) The FIELD is of 9 devices in an array configuration with 4 and 6 paddle options
(5) The Ramp is of 9 devices in an array configuration and speed gain of 30%
(6) The Ramp is of 9 devices in an array configuration and speed gain of 60%

Potential Energy Gain

The oscillator energy in the unipile methods is simpler and works as a vertical piston movement.

All the potential energy transforms to kinetic speed (the friction losses are minimal due to vertical movement if the system is well balanced and uses slip bearings) and power will be generated from the mass moving up and down according to the wave period. This energy is purely mechanical and it relies on the wave movement to generate motion in the vertical direction.

Assuming that the vertical motion varies between 2 and 10 meters in different locations, one can calculate the energy gain. The table below summarizes the output of such energy. (Note that the ramp, viewed with conservative assumptions, adds more energy through the increased speed than it does to the vertical motion. That is why the potential energy—not the total energy—here is less than without a ramp.)

| Energy [KW/h] | UNIPILE | FIELD | Ramp** |
|---|---|---|---|
| 2 m wave (H) | 530 | 4,778 | 3,378 |
| 5 m wave (H) | 839 | 7,555 | 5,852 |
| 10 m wave (H) | 1,187 | 10,685 | 7,555 |

**calculated with average height because of ramp's slope.
Notes:
There are 30% losses from the mechanical parts.
The moving weight of each device is about 80 kilograms.
The period time of the wave is 10 sec.

We used the conservative assumption that the piston generator only works from top to down (Crest to Trough). If one will use it also down to top, theoretically its potential energy can be multiplied by two.

Conclusion on Wave Conversion

The vertical movement can add 20%-25% from minimum to maximum range. On the array configuration, the paddle rotation is the dominant factor.

The Use of Each Apparatus

The use of each apparatus depends on the wave size (length and height).

The unipile as shown is the ideal embodiment. For the configuration using the universal joint, note that the rod connected by the universal joint to the central rod will have to move to accommodate the vertical motion, or some other component of the system will have to move to accommodate the vertical motion.

Universal Joint Apparatus

The Universal Joint device is ideally limited to shallow water and low amplitude waves. The size of the device in the vertical direction is small but it needs longer shore area and therefore fewer units can be mounted. The limitation of such a device is the long arm needed to achieve potential energy and the ability to keep a stable and balanced position on the wave surface.

The Unipile Apparatus

This device needs slightly deeper water to become affective because of the load it can carry with the multi-paddle arrangement. Each pile can hold many paddles compared to the Universal Joint device and therefore the design is more robust. Its capability of serving in a field arrangement helps to get higher levels of energy within smaller areas than the other device.

Wave Speed Calculations

Figure 29:
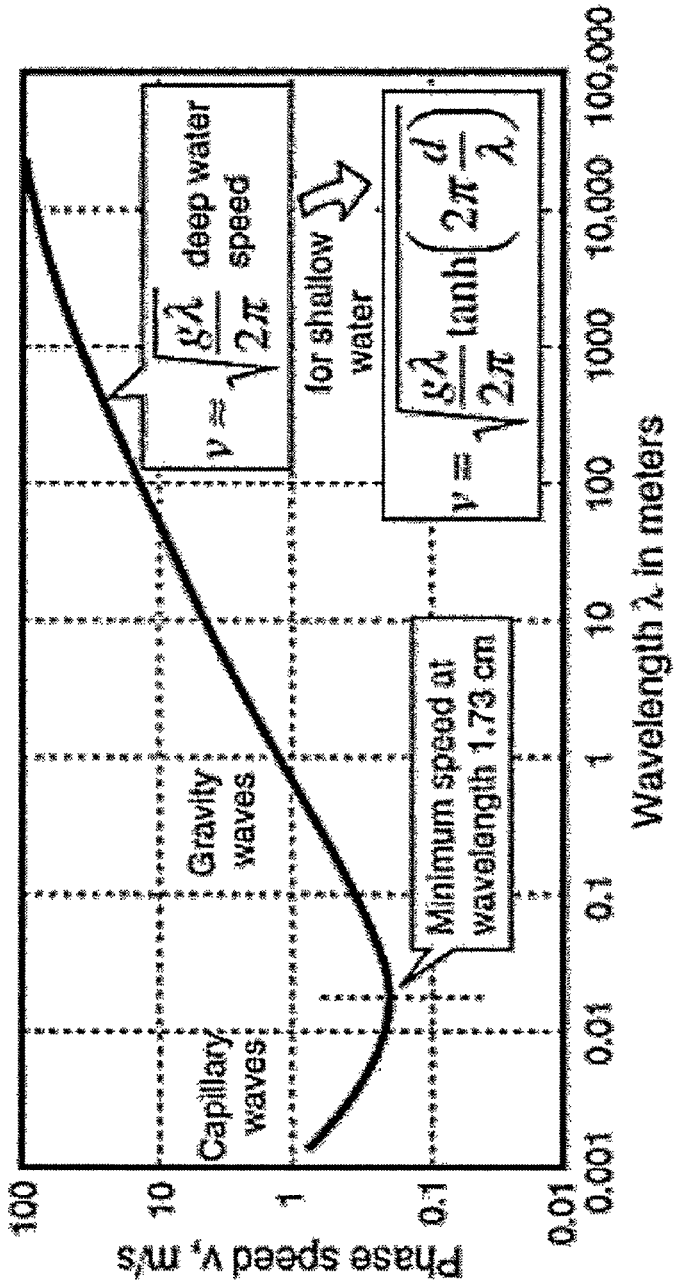
FIG. 29 is a diagram of wave speed and wavelength.

FIG. 29 illustrates the calculation of wave speed for the purpose of calculations. The speed of the surface wave is also called celerity or phase velocity because it corresponds the speed to the shape of the wave, but is different from the speed of the water particles. This celerity is well approximated by $$c = \sqrt{\frac{g\lambda}{2\pi}\tanh\left(\frac{2\pi d}{\lambda}\right)}$$

where $c$=phase speed in m/s;
$\lambda$=wavelength in m;
$d$=water depth in m;
$g$=gee in m/s2.
In deep water, where $$d \geq \frac{1}{2}\lambda, \text{ so } \frac{2\pi d}{\lambda} \geq \pi$$

and the hyperbolic tangent approaches to 1, c approximates $1.25\sqrt{\lambda}$.

Figure 30:
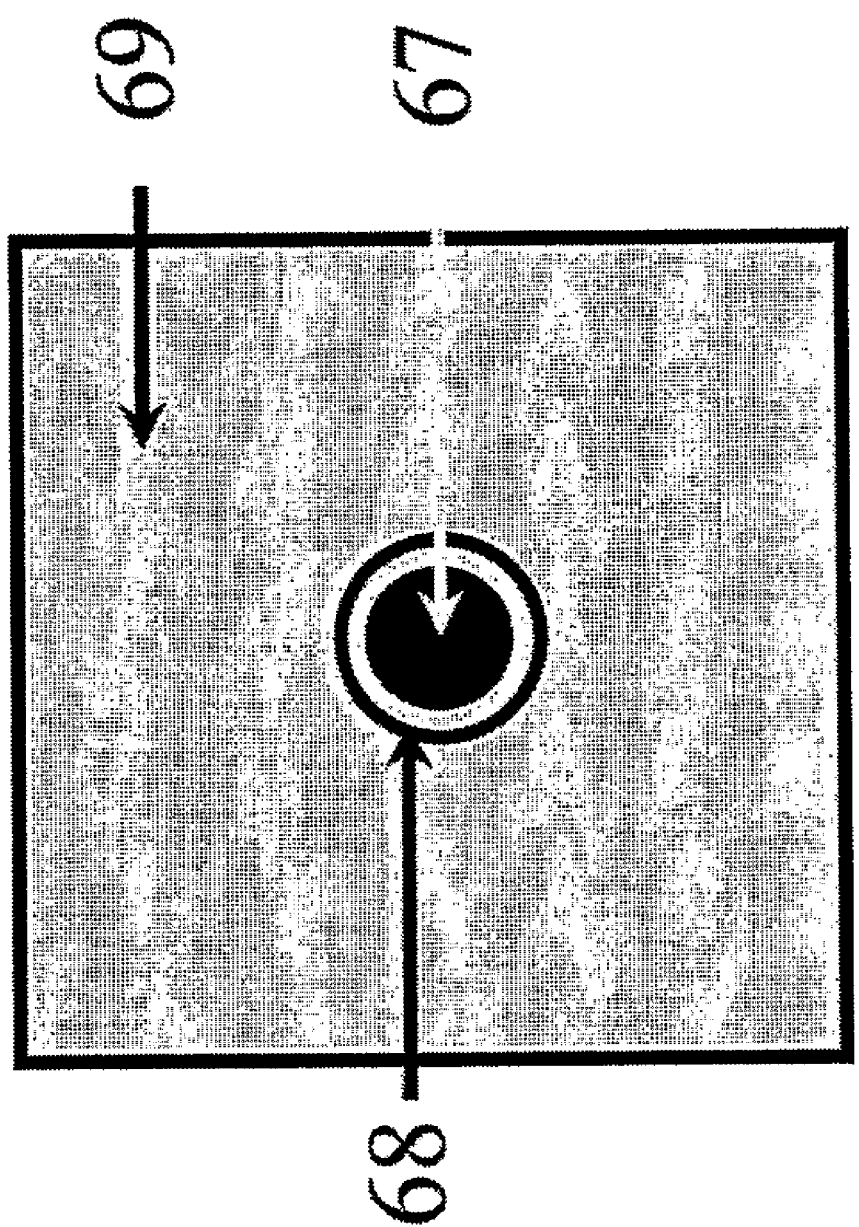
FIG. 30 is a diagram of the superior view of a ramp attached to and surrounding a unipile.

FIG. 30 is a superior view of a unipile with its own ramp system. Part (67) is the cross-section of the vertical pile support and moveable piston system. It is surrounded by an empty space so that the ramp does not chafe on the vertical bars as its orientation is adjusted. Then part (68) is the inside edge of the ramp system. Part (69) is the ramp system itself. FIG. 30 shows a square ramp as the ideal embodiment with a hole in the center larger than the size of the unipile that holds it so that it can be tilted and moved. In the case of a polypile (a long pile that includes a unipile attached closely to its uppermost section), the hole will need to be larger, and the ramp as shown would be attached to the polypile. The polypile could also have horizontal extensions that hold unipiles out to the side so that the ramp does not contact the polypile. In ramps that are made to be stationary, the hole is optional. In addition, the ramp may have a greater slope at the beginning of its upward ascent than at the end. In fact, that is advantageous in order to prevent breaking of the wave once a situation of maximal wave height has been reached. One of the objects of a controller for the system will be to regulate the height and slope of the ramps so that optimal conditions are reached. In another embodiment, the ramp may rise and then become flat on its superior surface.

Figure 31:
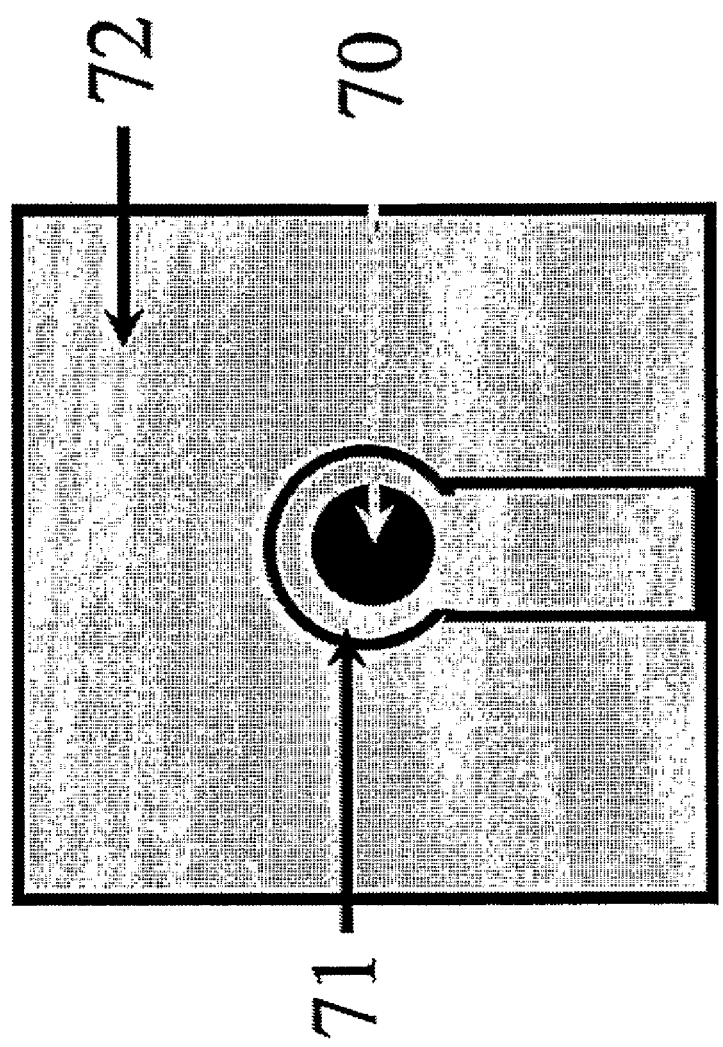
FIG. 31 is a variant of 30.

FIG. 31 shows a variation of FIG. 30. In this case, a central hole (71) is extended to the end of the platform in a keyhole shape so that the platform (72) can tilt in many directions around the central vertical structure (70) while the central hole can be kept small, as long as a machine is present to rotate the platform.

Here also, "ramp" may refer to an essentially board-like flat arrangement, a thicker arrangement with one substantially horizontal surface and a superior sloping surface, or a superiorly winged surface with a substantially flat inferior surface, as shown in FIG. 11. Different unipiles in a field may have different types of ramps.

FIG. 11 shows some possible configurations for both wings and ramps. Ramps function to increase the wave amplitude and speed above them. Different embodiments include any of the ramp shapes shown, any of the wing shapes shown, and different connectivity options to the surface component of the energy capture device.

Figure 32:
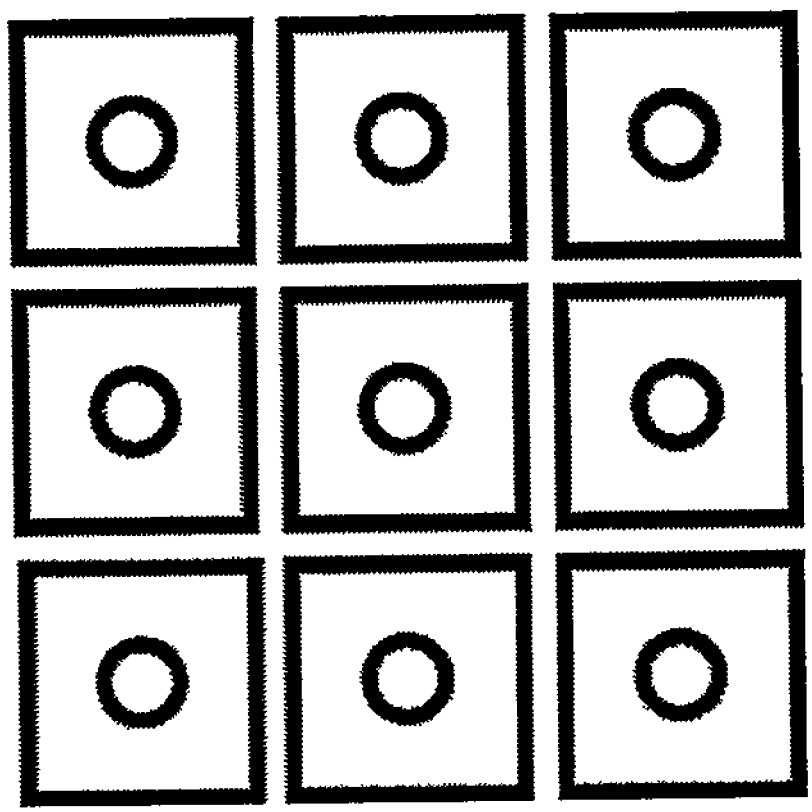
FIG. 32 is a superior view of a group of ramps.

FIG. 32 shows the ideal embodiment of the ramps of a unipile farm in a superior view, in which each unipile has a square ramp attached to a system that can move vertically on the unipile and/or tilt the ramp. In this way, the ramps can adjust as a system to waves from any direction. In other embodiments, the ramps may be polygonal or have other shapes.

Figure 52:
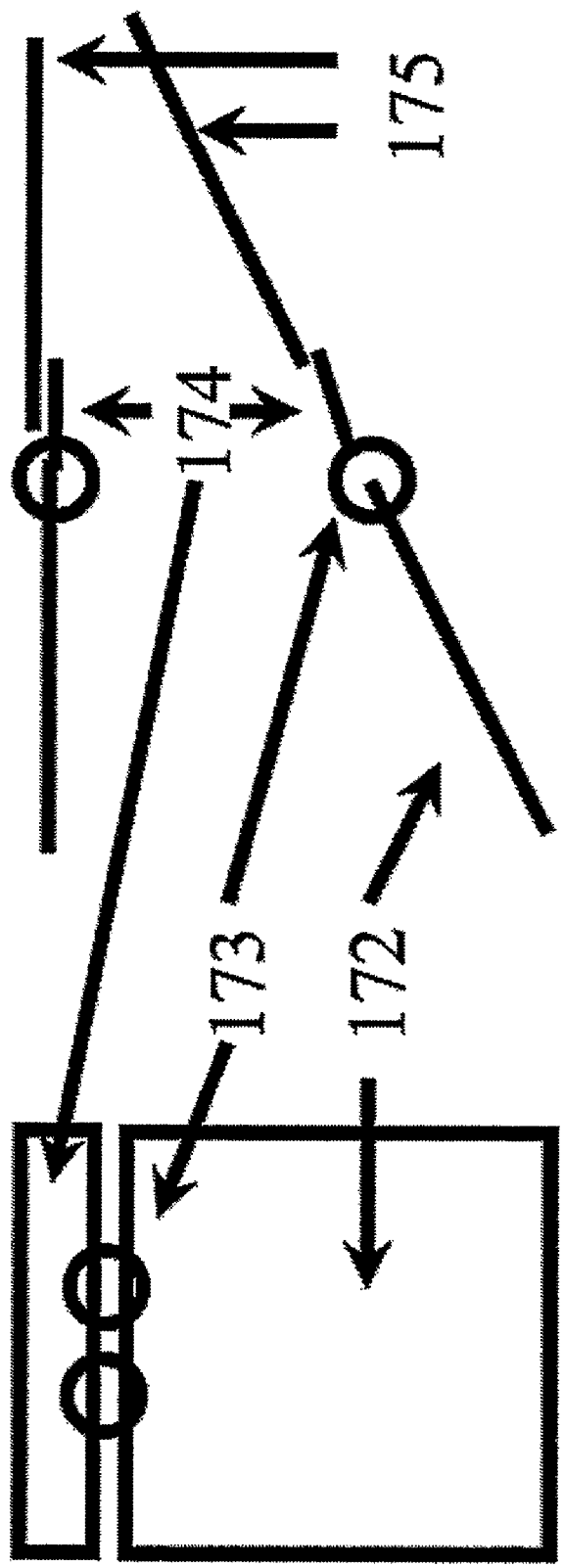
FIG. 52 is a superior and side view of a ramp extension.
Figure 53:
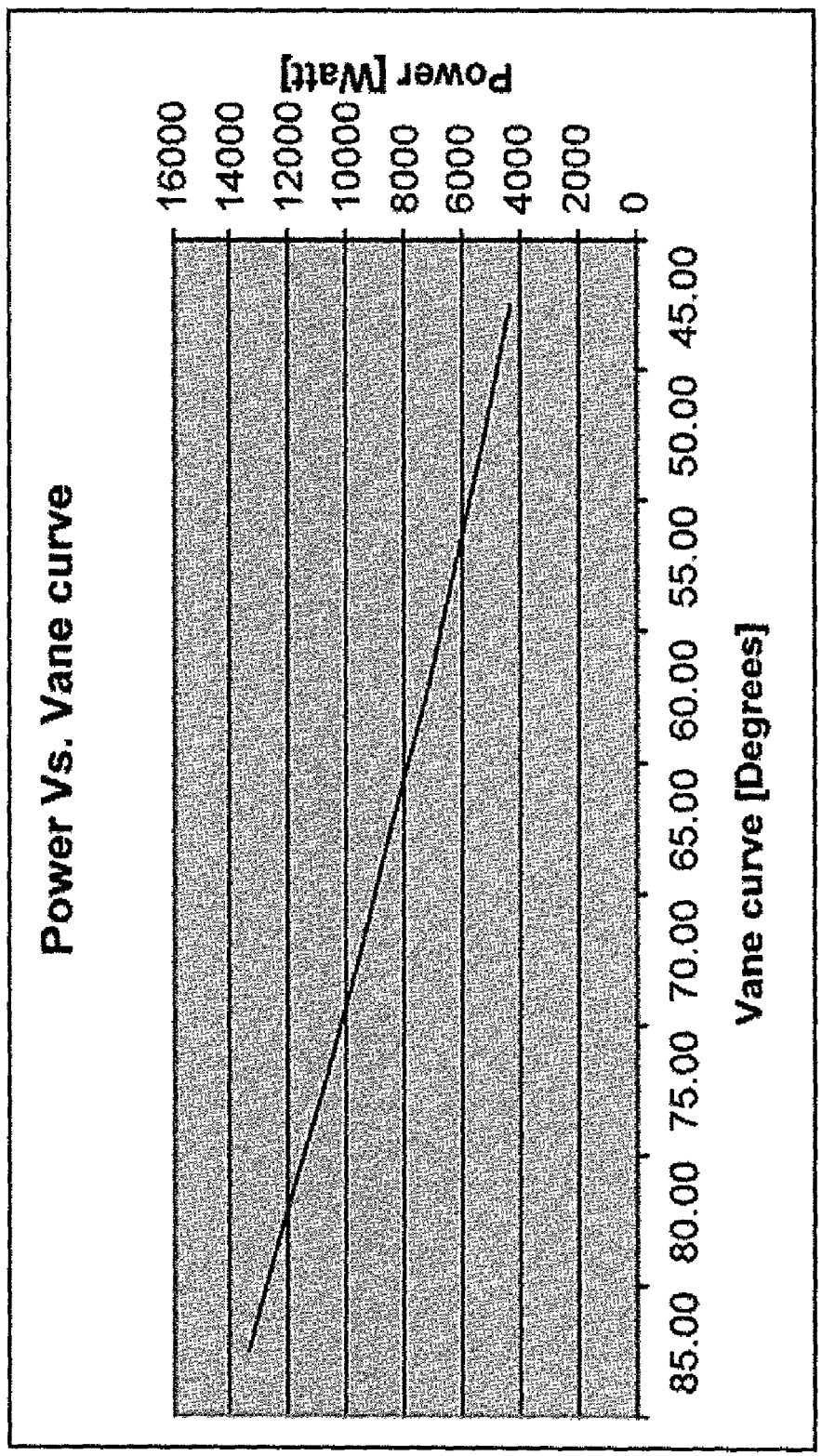
FIG. 53 depicts the power increase with paddle/vane angle growth.
Figure 54:
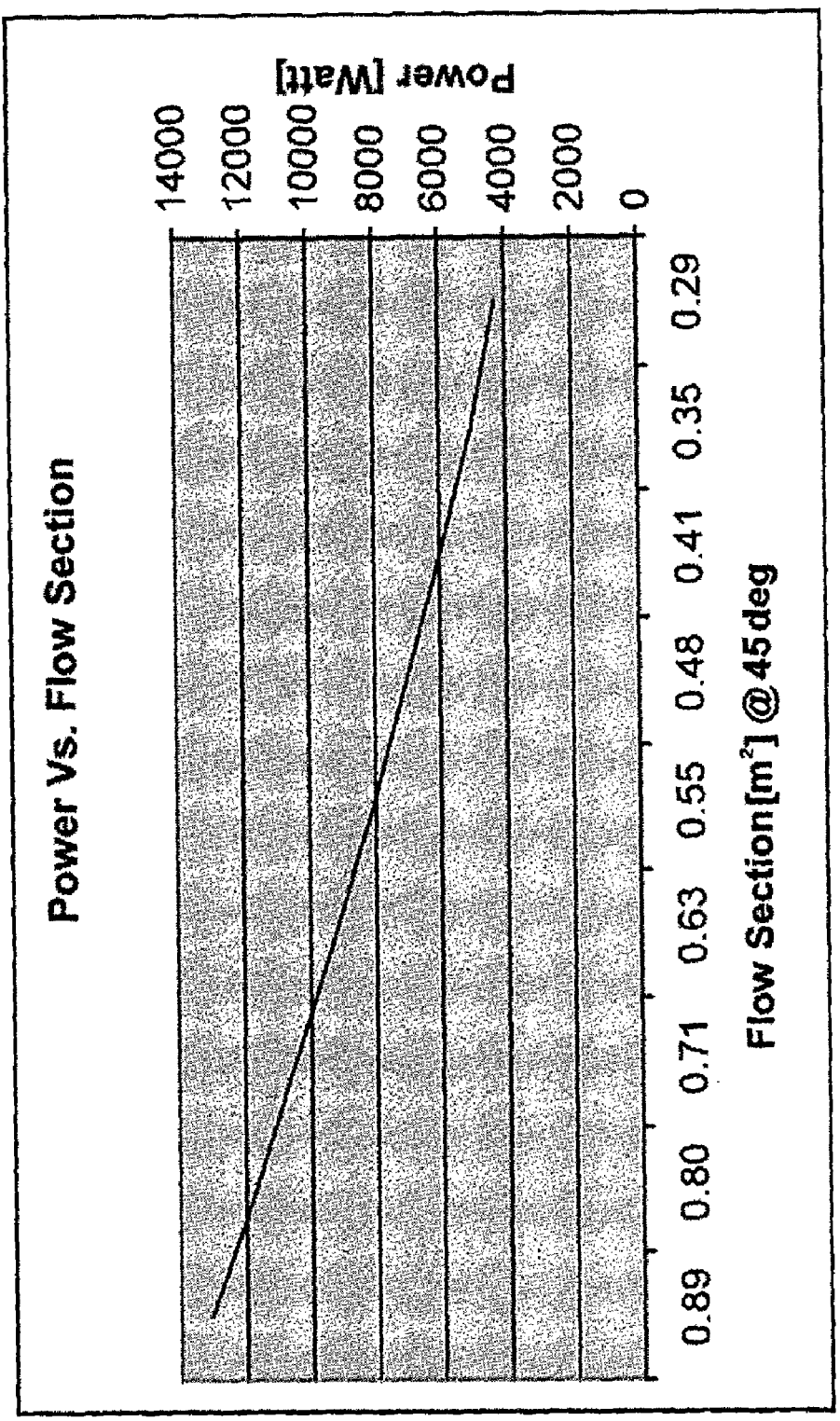
FIG. 54 depicts the power increase with flow capacity.
Figure 55:
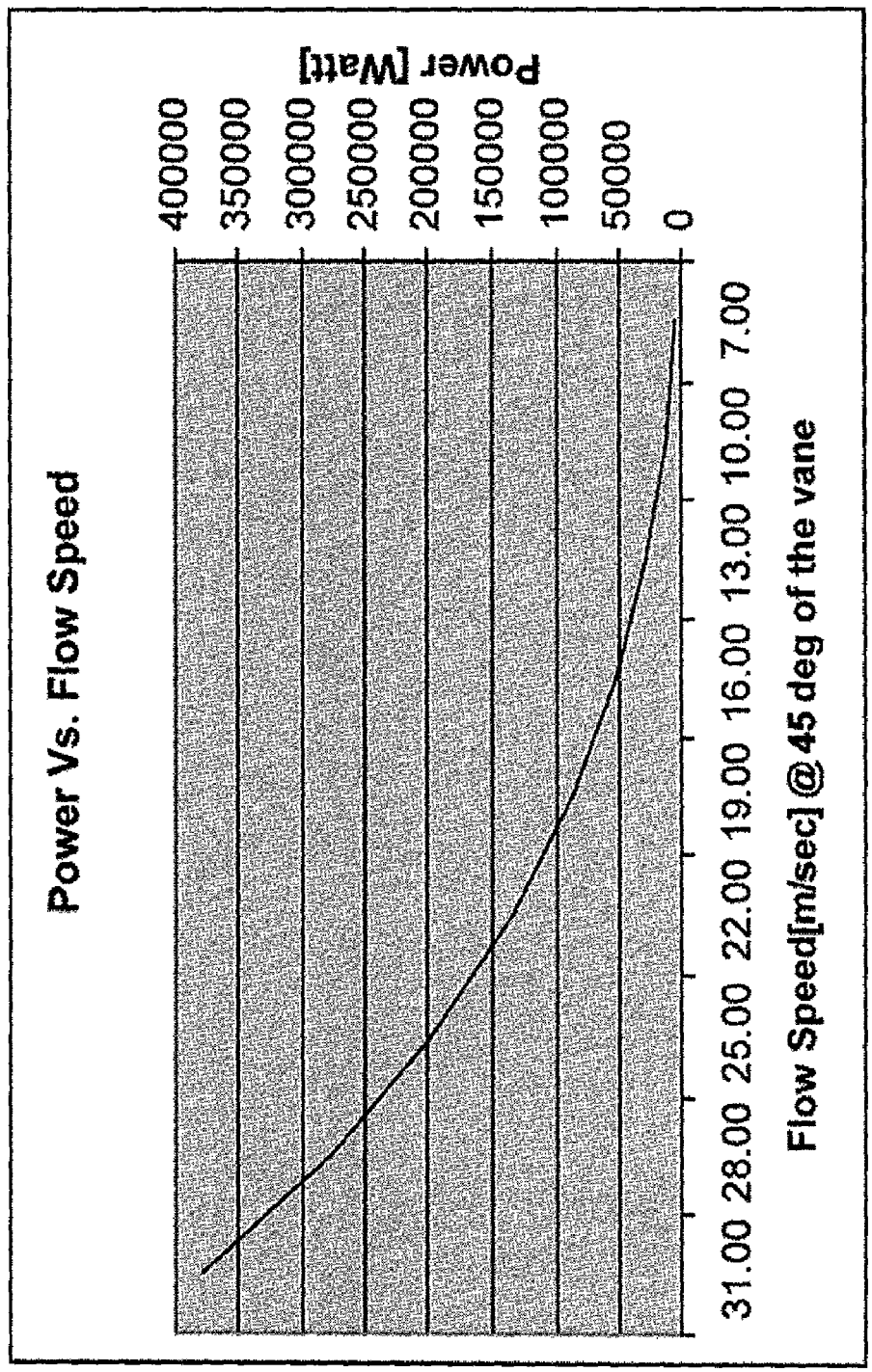
FIG. 55 depicts the power increase with inlet speed growth at 45 degrees.
Figure 56:
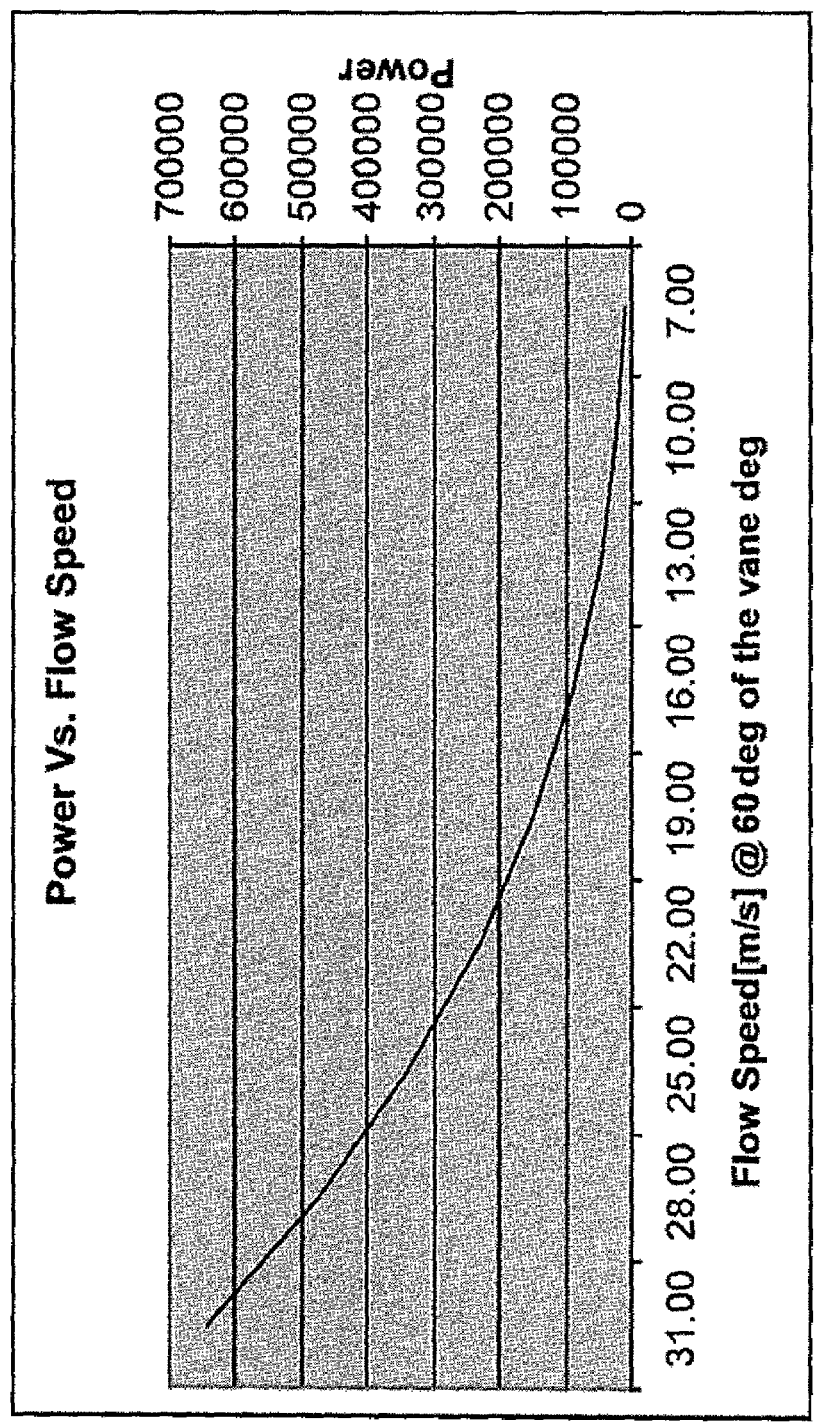
FIG. 56 depicts the power increase with inlet speed growth at 60 degrees.
Figure 57:
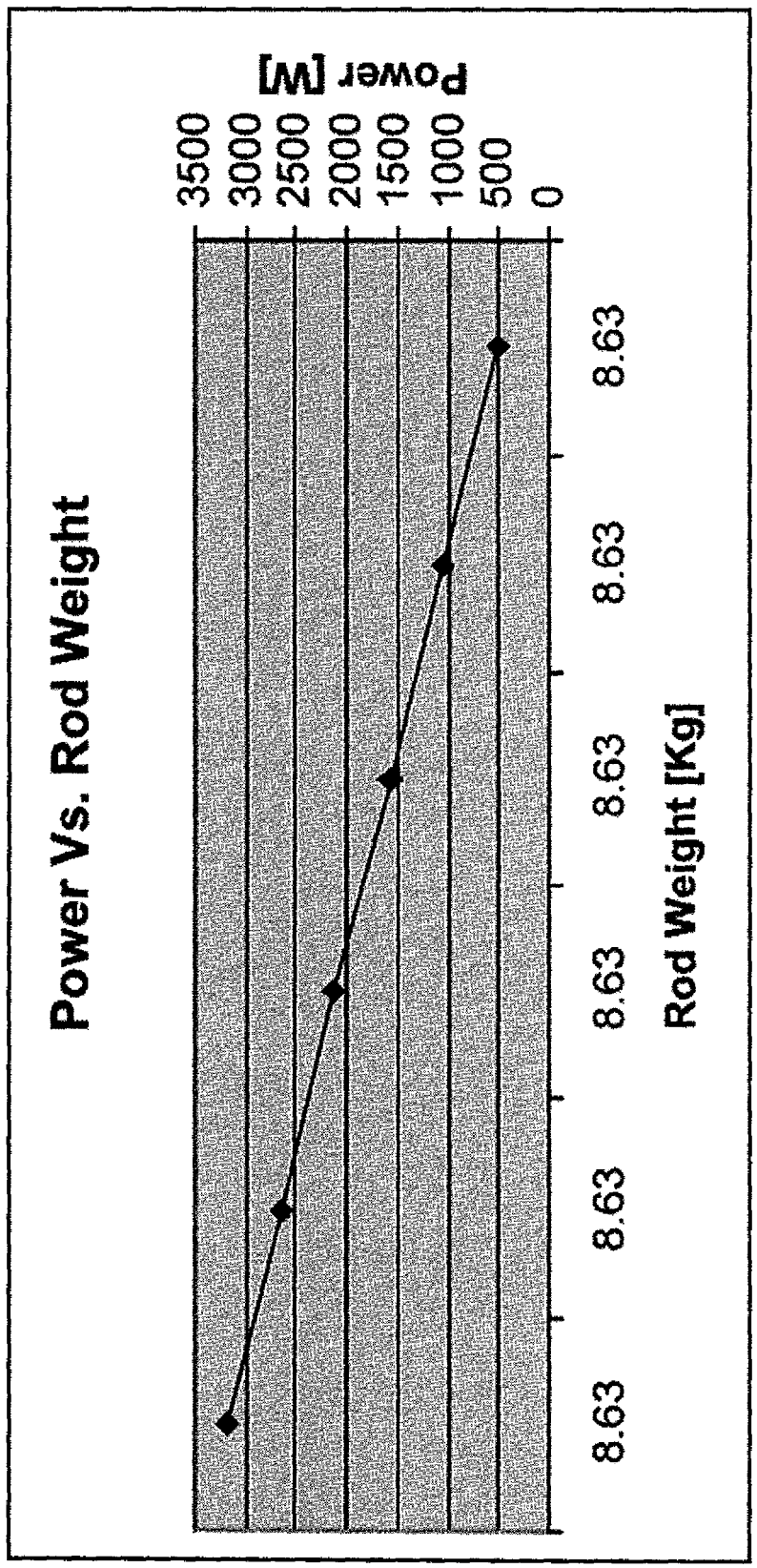
FIG. 57 depicts the power increase with oscillating rod weight.
Figure 58:
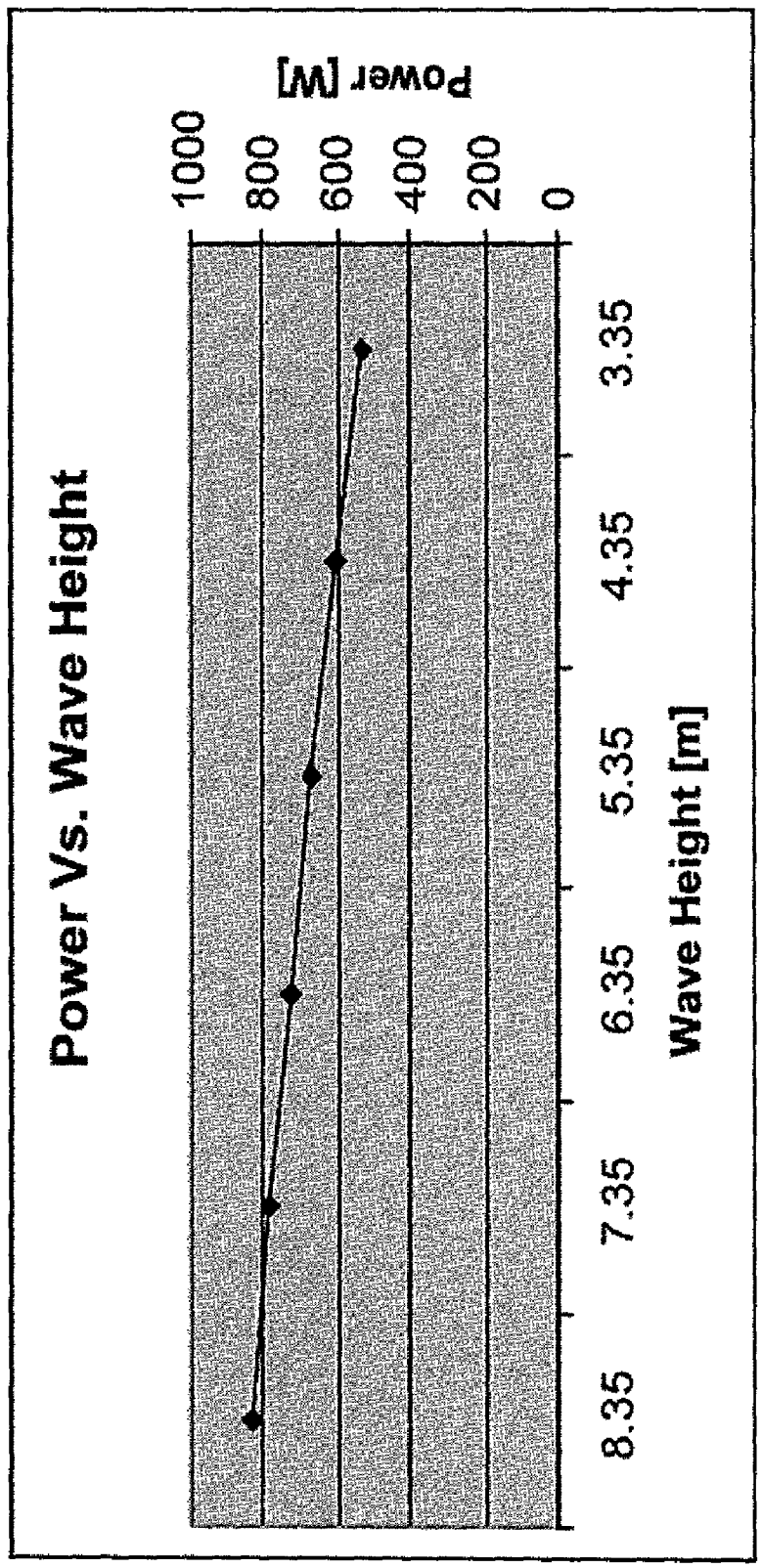
FIG. 58 depicts the power increase with wave height increase.
Figure 59:
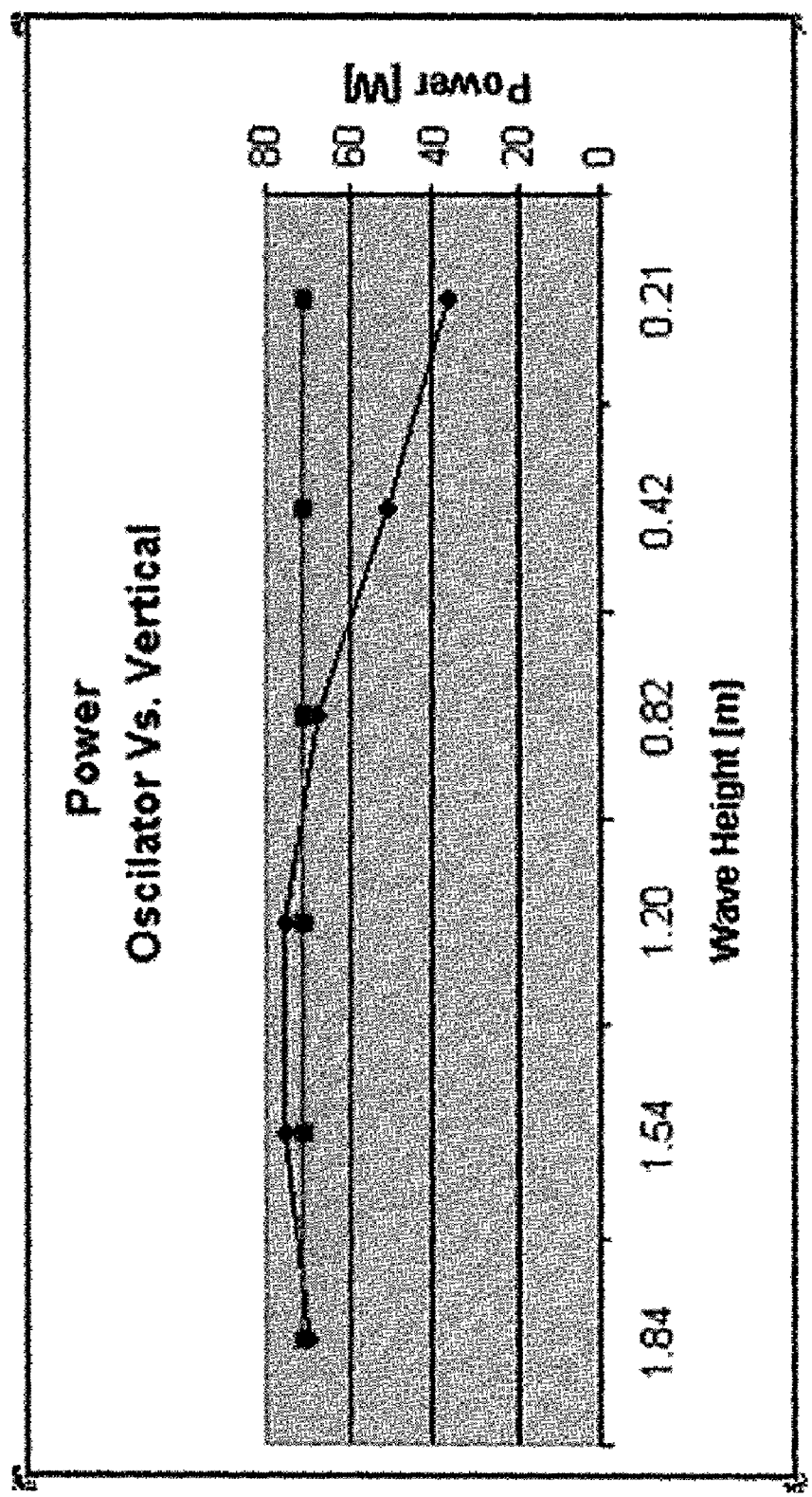
FIG. 59 depicts the power increase with wave height increase of oscillator vs. vertical.
Figure 60:
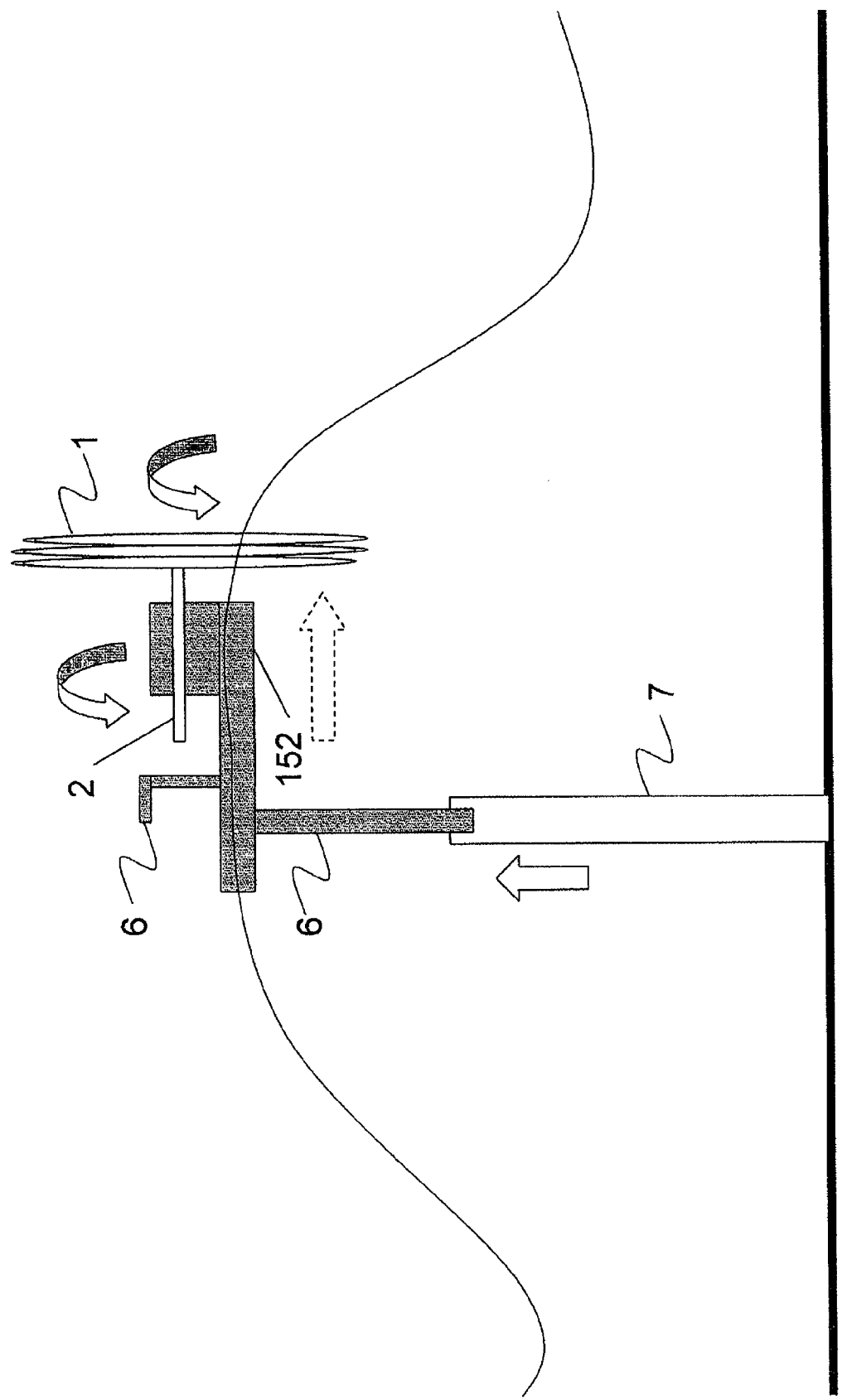
FIG. 60 is a schematic side view of a first embodiment of an energy capture system floating on water surface at a height defined by a wave crest.
Figure 61:
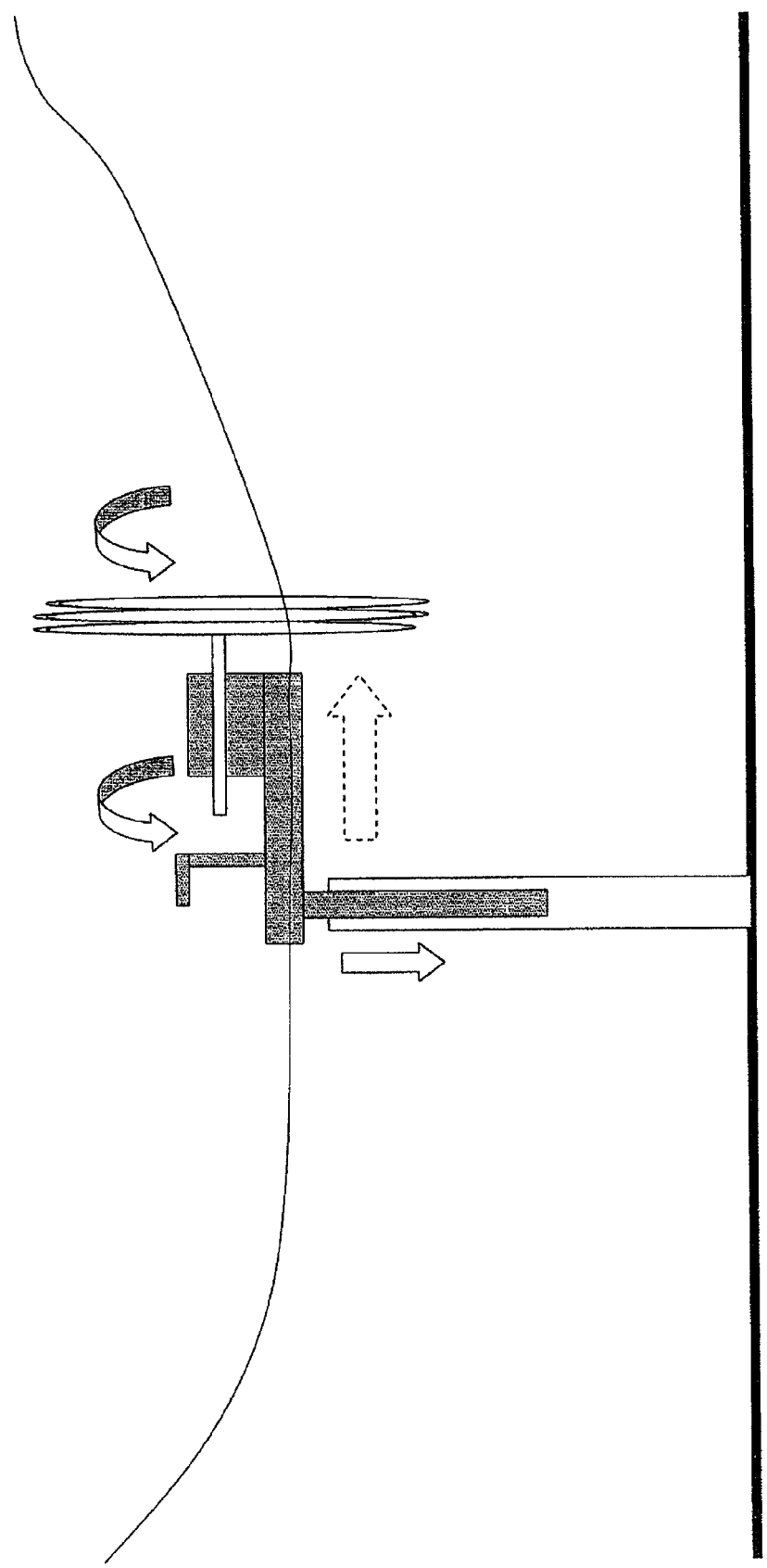
FIG. 61 is a schematic side view of a first embodiment of an energy capture system floating on water surface at a height defined by a wave trough.
Figure 62:
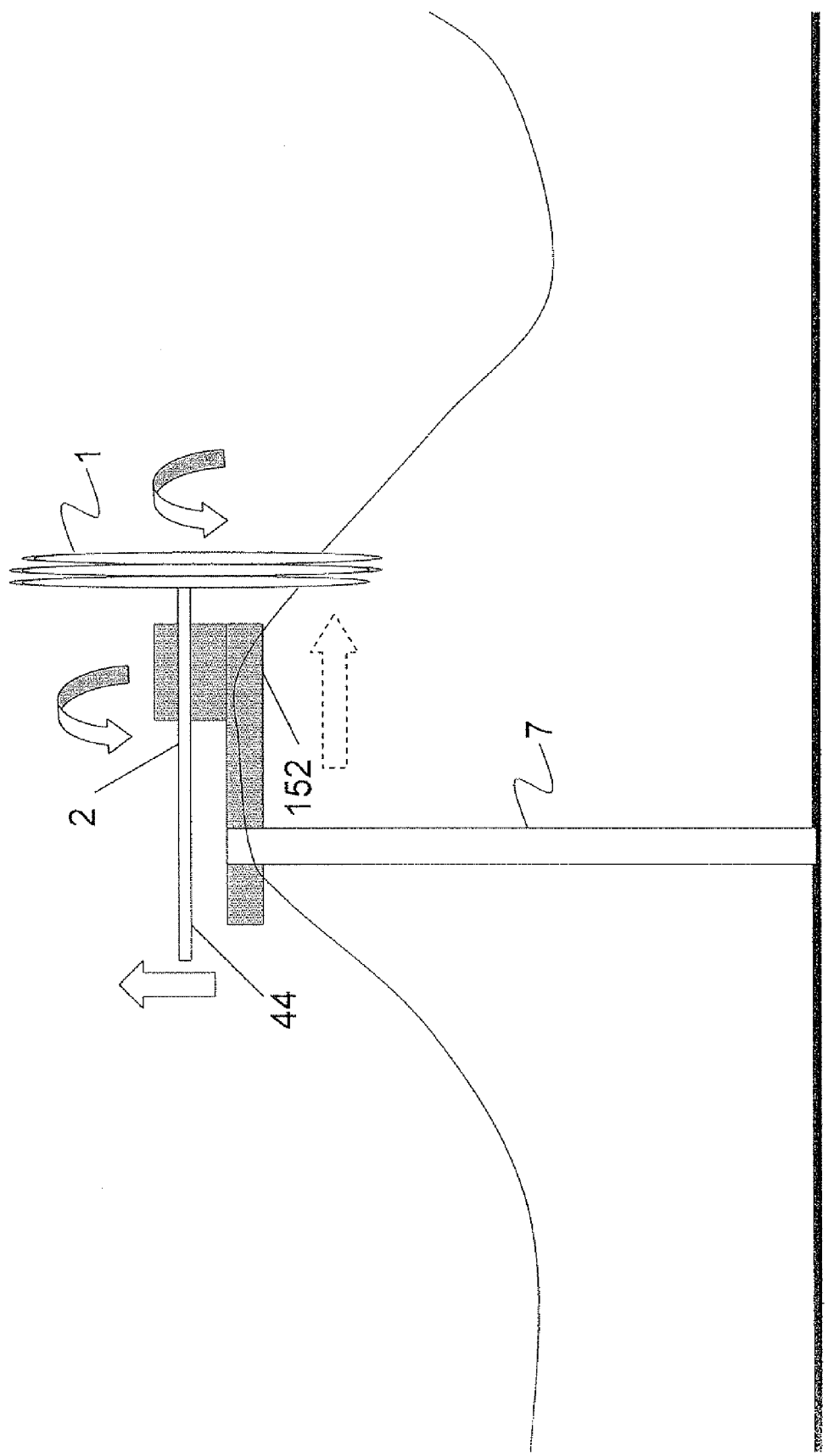
FIG. 62 is a schematic side view of a second embodiment of an energy capture system floating on water surface at a height defined by a wave crest.
Figure 63:
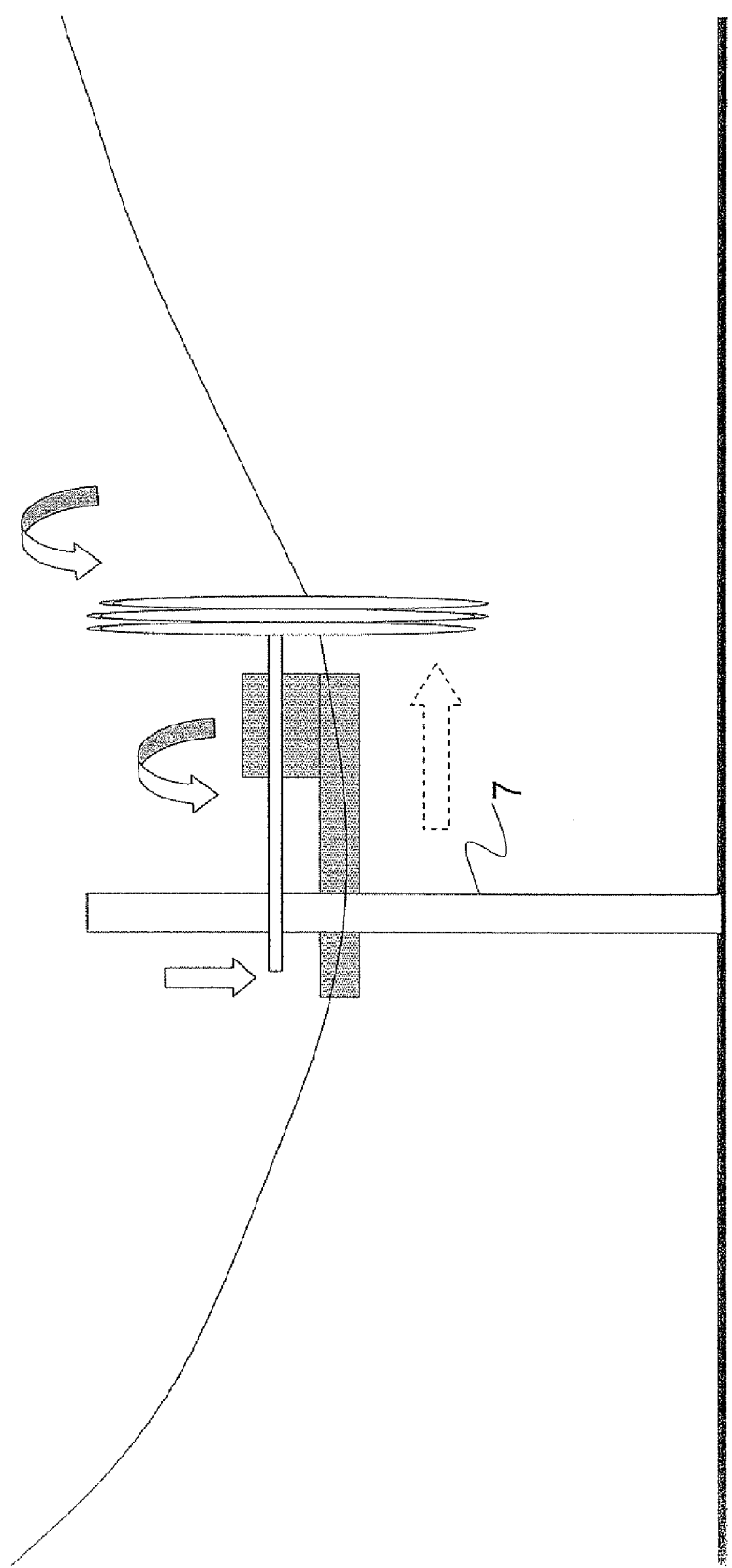
FIG. 63 is a schematic side view of a second embodiment of an energy capture system floating on water surface at a height defined by a wave trough.
Figure 64:
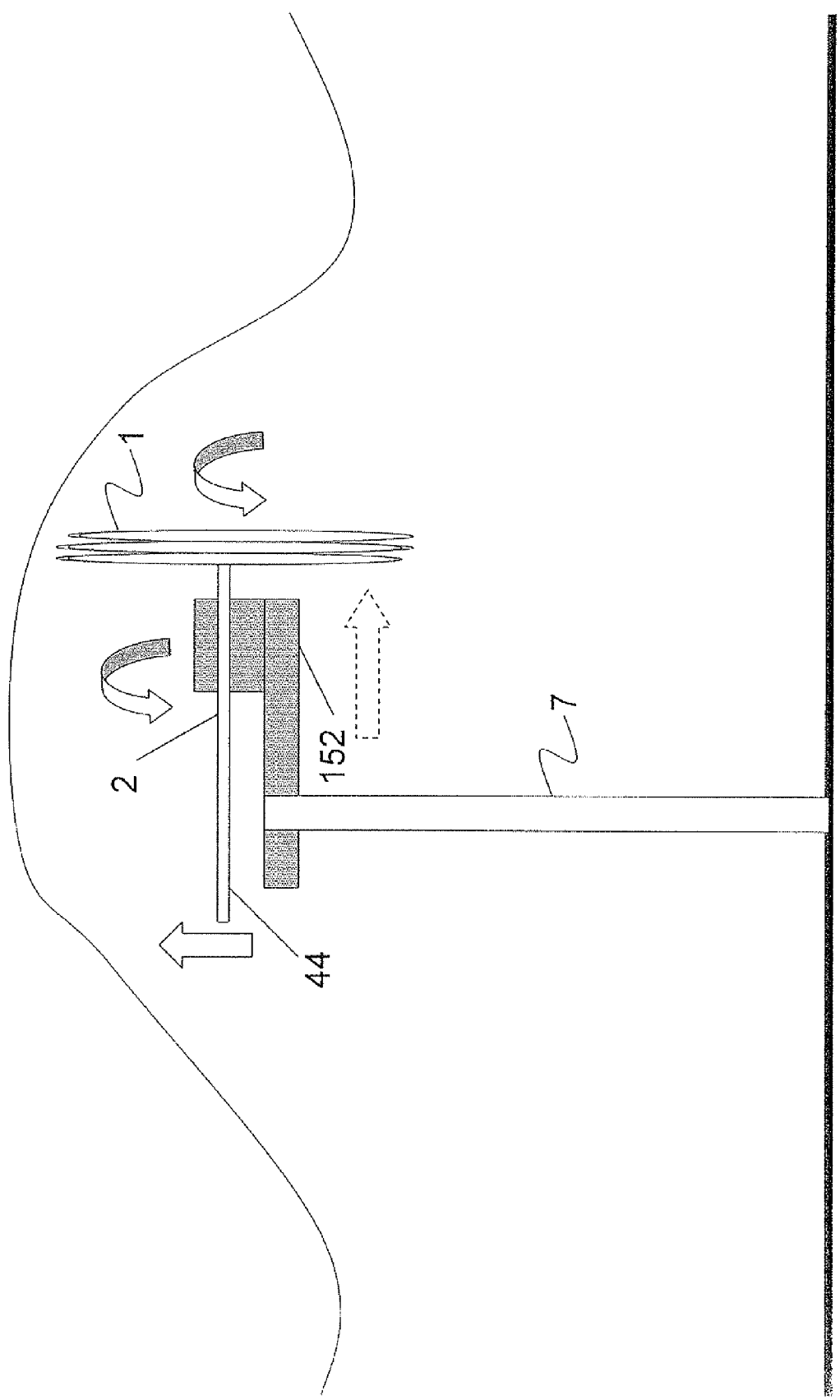
FIGS. 64 and 65 are schematic side views of the embodiment depicted in FIGS. 62 and 63 configured to float underneath the surface of a body of water, the height of the energy capture system changes as a function of the height of a wave carrying the system.
Figure 65:
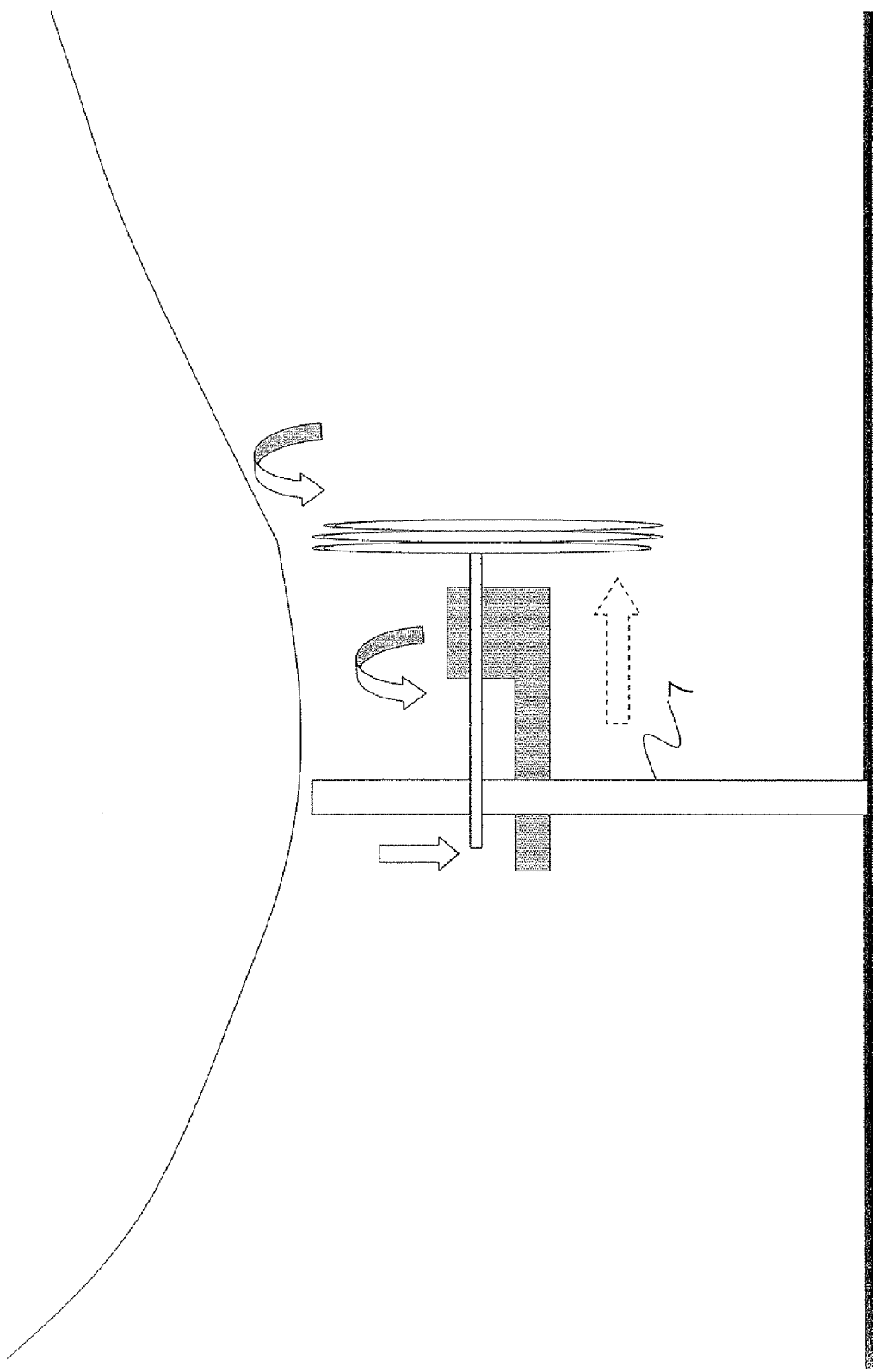

FIG. 52 is a superior and side view of a ramp extension. This solves the problem of the empty space between the ramps when they are sloped, because then they will not cover the whole horizontal area contiguously. This is not a huge problem, but the system will work better if it is solved. The left side of FIG. 52 shows the ramp platform (172) with a hinge (173) and an extension (174) on the hinge. Ideally, the water flow is from bottom to top in this part of the diagram. The diagrams on the right are side views. The upper one shows the position of the upper ramps when flat, with the first ramp in the direction of water flow from left to right adjacent to the second ramp (175). When the first ramp, and optionally the second, are tilted, in the bottom right diagram, the extension makes up the empty space in order to present a continuous surface to the oncoming waves.

Figure 33:
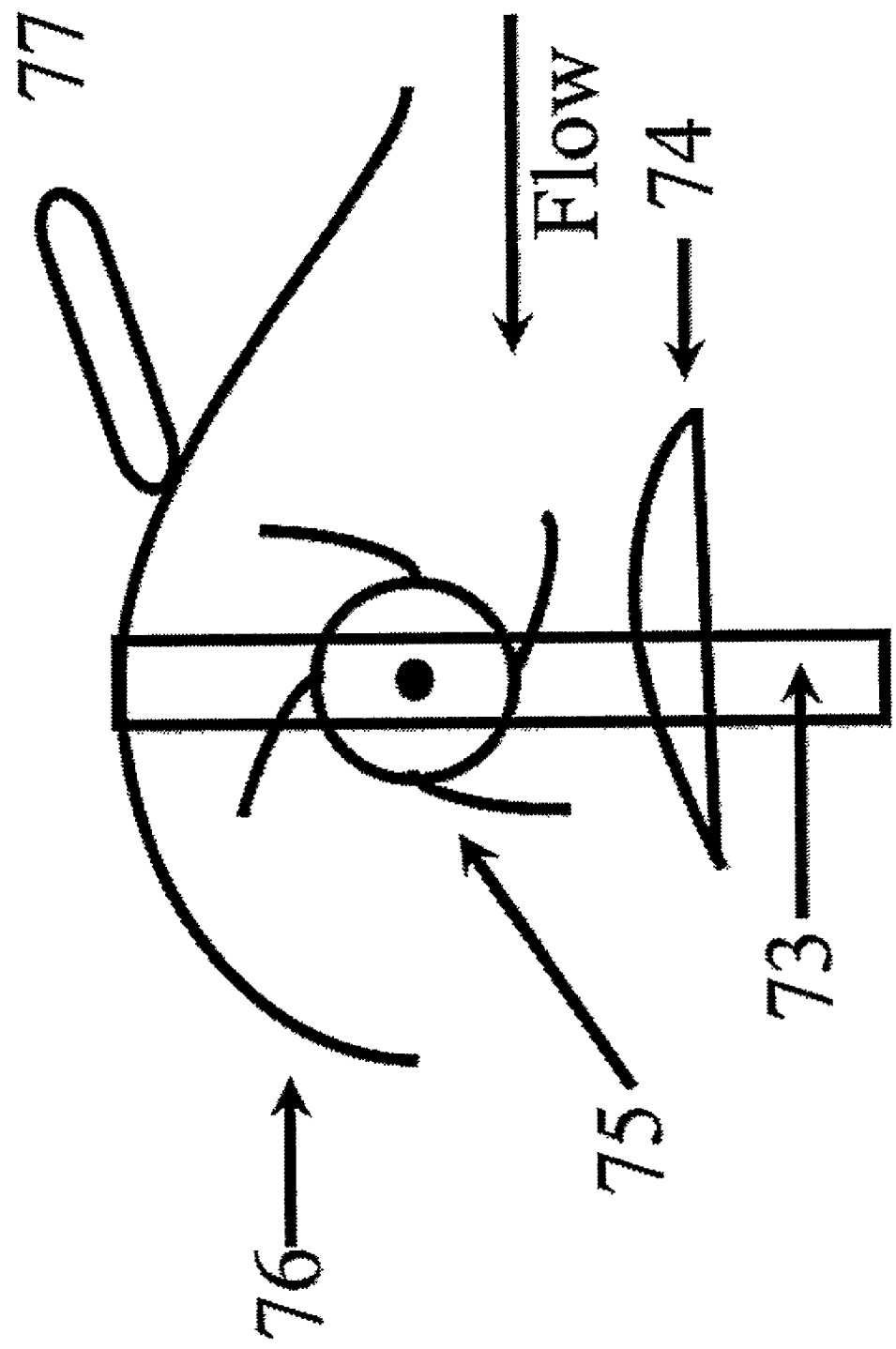
FIG. 33 is a view of a hood over a paddle wheel.

One common problem of all the embodiments of a paddle wheel structure is the need to decrease the resistance from wind or water as the paddles turn. FIG. 33 is the cross-section of a configuration that is well suited to a submerged situation but can also be used at the surface to decrease wind resistance. In one configuration, the paddle system shown is part of a unipile paddle system; in other embodiments, it can be associated with a separate paddle wheel. Part (73) is the piston section of the unipile (or other supporting means) which is connected to the generator which is part of the paddle wheel system. Part (74) is a flow deflection structure placed functionally inferior to the energy capture device, in this embodiment a paddle wheel. In the ideal embodiment, part (74) is attached to one of the vertical rods of the unipile, but it could be attached to other structures. The flow speeds up superior to the flow deflection device. A ramp or ramp/wing combination may also be used, but a wing is likely to be adequate, because of the lack of a water/air interface if submerged. The flow turns a paddle wheel (75). A housing (76) to the paddle wheel reduces the resistance to its rotation. This is the crucial point of the paddle design shown in this diagram. This housing is ideally rounded and has a radius slightly greater than that of the paddle wheel. The housing ideally is located so that it is semicircular with the ends of the semicircle oriented at a substantially horizontal direction and its radius is measured from the radius of the paddle wheel. At the leading edge facing the flow, in one embodiment, the angle of the housing facing the flow is more obtuse than on the trailing edge. In this picture, the paddle wheel is shown in its ideal embodiment as vertical, but it could also be oriented differently. The paddle wheel housing creates a similar increase in flow speed above itself, so several of these paddle wheels with their casings could be placed above each other on one submerged polypile. Part (77) is another embodiment comprising a tube that provides an optional air interface in the submerged configuration.

Figure 34:
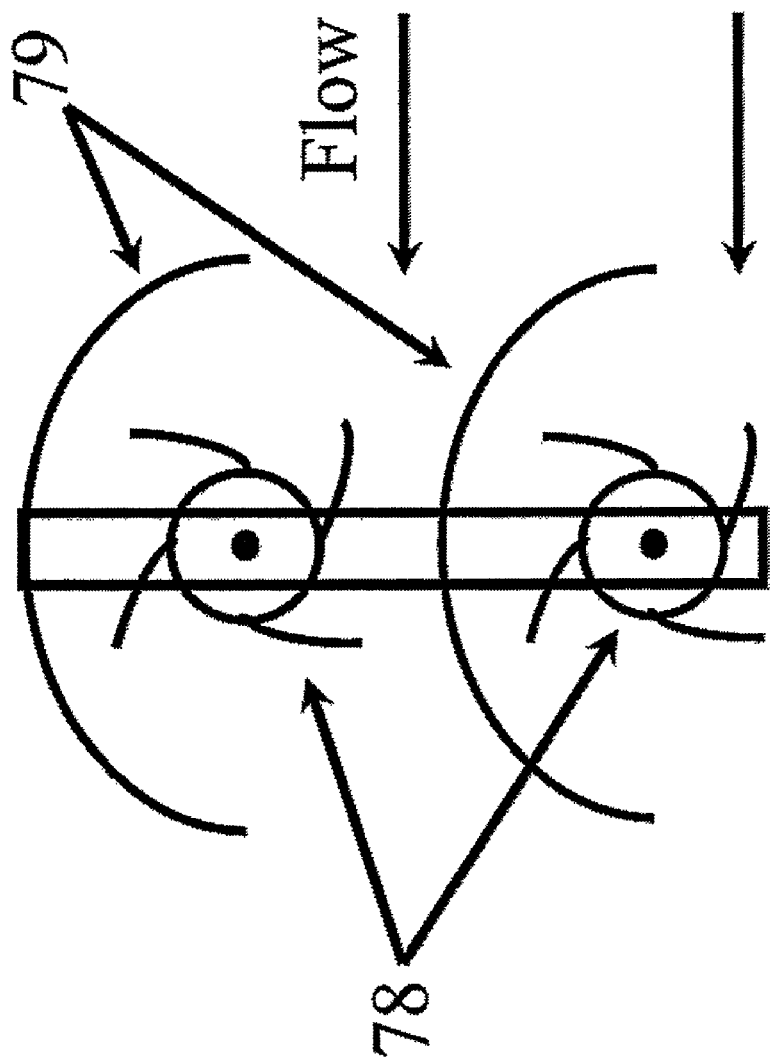
FIG. 34 is a view of two paddle wheels with hoods one above the other.

FIG. 34 shows in cross-section how a series of underwater paddle devices (78) can be arranged in a vertical stack, with the housing (79) of each providing the wing-like structure for the device above it by creating in effect a larger upper camber and a smaller lower camber.

Figure 35:
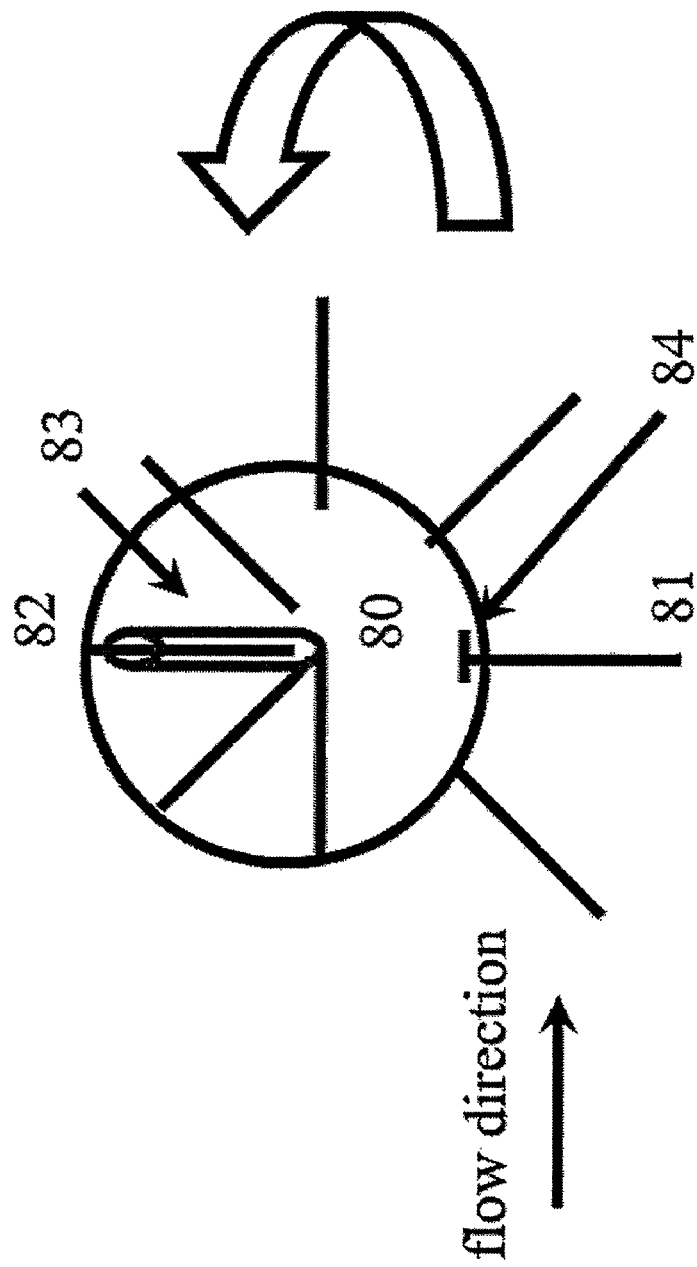
FIG. 35 is a diagram of a paddle wheel that automatically decreases wind or wave resistance.

FIG. 35 is a diagram of a paddle wheel that automatically decreases wind or wave resistance. Part (80) is a mostly hollow central cylinder. (81) represents the paddles. They have a small piece (84) at one end, or similar means, to prevent them from falling out. (82) shows how a paddle sinks back into the cylinder from the effect of gravity. Part (83) shows a guide that allows the paddle to slip in and out of place.

Figure 36:
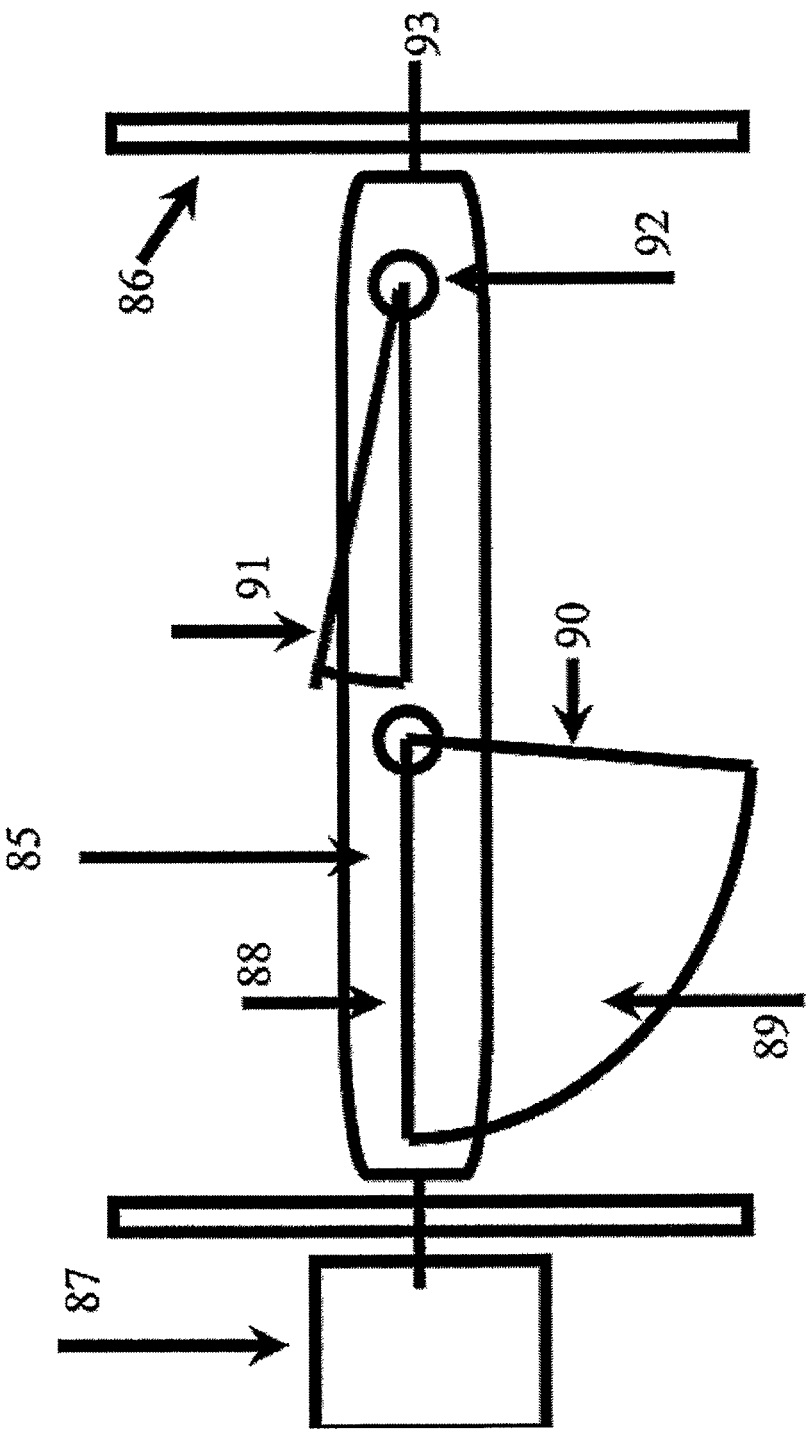
FIG. 36 shows another method enabling paddles to extend with gravity.

FIG. 36 illustrates another device for decreasing resistance from the wind on a paddle's rotation around a paddle wheel. Part (85) is a cylinder, designed to rotate from the energy flow, held in a support structure (86). As it rotates, it spins a bar (93), which causes a generator (87) to produce electricity. A swinging arm (91) is attached to a rotation point (92) and to a stable arm (88) using flexible material (89). The swinging arm extends no more than 90 degrees from the horizontal (90) so that it can easily fall out and then back from gravity on each rotation. As the swinging arm faces down, it extends, and the flexible material absorbs energy from the wave flow.

Figure 37:
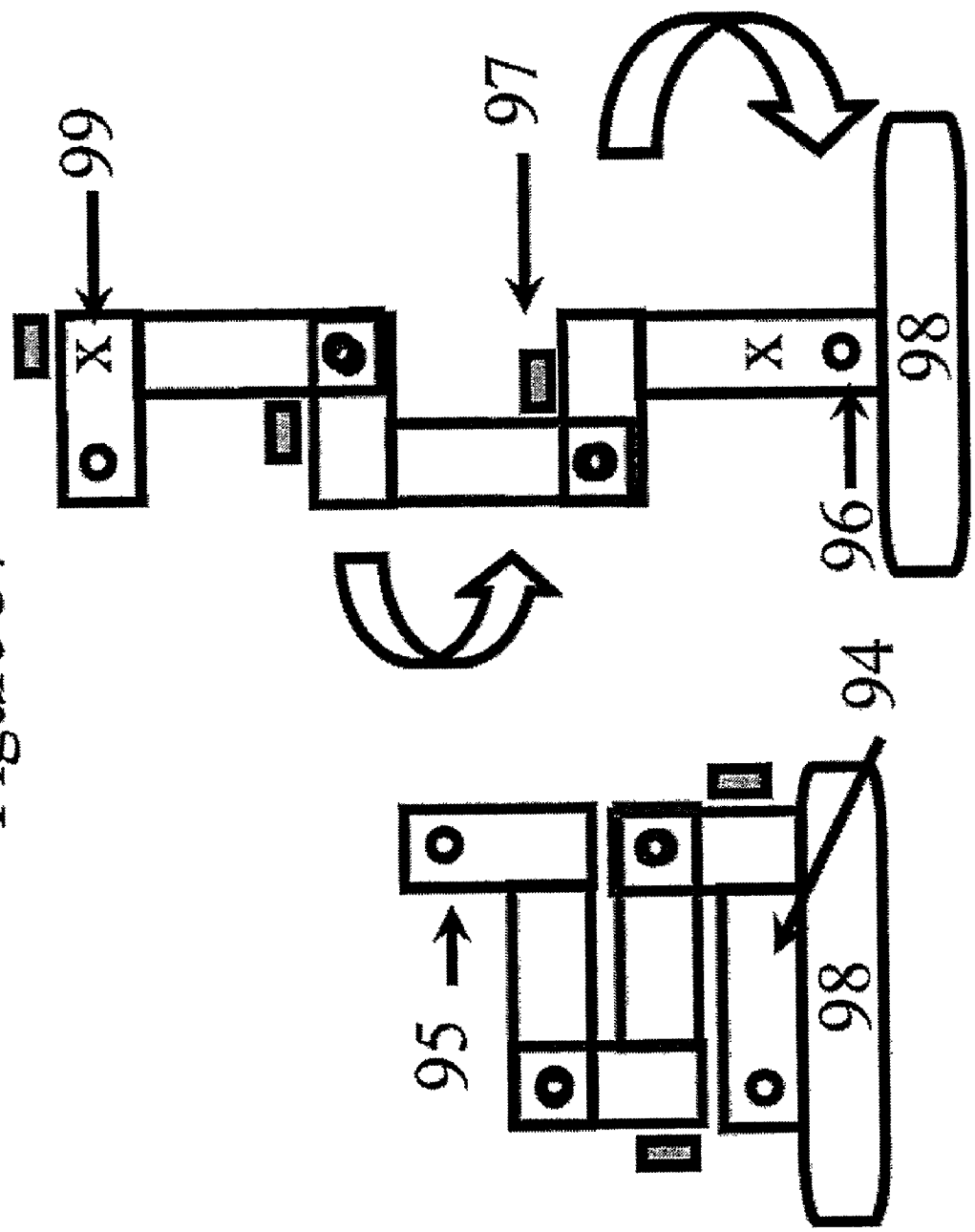
FIG. 37 is a hook and hinge device for furling and unfurling a paddle.

FIG. 37 illustrates another way to fold and unfold a paddle and reduce resistance on the return trip. A central structure (98), ideally a cylinder, holds (96) a sequence of hooks (94) and hinges (95). When facing superiorly, they automatically fold up; when facing inferiorly, they automatically extend. This works because of catches either on the hooks (97) or within the hinges (96). Two of these sequences of hooks and hinges in the same plane can hold (99, marked "x") a flexible material between them that captures flow when unfolded inferiorly and refolds when facing superiorly.

Figure 38:
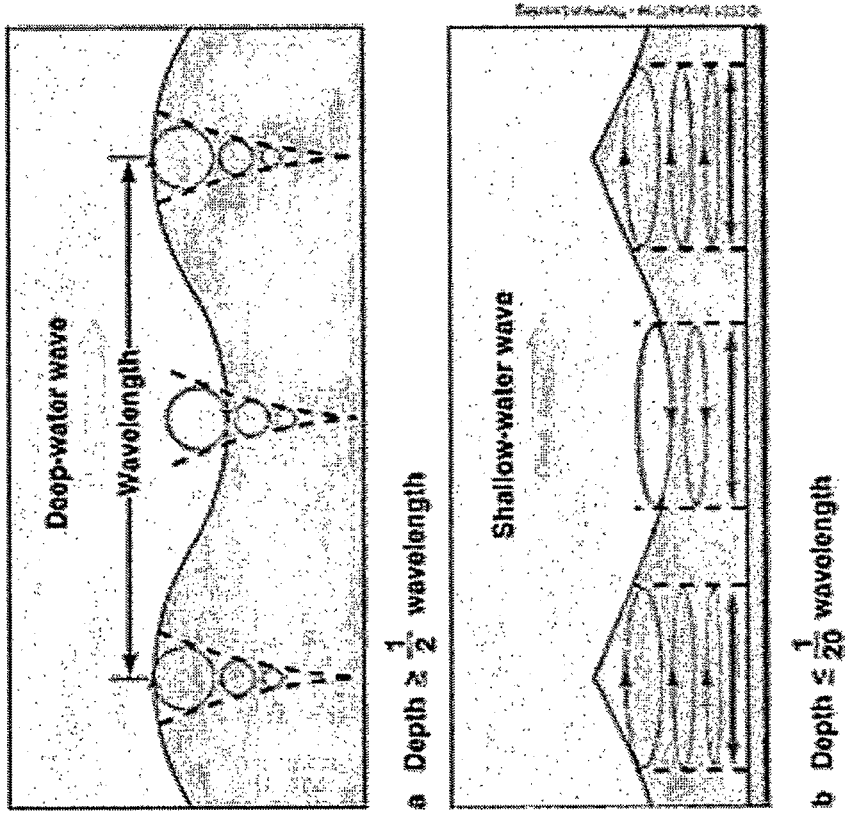
FIG. 38 illustrates the orbits of water molecules in different wave conditions.
Figure 39:
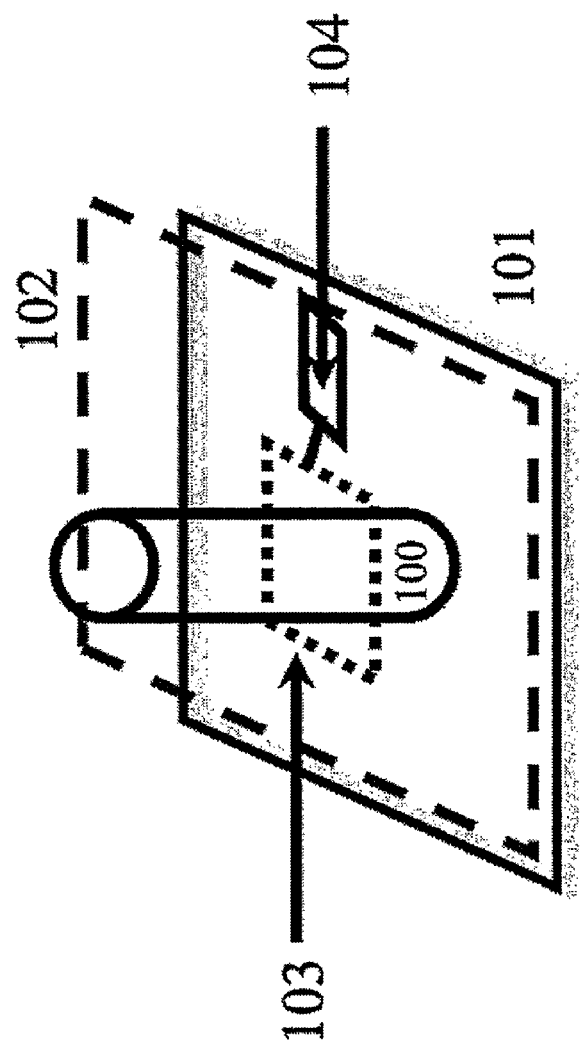
FIG. 39 is an additional generator made to fit just above the upper ramp.

FIG. 38 illustrates that as the ramps cause shallowing of the water carrying the wave, the area just above the ramp turns into an area of straight back and forth motion. Therefore an embodiment of the current invention is to place an energy capture device just superior to the ramp, particularly in the range of the height to wave length ratio of 1/7 or greater and in water depth of the range of 1/20 of a wavelength. FIG. 39 illustrates how that works. A generator and housing structure (103) is situated just superior to the upper ramp (102), ideally in artificially shallowed water of around depth/wavelength of 1/20. (101) is the lower ramp. (101) and (102) are connected to a vertical structure. Part (104) is a paddle whose back and forth motion operates the generator. Ideally, the paddles are on both sides of the central vertical structure (100). At different levels, the back and forth motion may describe the shape of an ellipse.

Figure 40:
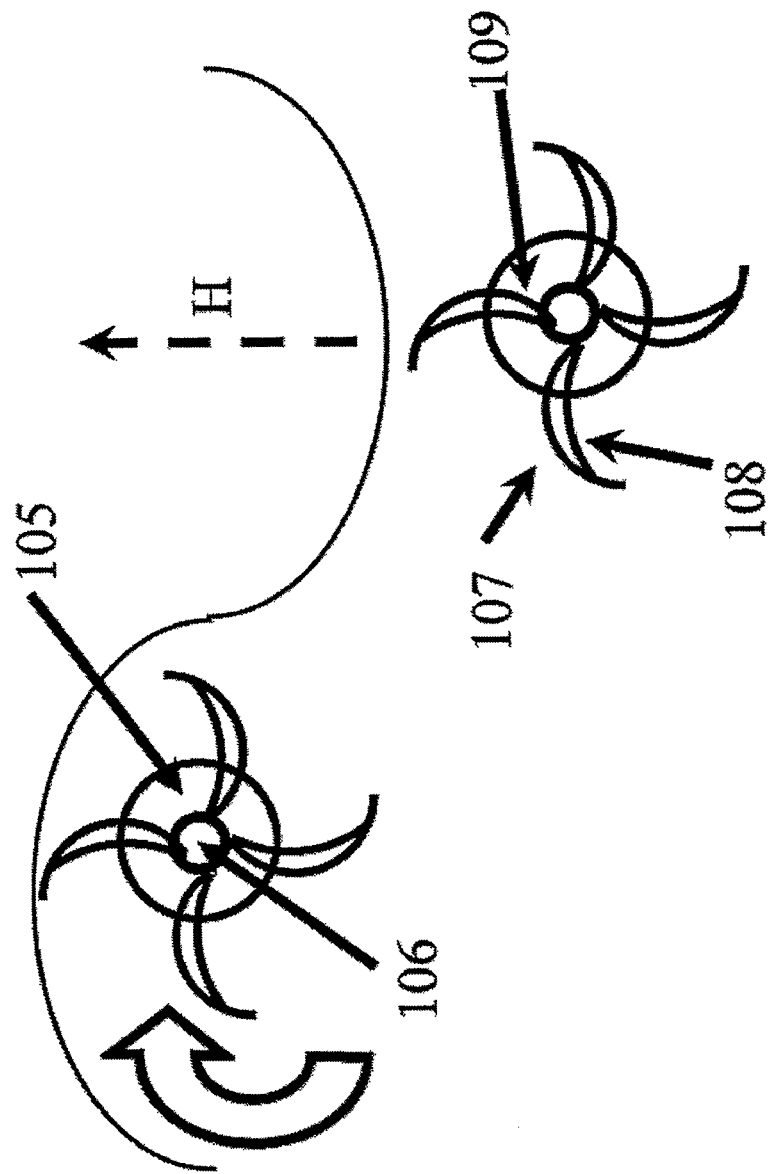
FIG. 40 is the embodiment of turbines placed just underneath the water surface.

FIG. 38 also illustrates the rotation of water molecules in a wave. As a result, another embodiment of the turbine to capture the horizontal/rotational energy can be used as long as it sits, ideally beneath the surface of the water, as a result of being appropriately weighted, and is ideally used to transfer vertical motion to a second generator via a vertical rod attached to the generating system. FIG. 40 illustrates how the movement of an underwater turbine rises and falls with the height (H) of the wave while it turns from rotation of the water molecules. Ideally, its diameter is slightly less than the height of the wave so that its paddles capture the maximal rotational energy. Part (105) is a central housing connected to a rod and a generator, and (106) is a control structure for adjusting the extension of the paddles in different wave heights that can extend the paddles or bring them in through a guide area in the central housing. The ideal paddle consists of two sides of different shapes. The side (108) facing the oncoming flow is the inside of an arc that connects to another concave arc (107) that faces more towards the oncoming flow. This diverts wave flow to the periphery where the torque is greater and it is captured better. The other side (109) faces the resistance to flow and is a smooth arc convex to the resistance in order to let it flow by better.

Figure 41:
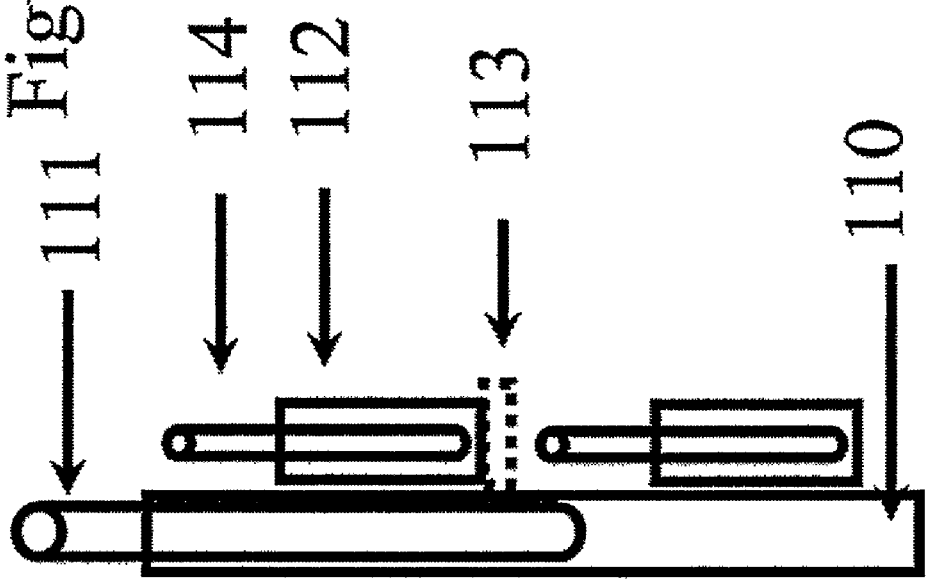
FIG. 41 is a diagram of a side view of connected unipiles (polypiles).

FIG. 41 shows how multiple units of unipiles and other energy capture devices, ramps, and wings could be connected to one polypile. Part (110) is a large supporting structure that supports a piston (111) operating on the surface (along with, of course, the supporting generators and controls). Alternatively, many separate unipile structures could be attached to the central pile (110). A connecting structure (113) optionally connects the main polypile to a unipile/piston (114)/wing/rotating device unit (112). This pattern may be repeated as often as needed in order to take advantage of waves within the fluid. The distance between the unipiles may be fixed, or moveable with a control. Their customary distances can be set according to the nature of the underwater waves in a particular region.

All unipile units ideally have a catch to limit their vertical motion.

Figure 42:
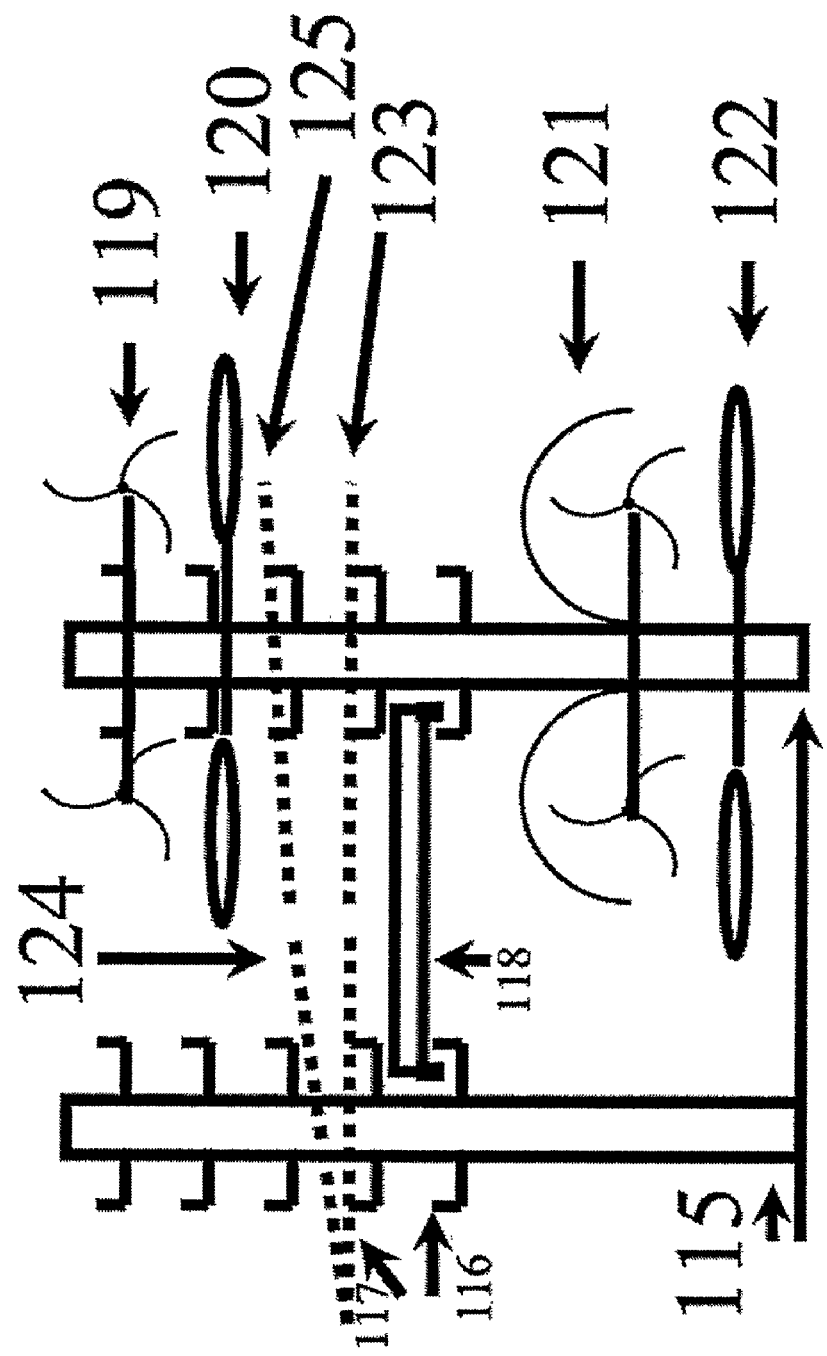
FIG. 42 is a diagram of a system of polypiles.

FIG. 42 illustrates the system of polypiles conceptually. It does not show, for simplicity, how the vertical poles can be the means of attachment in one embodiment. In this figure, part (115) is a pile system. Ideally, the vertical component consists of at least one very long rod, although it may also consist of smaller parts. (For convenience, we use the term "one very long rod," but in fact smaller rods may be connected to provide the same effect.) Part (116) is a figurative representation of the means of attachment of cross beams (118). It can be a hooked connection or a clamp or part of a machine that attaches to each pile system and proceeds up and down as needed by electronic control. The cross beams will be used as needed for support depending on environmental conditions such as depth of the water, wave amplitudes where installed, need to support a wind tower, and so on. Part 124's and 125's dotted lines show the ramps, which ideally tend to flatten as they ascend vertically in a field. In the ideal embodiment, they are used underneath the surface energy capture device component (119). They may also be used in a submerged configuration. An optional wing (120) is placed under part (119) to provide additional speed and lift. Part (119) will be attached to a piston-like structure (not shown) so it can move up and down on the wave surface. Generators are not shown in this diagram. Part (121) is a submerged paddle wheel with an accompanying inferior wing structure (122). The point is that, at greater depths, many different energy capture systems can be used simultaneously. Parts (117) and (123) are the inferior ramps.

Figure 43:
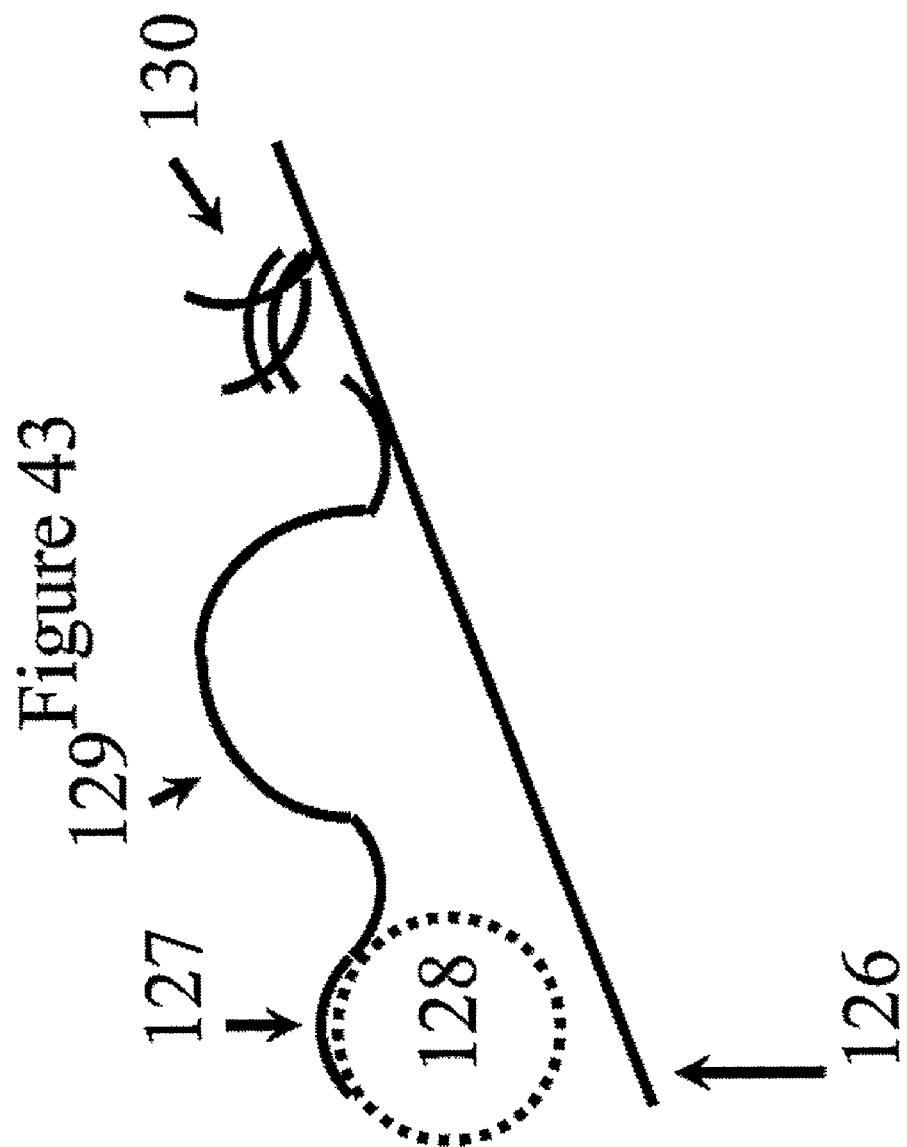
FIG. 43 is a summary diagram of the effects of a ramp.

FIG. 43 summarizes one accomplishment of the ramp according to Green's Law. The ramp is part (126). Fluid flow is left to right. Part (127) shows the appearance of the wave on the surface before it hits the ramp. It has minimal surface elevation, and its vertical energy is very hard to capture. (This is one reason why devices other than the current invention fail to take full advantage of wave energy.) The dotted lines (128) show how large the wave really is. As it hits the ramp, the wave (129) has more vertical distance outside the water; hence, its vertical energy is easier to capture. The height there is ideal for vertical energy capture. If the end of the ramp comes too close to the surface, the wave breaks and most of the energy is dissipated (130). The ramp needs to be placed deep enough so that event (130) does not occur but shallow enough so that event (127) does not occur. Simultaneously, of course, the ramp can be wing-shaped and increase the speed of the flow above it.

Figure 44:
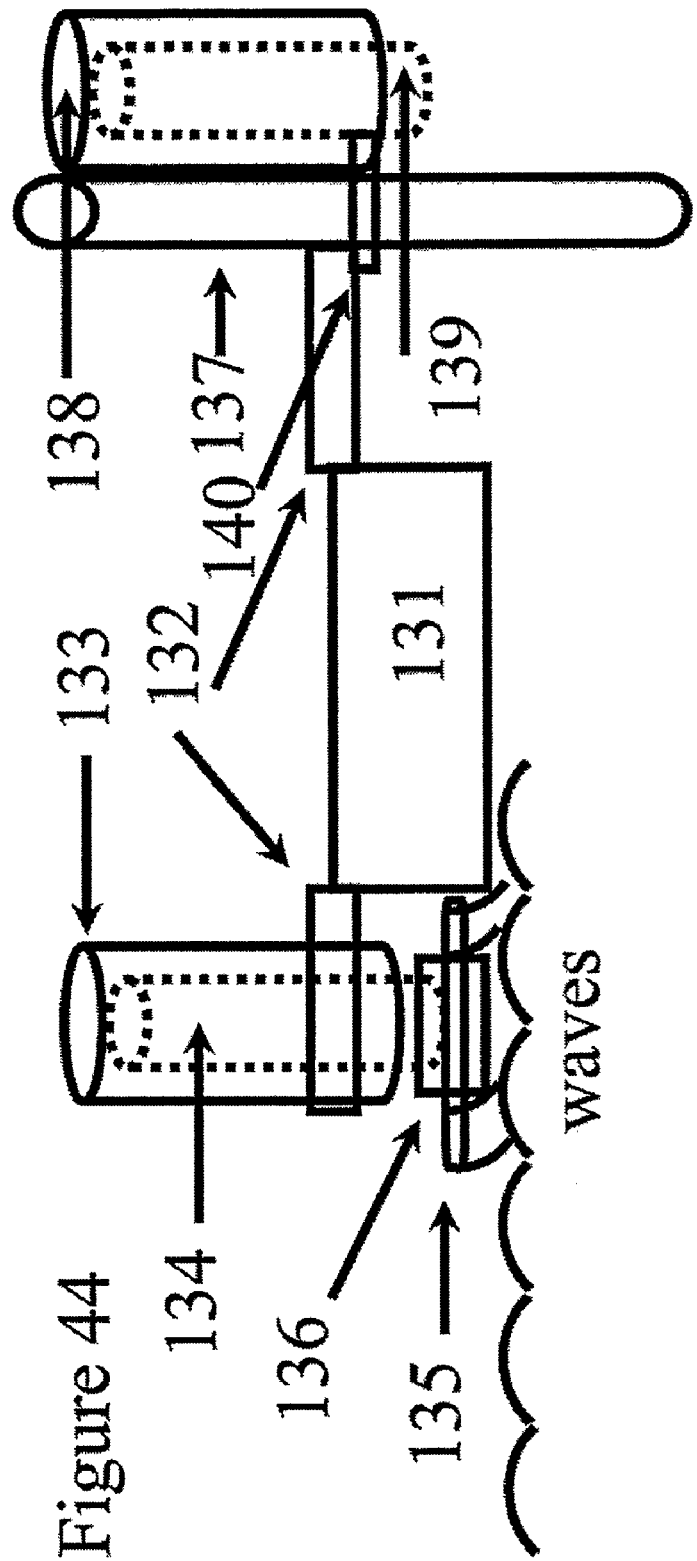
FIG. 44 is a diagram of how the same concepts as FIG. 1 could look if placed on a buoy instead of a pile.

FIG. 44 is a diagram of how the same concepts as FIG. 1 could be implemented on a sea platform instead of a pile. (131) represents a buoy, platform or other means of fixing structures on the surface. Part (132) shows an extension structure to hold the unipile systems or other wave energy capture systems. (132) may connect directly to a unipile (133) or to a larger vertical structure (137) that holds the unipile (138, 139, 140) as discussed earlier. Parts (134) and (139) move vertically with the waves. The horizontal energy system is shown by parts (135) and (136).

Figure 45:
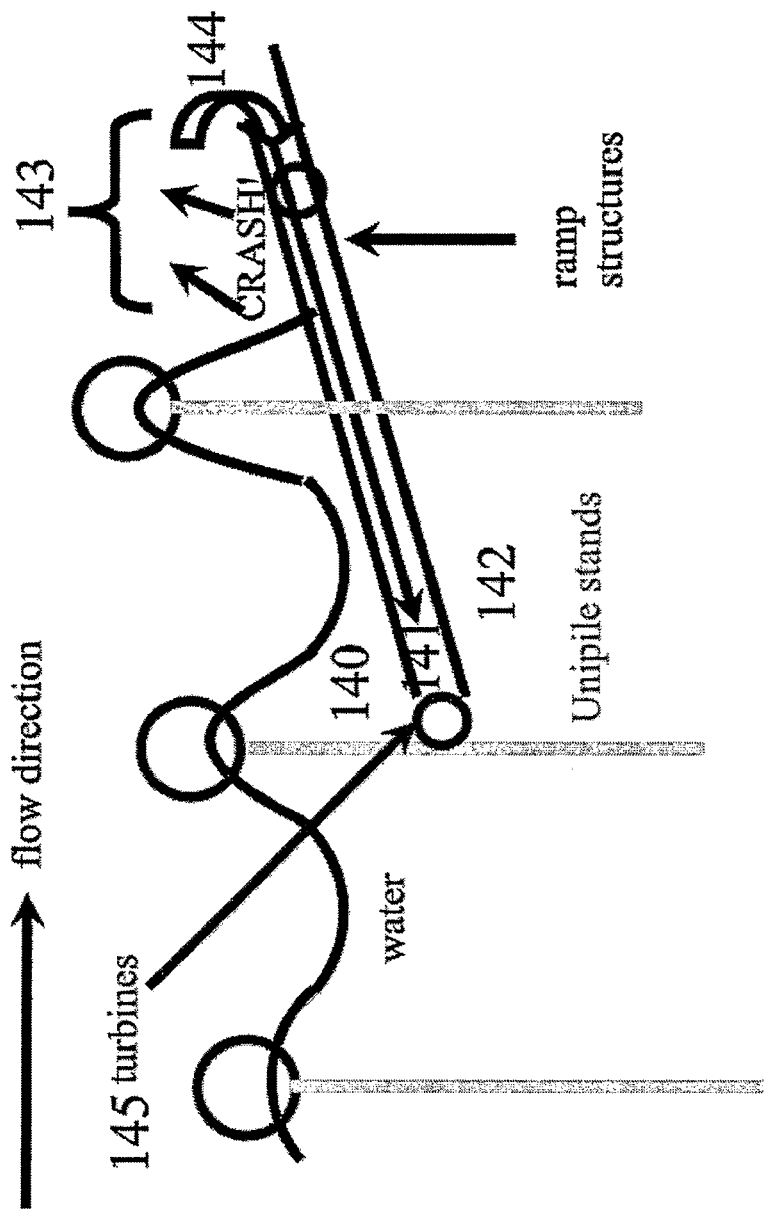
FIG. 45 is a diagram of undertow energy capture.

FIG. 45 is a diagram of undertow energy capture. Parts (140) are the unipiles. As the waves break at point (143), they are collected at extension (144) and run through ramp structures (141) and (142) to drive a turbine (145).

Figure 46:
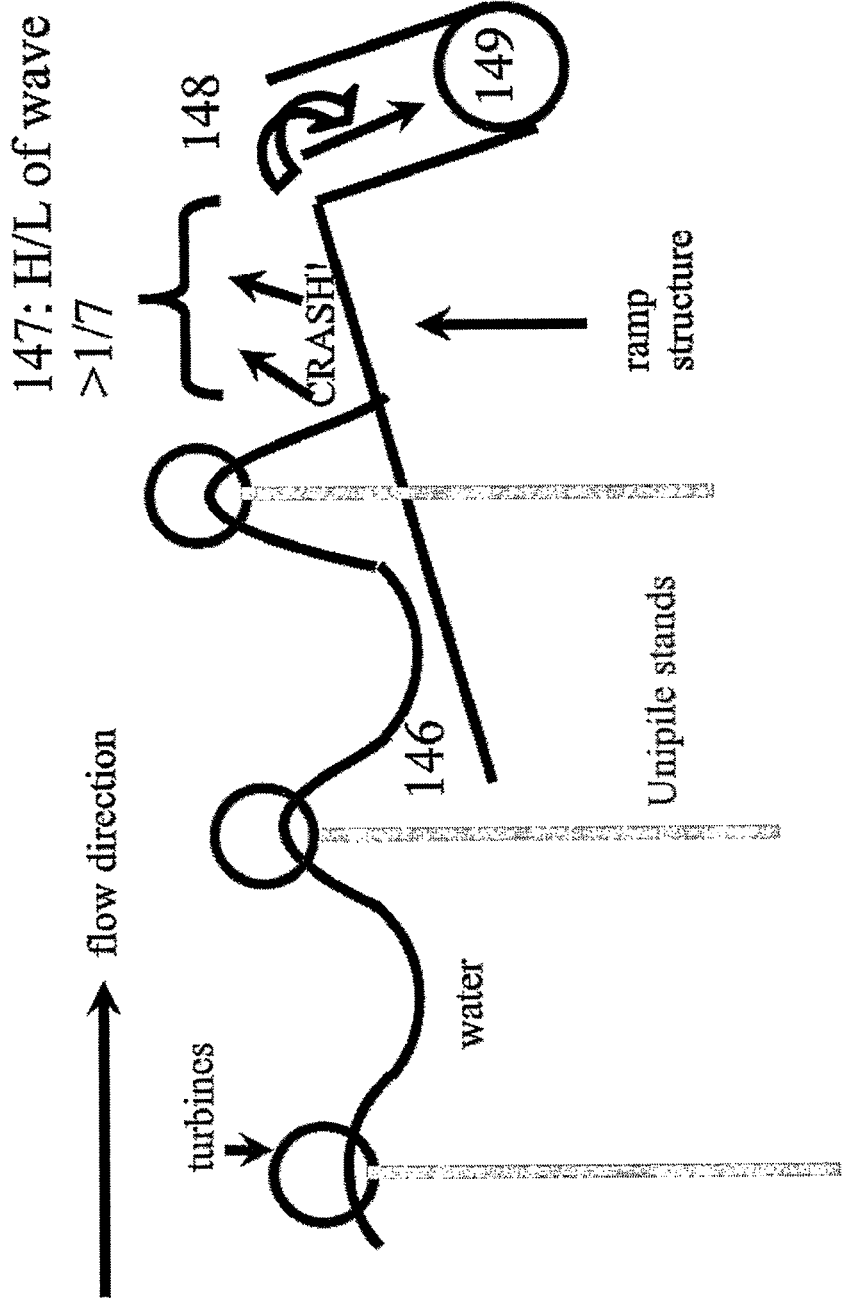
FIG. 46 is a diagram of energy capture at the end of a ramp system.

FIG. 46 is a diagram of energy capture at the end of a ramp system. (146) is the ramp. The waves break at the end (147) and fall down through a passageway (148) through a turbine (149). This is only useful for the certain embodiments of the invention in certain locations. The ideal is not to let the waves break.

Figure 47:
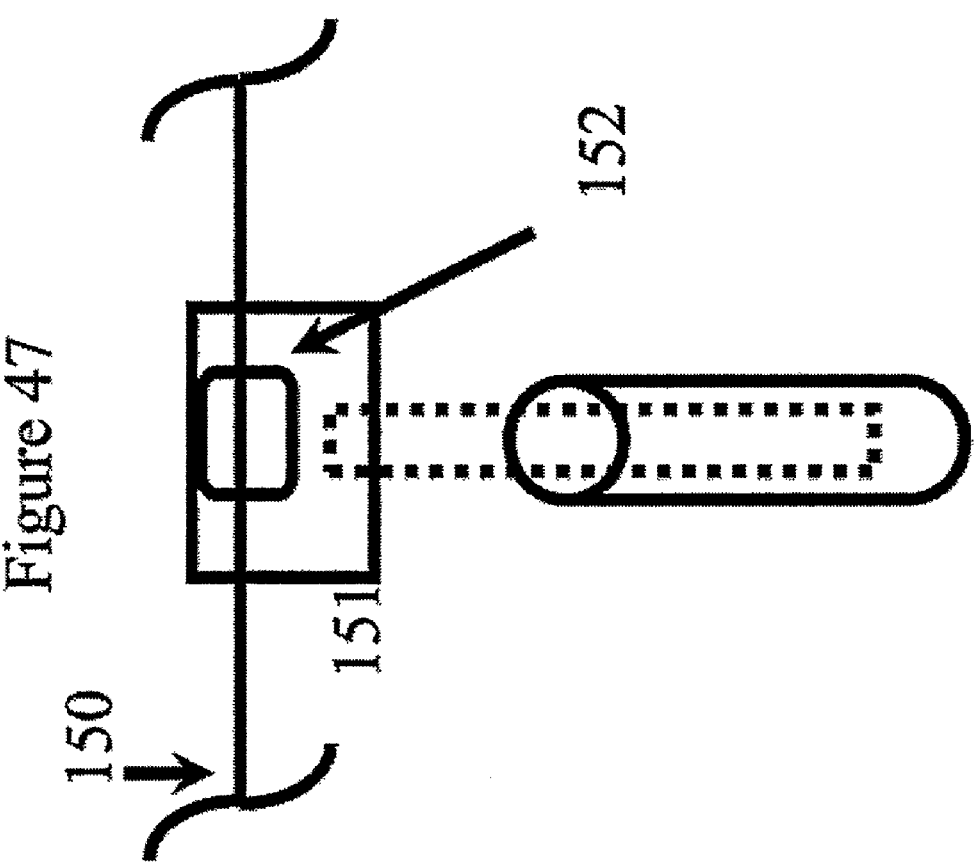
FIG. 47 is a diagram of a surface energy device with a flotation means.

FIG. 47 is a diagram of a surface energy device with a flotation means. It is a close-up of the same parts from FIG. 1. The paddle wheel (150) and the generator (151) make up the energy generation parts. The flotation device (152) is ideally fitted to the generator that holds the rod of the paddle wheels so that the structure floats symmetrically. The flotation device helps ensure not only that the horizontal generator section rides on the surface in order to impart its vertical motion to the rest of the unipile, but also to ensure the correct placement of the paddle wheels or other surface energy capture device at the optimal height.

Figure 48:
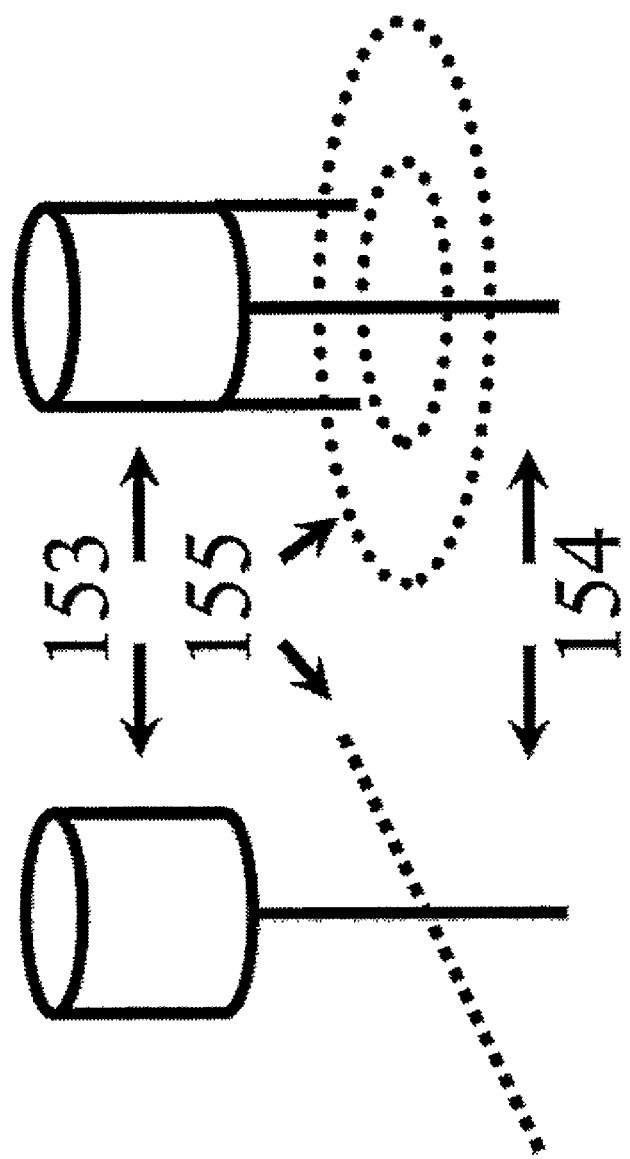
FIG. 48 is a picture of how the invention of flow deflection can help other devices of obtaining energy from waves, such as buoys.

FIG. 48 is a picture of how the invention of flow deflection can help other devices such as buoys to obtain energy from waves. A buoy (153) on the surface of the water connected by a structure such as a cable (154) that captures energy from vertical motion of the waves will have its vertical motion enhanced by a flow deflection device underneath (155).

Figure 49:
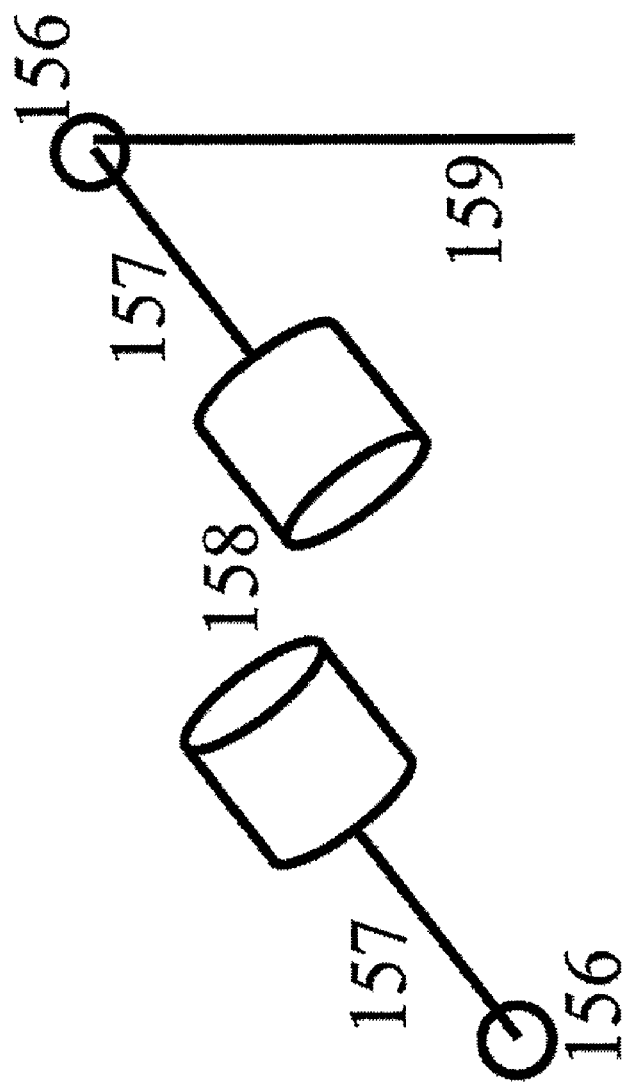
FIG. 49 is a picture of buoy devices that move horizontally on the surface.

FIG. 49 is a picture of buoy devices (158) that move horizontally on the surface. By having structures such as cables (157) that enable them to drift off the vertical from their tethered points (156), they can obtain some extra power by the movement in the direction of the cable as they pick up some horizontal motion as well. Part (159) shows how they could originate from a structure above the water as well. In these last two figures, the movement of the buoy or the cable creates the movement that generates energy.

Neither of the buoy inventions shown absorb as much energy as the unipile system, but the application of the principles of the current invention can make buoys more efficient.

Figure 50:
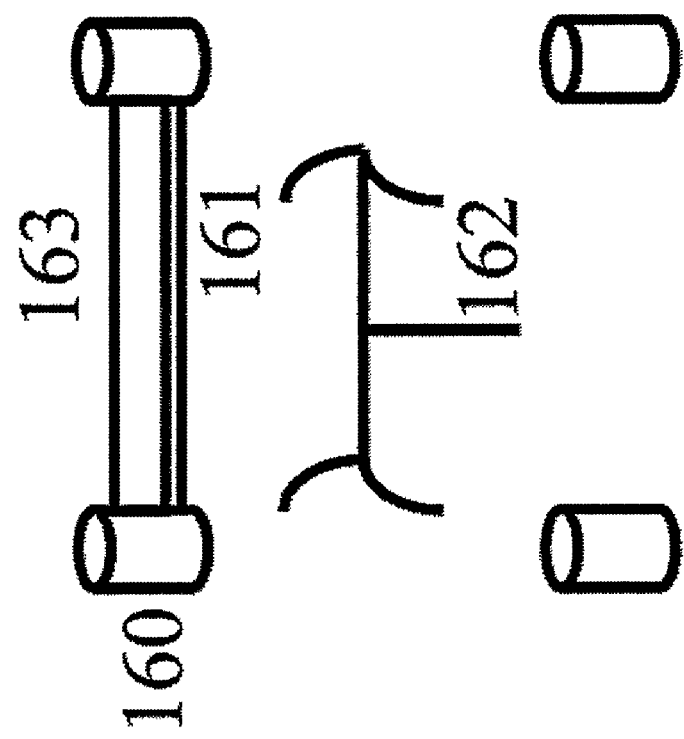
FIG. 50 is a picture of an ice barrier system for a wave farm.

FIG. 50 is a picture of an ice barrier system for a wave farm. In order for a field of surface energy capture devices (162) to operate in icy waters, the following surrounding system will be helpful. A system for melting ice on the surface of the water comprises at least two substantially fixed surface devices (160), drawn from the group of buoys, piles, platforms, and piers, at least one insulated system (161), connected to each fixed surface device and floating on the surface of the water, and a barrier (163) passing from one surface device to the other. The system for melting ice should surround the field of unipiles. In addition, regularly sweeping the unipile paddles on the surface at 180 degrees will help prevent freezing. So will the kinetic energy of their movement and the waves. As a last resort, the vertical motion machine and microprocessor connected to the unipile can direct the machine underneath the water to where it is not frozen.

FIG. 51 is a side view of a ramp structure that is made from a number of piles or other vertical structures to accelerate the waves superior to it and increase their amplitude. This structure is made of many different piles (163) with 2 platforms each, but another embodiment is possible with only the upper platforms. At point (164) the angling of the upper platforms begins from platform (165), with or without the presence of platform (166), which makes it simultaneously a flow deflection device. The ideal embodiment makes use of two platforms surrounding each vertical structure. In that case, the upper platforms (165, 167, 169) gradually slope closer to the horizontal underneath the surface waves, while lower platforms (166, 168, 170) ideally stay horizontal. There can be as many platforms as are appropriate for the wave farm. The minimum is one, but ideally, three to four are the minimum number for the greatest energy capture. Parts (171) show the location of the energy capture devices. The vertical structure may or not be present to connect to the energy capture device and the platform(s).

An embodiment of the various wave and wind energy devices would be a modularized clamping mechanism that attaches them to an oil rig and supplies the oil rig with electric power.

All variations of devices discussed here in conjunction with a wing or ramp or combination of the two can be used with moveable wings or ramps.

The various inventions described here can be made to work together or separately in different embodiments and situations.

While the invention has been described with respect to a limited number of embodiments, it will be appreciated that many variations, modifications, and other applications of the invention may be made. For example, the winged structure may be used in combination with any fluid energy-capturing device, and is not limited to the various configurations shown here.

SUMMARY OF THE INVENTION

According to the present invention there are provided several devices and methods of production of electrical energy from wave energy.

The present invention successfully addresses the shortcomings of the presently known configurations by providing devices and methods that convert motion and forces into electricity and other forms of energy.

Their description here contains initial numbers for easy reference to the claims and parenthesized numbers for easy reference to the pictures.

1. The current invention introduces a system for the capture of energy from waves, comprising:
   a. a first generating system (1, 2, 3), operative to generate electricity from a substantially horizontal movement of fluid, said system comprising a supporting structure, means to capture the energy, and means to convert it into electricity, and located on or adjacent to the surface of the waves,
   b. a second generating system (6, 7), operative to generate energy from a substantially vertical movement of fluid, said system comprising a supporting structure, means to capture the energy, and means to convert it into electricity,
   c. said first generating system attached to said second generating system and operative to translate the vertical motion of the first generating system to the second generating system.

The above reflects a basic idea of the current invention, that the wave energy in an ideal embodiment is captured in two dimensions simultaneously, although in other embodiments of the present invention, as will be seen, it can be captured separately in combination with other improvements shown in the current invention. Two major variants, to be described, are the "Vertical Twister" that makes use of a universal joint to obtain both motions, and the "Unipile" that uses a piston-like structure for the vertical motion. The "substantially horizontal" movement refers to the motion of the waves on the surface, where, at any moment, the intersection of flow of water molecules is on the surface plane of the waves. Therefore, by definition, that phrase here also includes rotational movement.

2. The current invention reveals an embodiment of said system 1, wherein the first generating system comprises a paddle wheel. (1)

3. The current invention reveals an embodiment of said system 1, further comprising:
   d. at least one flow deflection structure (5 and/or 10) functionally adjacent to the first generating system.

This is another major part of the current invention—the use of different flow deflection structures to improve the flow into the energy capture devices. Unless otherwise stated, they refer in the ideal embodiment to a situation in which the energy capture device is optimally placed next to the structure.

4. The current invention reveals an embodiment of said system 3, wherein said flow deflection structure is wing-shaped. (5 and/or 10 or 9 with 10)

According to the usage of the present invention, there are various structures that can obtain the effect of a wing: an airfoil shape, a leading edge section of an airfoil, a set of two ramps placed together, and so on.

5. The current invention reveals an embodiment of said system 3, wherein the flow deflection structure is attached to the first generating system. (5)

In other words, the flow deflection structure moves in tandem with the energy capture device on the surface.

6. The current invention reveals an embodiment of said system 1, further comprising:
   d. at least one ramp inferior to the first generating system. (10)

Here, "ramp" can refer to a platform as well. It can be planar, hollow, solid, etc., as long as it presents a long surface underneath the energy capture device such that it potentially affects the flow into the device under some wave condition.

7. The current invention introduces a system for the generation of energy from waves, comprising:
a. an energy capture device on or near the wave surface, (1)
b. a flow deflection structure functionally adjacent to the energy capture device. (5)

The above is a description of one of the basic inventions in its simplest form: an energy capture device and a flow deflection structure to be used with waves. A crucial part of the current invention is the manipulation of the flow into the machines for maximal effect.

8. The current invention introduces a system for the generation of energy from waves, comprising:
a. A paddle wheel (1) on or adjacent to the surface,
b. A generator attached to said paddle wheel (3),
c. A vertically flexible support structure attached to the generator. (6)

The vertical support structure can be connected from the top or the bottom.

9. The current invention introduces a paddle wheel device for the capture of energy, comprising:
a. A central rod (2) attached to at least one paddle wheel (1) on each side,
b. an electric generator (3) operative from the rotation of the central rod, said generator located between the paddle wheels.

The symmetricality of the current invention is an ideal embodiment. Therefore, the placement of a generator in the middle of the paddlewheels is ideal and unique, but not necessary. By contrast, paddle wheels for the capture of energy from rivers are always on one side of the generator. This invention can apply to flows other than waves alone.

10. The current invention reveals an embodiment of said device 9, wherein the paddle wheel device is on or near the surface of waves.

In other words, it ideally rides on the wave surface so that its paddles in their inferior position are partly submerged. This invention can also refer to the surface of underwater waves.

11. The current invention introduces a device for the capture of energy from waves, comprising:
a. an energy capture device (28) including its supporting structures (such as 25, 26, 27) on or near the wave surface,
b. a rod, (21)
c. a joint attaching to the energy capture device and its supporting structures on one side and to the rod (21) on the other side, said rod operative to move vertically at the joint,
d. a generator system attached to the other side of said rod, operative to generate energy from the motion of the rod. (22, 23, 24)

In the above embodiment, any kind of energy capture device that floats on the surface of a wave may be used. It may obtain energy in any way; a joint ensures that its movement leads to energy capture. This invention is left open to be used with any generator.

12. The current invention introduces a paddle wheel device for the capture of energy, comprising:
a. a first central rod (16) attached to at least one paddle wheel, (15)
b. a second rod, (17)
c. a universal joint attaching to the central rod on one side (16) and to the second rod (17) on the other side.

The above invention specifically uses a paddle wheel to capture energy in two dimensions simultaneously. Its advantage is that it can spin around while on the wave surface and impart both rotational and vertical energy to at least one generator. Clearly, this invention is much less practical for large waves; it is designed to be lightweight and efficient for small waves.

13. The current invention reveals an embodiment of said device 12, further comprising:
d. a generator (18) operating from the rotational motion of the second rod.

14. The current invention introduces a paddle wheel device for the capture of energy, comprising:
a. a first rod (16) attached to at least one object floating on the surface of the fluid, (15)
b. a second rod, (17)
c. a universal joint attaching to the first rod on one side and to the second rod on the other side,
d. a generator (20) operating from the motion of the second rod.

In the above embodiment, the energy capture can be of vertical energy only; the minimum required is a floating object to provide movement, ideally vertical, through the universal joint.

15. The current invention introduces a paddle wheel system for the capture of wave energy, comprising
a. a paddle wheel (1)
b. a least one ramp (10 and/or 9) functionally adjacent to the paddle wheel, operative to increase its vertical motion by its effect on the wave amplitude.

The paddle wheel resting on the surface of the wave is affected by the increased vertical motion.

16. The current invention introduces a paddle wheel system for the capture of wave energy, comprising:
a. a paddle wheel (1)
b. at least one flow deflection device (5 and/or 10 and 9) functionally adjacent to the paddle wheel, operative to increase its horizontal and/or rotational motion.

This invention covers at least two cases: the smaller, more localized flow deflection device, the larger flow deflection device made of two ramps together that deflect the flow and increase the horizontal velocity, or any other devices.

17. The current invention introduces a paddle wheel system for the capture of energy from a flowing substance, comprising:
a. at least one paddle with an outer arc congruent to the circular center for less than 90 degrees of circumference,
b. a central rod, (2)
c. a non-concave form centrally, fixedly connected on one side to the central rod and on the other side to the outer arc, and whose non-concave surface faces the direction of energy flow. (64; FIG. 22)

18. The current invention introduces a device for forming a paddle on a paddle wheel, comprising:
a. A central structure (98)
b. At least one paddle attached to the central structure,
c. Said paddle comprising two folding/unfolding structures of interlocking hooks (94) with hinges (95) on each end, one hook (96) of which is attached to the central structure, in the same plane,
d. catches (97, for example) operative to direct the folding and unfolding of the hooks between a folded position and an unfolded, extended position,
e. A flexible material attached to each set of two folding/unfolding structures of interlocking hooks in at least two locations (99) on each.

The purpose of the above invention is to provide for automatic decrease of the friction on the return journey of each paddle.

19. The current invention introduces a paddle wheel system for the capture of energy from a flowing substance, comprising:
a. a central cylinder parallel to the earth's surface, (80)
b. at least one paddle (81, 82)

c. each paddle's central portion fitting non-fixedly into a hole and guide (83) in the central cylinder, with a piece (84) on the inner end of each paddle operative to prevent the paddle from sliding out completely.

20. The current invention reveals an embodiment of said paddle wheel system 19, wherein said central cylinder connects to a generator.

21. The current invention introduces a system for paddle wheel energy capture on the waves, comprising:
a. a central rod, (2)
b. at least two paddle wheels (1), attached to said central rod,
c. a generator system (3), operating from the rotation of said central rod.

22. The current invention reveals an embodiment of said system 21, wherein at least one paddle wheel (1) is on each side of a generator (3) through which the central rod (2) passes.

23. The current invention reveals an embodiment of said system 21, further comprising:
d. a second rod (6), attached to the paddle wheel energy capture system, said generator-paddle system translating its substantially vertical motion to a second rod.

24. The current invention reveals an embodiment of said system 23, wherein the second rod is vertical.

25. The current invention introduces a system for capturing energy from fluid flows, comprising:
a. an energy capture device located on the surface of the flow (15, 28),
b. a supporting structure (3, 6, 7, 8) holding the energy capture device (28),
c. a control system (13) connected to the energy capture device's supporting structure operative to direct the energy capture device to face the fluid flow direction.

26. The current invention reveals an embodiment of said system 25, wherein the energy capture device is a paddle wheel.

27. The current invention introduces a paddle wheel energy capture system, comprising:
a. a central rod, (2)
b. at least one paddle wheel (1), attached to said central rod,
c. a generator system, operating from the rotation of said central rod, (3)
d. a housing (4, 76) connected to the generator system (3) and extending over the paddle wheel, said housing in the area over the paddle wheel being a hollow semicircle whose radius is slightly greater than the radius of the paddle wheel device.

28. The current invention reveals an embodiment of said system 27, further comprising:
e. a flow-deflection structure located functionally adjacent to the inferior end of the paddle wheel. (5, and/or 9 and/or 10).

29. The current invention reveals an embodiment of said system 27, further comprising:
f. a tube (77) attached to and providing air to the interior of the housing.
This will be primarily useful in the case of underwater waves.

30. The current invention reveals an embodiment of said system 27, wherein said semicircle has an upward leading edge of the housing more gently sloping than the rest of the semicircle. (76)

31. The current invention introduces a system for capturing surface wave energy, comprising:
a. a generator (2),
b. at least one energy capture device (1) connected to the generator,
c. a weight-adjusting mechanism (3) attached to a combination of said generator and energy capture device, said mechanism operating to adjust the depth of the energy capture device relative to the surface.

32. The current invention reveals an embodiment of said system 31, wherein said mechanism (3) fills with and discharges air.

33. The current invention reveals an embodiment of said system 31, wherein the system is operative to adjust the location of the energy capture device within a wave (FIG. 40).

34. The current invention introduces a system for converting wave energy into electrical energy, comprising:
a. an energy capture device substantially on the surface of the fluid, (32)
b. a first rod (33), substantially perpendicular in a horizontal plane to the direction of energy flow, attached to the energy capture device,
c. a second rod, (36)
d. a joint connecting the first and second rods,
e. a generator device connected to the horizontal axis movement of the second rod. (37, 38)

35. The current invention reveals an embodiment of said system 34, wherein the generator device is a rotor-stator device.

36. The current invention reveals an embodiment of said system 34, wherein the joint between the first and second rods is a universal joint.

37. The current invention reveals an embodiment of said system 34, further comprising:
f. a third rod, connected to a joint on the other side of the first rod. (34)

38. The current invention reveals an embodiment of said system 37, wherein the joint between the first (33) and third rods (34) is a universal joint.

39. The current invention reveals an embodiment of said system 34, wherein the system is located on the surface of a fluid.

40. The current invention reveals an embodiment of said system 34, further comprising:
f. a generator system (39) operating from the vertical movement of a rod (36 or 34) attached to the first rod (33).

41. The current invention introduces a system for converting wave energy into electrical energy, comprising:
a. an energy capture device (32) substantially on the surface of the fluid,
b. said device attached to a first rod (33), substantially perpendicular in a horizontal plane to the direction of wave energy flow,
c. a second rod, (36)
d. a joint connecting the first and second rods,
e. a generator device (39) connected to the vertical axis movement of the second rod.

42. The current invention introduces a set of paddle wheel generators, comprising:
a. at least two paddle wheel generators with paddle wheels, (78)
b. a housing (79) superior to each paddle wheel generator, said housing covering less than the entire vertical extent of the paddle wheel,
c. the housing of the inferior one providing a flow deflection structure inferior and functionally adjacent to the paddle wheel superior to it.

43. The current invention introduces a system for energy capture, comprising:
a. at least one energy capture device (45) enclosed in a housing of four sides, (47)
b. Said housing having a lower floor (55) on the entry side of the fluid flow than the floor of the outlet side, c. Said energy capture device oriented to capture energy in the vector substantially parallel to the direction of entry of the energy.

The above invention is particularly applicable to subsurface waves.

44. The current invention reveals an embodiment of said system 43, wherein the energy capture device is a paddle wheel. (45)

45. The current invention reveals an embodiment of said system 43, further comprising:
d. said energy capture device attached to at least one rod that translates the vertical motion of the first energy capture device to a second energy capture device.

46. The current invention reveals an embodiment of said system, wherein the system is submerged in a fluid.

47. The current invention reveals an embodiment of said system 43, further comprising a one-way device (49, 50) connected to the smaller opening, said one-way device opening only to the outside at the smaller end.

48. The current invention reveals an embodiment of said system 43, further comprising:
d. a wall at the larger opening that connects in a substantially vertical manner to the superior wall of the housing for a portion of the opening. (51)

49. The current invention reveals an embodiment of said system 48, further comprising:
e. a wall (54) at the smaller opening that connects in a substantially vertical manner to the superior wall of the housing for a portion of the opening,
f. a gas-providing tube (48) attached to said housing on one side of the tube and a machine that maintains gas in the housing on the other side.

The purpose of the above is, when relevant, to create a gas-fluid interface and thereby decrease wave interference, and to decrease resistance to the energy capture device on its return trip.

50. The current invention reveals an embodiment of said system 43, wherein the floor of the housing is the only one of the walls that narrows from inlet to outlet.

51. The current invention reveals an embodiment of said system 43, wherein at least one of the side walls (43) narrows from inlet to outlet.

52. The current invention reveals an embodiment of said system 43, wherein at least one of the housing walls is wing-shaped.

53. The current invention reveals an embodiment of said system 43, wherein the lower wall of the housing is the only one of the side walls that is wing-shaped.

54. The current invention introduces a paddle wheel energy capture system, comprising:
a. a central housing, (105)
a. at least one paddle wheel with at least one paddle, (107,108) attached to said central housing, with an internal extension of the paddle (109),
c. a control system (106) that adjusts the length of the extension of each paddle peripheral to the housing, said control system operative to increase the length of the extension for larger wave amplitudes and decrease it for smaller amplitudes.

The purpose of the above is to enable the paddle to capture the rotational water molecule energy in different size waves, because the energy is greater nearer the periphery of the wave.

55. The current invention introduces an infrastructure system for energy capture, comprising:
a. A first vertical structure (110) (137)
b. At least one substantially horizontal connecting piece with attachment means on both ends (113) (140)
c. At least a second vertical structure attached to the horizontal connecting piece (112) (138)
d. Said horizontal piece operative to connect the first and second vertical structures.
e. An energy capture device attached to the second vertical structure. (114) (139)

The purpose of the above is to enable the attachment of various structures and energy capture machines in a-vertical dimension. In addition, the concept of attachment to one major structure enables other components to be removed as necessary for maintenance without disturbing the costly infrastructure.

56. The current invention reveals an embodiment of said system 55, wherein the first vertical structure is attached to the earth.

57. The current invention reveals an embodiment of said system 55, wherein the first vertical structure is attached to the bottom of a body of water.

58. The current invention reveals an embodiment of said system 55, wherein the first vertical structure is attached to a structure in or on the water. (104-1,2)

59. The current invention reveals an embodiment of said system 55, wherein the energy capture device moves vertically while guided by the second vertical structure. (131, 132)

60. The current invention introduces an infrastructure system for energy capture, comprising
a. A first vertical structure (110) (133)
b. A second vertical structure attached to the first vertical structure (111) (134)
c. An energy capture device attached to the second vertical structure, said second vertical structure moving vertically in guidance means provided by the first vertical structure.

This is the essence of the vertical component of the "unipile" or similar machines. By contrast, buoys do not have guidance means. Ideally, such guidance means are rigid, thereby enabling vertical motion without flopping from side to side. An example of such means would be a groove in one matched by a ridge in the other.

61. The current invention reveals an embodiment of said system 60, wherein the first vertical structure is attached to the earth.

62. The current invention reveals an embodiment of said system 60, wherein the first vertical structure is attached to the bottom of a body of water. (FIG. 41)

63. The current invention reveals an embodiment of said system 60, wherein the first vertical structure is attached to a structure in or on the water. (131, 132)

64. The current invention introduces an energy farm, comprising:
a. at least two piles (115) and at least one crossbeam (118) connecting said piles,
b. at least one energy capture device in the water connected to at least one of the piles, (119 or 121)
c. at least one wind energy capture device connected to at least one pile.

This enables support for wind energy machines to use the same pile infrastructure. This is distinguished from the wind tower type of infrastructure, so that here several less weighty piles with wave machines can support a wind energy machine, and thereby make the whole farm more efficient.

65. The current invention introduces an energy farm, comprising:
a. at least two piles (115) and at least one crossbeam (118) connecting said piles,
b. at least one energy capture device connected to at least one of the piles, (119 or 121)

c. A mechanical device attached to each pile and to the crossbeam, (shown by 116 and 118), said mechanical device operative to move the crossbeams in a vertical direction.

This is necessary for proper alignment of the numerous devices.

66. The current invention introduces an infrastructure system for energy capture, comprising:
a. a vertical structure, (115)
b. an energy capture system attached to said vertical structure, (119)
c. a first flow deflection structure, said structure attached to the vertical structure inferior to and functionally adjacent to the energy capture system. (120 or 124, 125)

The energy capture system can be adjacent to either a small local deflection structure or a larger, ramp-shaped one, or to both. The system can work and is novel either way. For the structures that follow, part 120 is referred to as the first flow deflection structure.

67. The current invention reveals an embodiment of said system 66, wherein the energy capture system is in the water.
68. The current invention reveals an embodiment of said system 66, further comprising:
d. a second flow deflection structure (124 or 125) inferior to and functionally adjacent to the first flow deflection structure. (124)
69. The current invention reveals an embodiment of said system 68, wherein the second flow deflection structure is platform-shaped. (124)
70. The current invention reveals an embodiment of said system 68, further comprising:
e. a third flow deflection structure (117, 123) inferior to and functionally adjacent to the second flow deflection structure, and similar in size to second flow deflection structure. (124, 125)
71. The current invention reveals an embodiment of said system 70, further comprising:
f. a second vertical structure (another 115),
g. a crossbeam (118) connecting to the second vertical structure, said crossbeam located inferior to the lowest flow deflection structure of the first, second, or third (117, 123).
72. The current invention introduces a wave energy capture system, comprising:
a. a buoy-like object (153) that captures energy from its movement on the waves,
b. a flow deflection structure (155) functionally adjacent to the buoy-like object.
c. a generator connected to the system, operative to generate energy from the motion of the object.

The principles of the current invention can be used with a buoy type system. There are many methods for transforming that vertical energy into electrical energy. Here no single one is favored; the point of novelty is using a flow deflection structure to increase the productivity of any of them.

73. The current invention introduces a wave energy capture system, comprising:
a. a buoy-like object (158) that captures energy from its movement on the waves,
b. a fixed connection point above or below the surface of the fluid, (156)
c. a long structure (157) connecting the buoy-like object to the fixed connection point, said long structure not fixed in a vertical orientation
d. a generator connected to the system, operative to generate energy from the motion of the object.

This enables some of the horizontal motion from wave energy to be captured as well as the vertical energy currently captured by ocean wave buoy systems.

74. The current invention reveals an embodiment of said system 73, further comprising:
e. a structure (159) holding the connection point above the level of the waves.
75. A system for energy capture from waves, comprising:
a. a rod, (29)
b. a housing (30) covering part of the rod,
c. at least one generating system, operating from the motion of the rod to create electricity, within said housing,
d. a watertight guide (31) that surrounds said rod.
76. The current invention introduces an energy flow capture system, comprising:
a. at least a first flow deflection structure (124 or 125), its leading edge substantially facing the direction of energy flow in the x-axis,
b. a first energy capture device (119) functionally adjacent to said first flow deflection structure and superior to it in the y-axis. (also FIGS. 5, 21, 22, 23, 28)
77. The current invention reveals an embodiment of said system 76, further comprising a supporting structure (115) for the first flow deflection structure.
78. The current invention reveals an embodiment of said system 77, wherein the supporting structure (67) is in the interior of said flow deflection structure (69).
79. The current invention reveals an embodiment of said system 76, wherein the system is in the water.
80. The current invention reveals an embodiment of said system 76, further comprising:
c. at least a second flow deflection structure (117, 123), of similar shape to the first flow deflection structure; said second flow deflection structure, whose leading edge is obtuse to the direction of energy flow in the x-axis, being inferior and functionally adjacent to the first flow deflection structure (124, 125).
81. The current invention reveals an embodiment of said system 76, wherein a machine on said vertical support operates to adjust the height and angle of at least the first flow deflection structure.

This enables the flow deflection structures to adjust to different size waves.

82. The current invention reveals an embodiment of said system 76, wherein at least the first flow deflection structure is rectangular. (69)
83. The current invention reveals an embodiment of said system 80, wherein the leading edge of the second flow deflection structure (69) is in substantial congruity with the leading edge of the first flow deflection structure (117 and 124).
84. The current invention reveals an embodiment of said system 80, wherein both flow deflection structures are connected. (FIG. 28)
85. The current invention reveals an embodiment of said system 80, wherein the slope (whose difference in height is shown by 11) of the first flow deflection structure (124, 10) measured from its leading edge in the direction of energy flow is less obtuse than that of the second (inferior) flow deflection structure (9, 117).
86. The current invention reveals an embodiment of said system 76, further comprising: a flow deflection structure-positioning controller (13) electronically connected to the at least one flow deflection structure.
87. The current invention introduces an energy farm, comprising:
a. at least two vertical support structures (115), the first preceding the second in the x-axis of energy flow,
b. at least one substantially rectangular flow deflection structure attached to each vertical support structure, the leading edge of the flow deflection structure of the second vertical support structure (125) positioned in substantial vertical congruity with the trailing edge of the flow deflection structure (124) of the first vertical support structure. (FIG. 32)

88. The current invention reveals an embodiment of said system 87, further comprising:
c. a second flow deflection structure of similar size to the first, attached to each said vertical support structure respectively, and located inferior to the first flow deflection structure (124 or 125), the leading edge of the second flow deflection structure of the second vertical support system (123) being in substantial vertical congruity with the trailing edge of the second flow deflection structure (117) of the first vertical support system in the x-axis.

89. The current invention introduces an energy capture system, comprising:
a. an energy capture device, (119)
b. a wing-like flow deflection structure (120) in functional congruity to the device, the upper chamber portion of said wing-like structure (41, 5) facing the energy capture component (119) of the energy capture device.

90. The current invention reveals an embodiment of said system 89, wherein the system is placed in a liquid.

91. The current invention reveals an embodiment of said system 89, wherein the system is placed in a gas.

92. The current invention reveals an embodiment of said system 89, wherein said system is connected to a generator.

93. The current invention reveals an embodiment of said system 89, wherein the wing-like structure is attached to the energy capture device. (35, 40, 41)

94. The current invention reveals an embodiment of said system 93, wherein the distance of the wing-like structure to the energy capture device is fixed.

95. The current invention reveals an embodiment of said system 89, wherein the energy capture component's center in the x-axis is centered over the area of greatest acceleration superior to the wing-like structure. (FIG. 23)

96. The current invention reveals an embodiment of said system 89, wherein the wing-like structure is attached to a supporting structure of the energy capture device. (FIG. 22)

97. The current invention reveals an embodiment of said system 89, wherein the wing-like structure (63) is attached to a supporting structure (65) separate from the supporting structure of the energy capture device.

98. The current invention introduces a paddle wheel for the capture of energy from a moving substance, comprising:
a. a central cylinder parallel to the earth's surface, (85)
b. at least one paddle (89)
c. each paddle's central portion fitting non-fixedly into a hole and guide in the central cylinder, with a swinging arm (90, 91), parallel, when retracted, to the axis of the cylinder, that extends to no more than 90 degrees (90); a point of rotation (92) for said swinging arm; a horizontal stable arm (88) parallel to the axis of the cylinder and attached near the point of rotation, and a soft material (89) connected to the two arms with sufficient material for the swinging arm to extend approximately 90 degrees (90).

99. The current invention introduces a wave energy capture system (FIGS. 1, 28), comprising:
a. an energy capture system with a generator, (1, 2, 3)
b. an energy capture component (1) of said energy capture system, said component being the part that captures the energy,
c. a ramp system (165, 167, 169) that slopes vertically in the y-axis with the higher end more distant from the direction of the x-axis energy flow, said ramp system placed inferior to and functionally adjacent to said energy capture component. (FIG. 51)

100. The current invention reveals an embodiment of said system 99, wherein the ramp system is wing-shaped, with the upper camber facing the energy capture device.

101. The current invention reveals an embodiment of said system 99, wherein the ramp system is slanted upwards on the superior surface in an obtuse angle to the energy flow, and is substantially flat on the inferior surface. (165, 166)

102. The current invention reveals an embodiment of said system 99, wherein the ramp system is curved upwards on the superior surface and substantially flat on the inferior surface.

103. The current invention reveals an embodiment of said system 99, wherein the ramp system's slope decreases in progression along the x-axis. (FIGS. 51, 42)

104. The current invention reveals an embodiment of said system 99, wherein the ramp system comprises at least two ramps. (FIG. 42)

105. The current invention reveals an embodiment of said system 99, wherein the system is placed in a liquid.

106. The current invention reveals an embodiment of said system 99, wherein the system is placed in a gas.

107. The current invention reveals an embodiment of said system 99, wherein the ramp system is placed substantially parallel to the direction of energy flow.

108. The current invention reveals an embodiment of said system 99, wherein the ramp is attached to a supporting structure (6, 7) of the energy capture device (1, 2, 3).

109. The current invention reveals an embodiment of said system 99, wherein the ramp is attached directly or indirectly to piles. (7, 8)

110. The current invention introduces a system for capturing energy from waves, comprising:
a. a generating system (6,7), operative to generate energy from a substantially vertical movement of fluid, said system comprising a supporting structure, means to capture the energy, and means to convert it into electricity,
b. at least one flow deflection structure, functionally adjacent to the means to capture the energy.

111. The current invention introduces a field of energy capture devices, comprising:
a. a ramp system, substantially extending inferior to and functionally adjacent to at least two devices in the field. (FIGS. 26, 27, 28)

112. The current invention reveals an embodiment of said system 111, wherein the ramp system is submerged in a liquid.

113. The current invention introduces an energy farm, comprising:
a. at least two energy capture systems located side by side in relation to the direction of energy flow,
b. at least two rectangular ramps with edges, one ramp for each energy capture system, wherein each said system facing the same direction of energy flow is functionally adjacent and superior to a ramp, said ramp edges having a substantially equal height and angle to the ramp edges of the adjacent energy capture devices. (FIG. 32)

114. The current invention introduces an energy capture system, comprising:
a. a flow deflection device (10)
b. an energy capture component functionally adjacent to the flow deflection device, (1)
c. a vertical structure to which the flow deflection device is attached. (7 or 8)

115. The current invention reveals an embodiment of said system 114, further comprising:
c. a positioning device attached to the flow deflection device and vertical structure, said positioning device operative to move the flow deflection device on the vertical structure.

116. The current invention reveals an embodiment of said system 114, wherein the flow deflection device is a ramp.

117. The current invention reveals an embodiment of said system 116, wherein the vertical structure fits into a central hole in the ramp. (FIGS. 30, 31, 32) 118. The current invention introduces a wave farm system, comprising: (FIGS. 32, 42)
a. at least two vertical structures,
b. at least one ramp attached to each said vertical structure, wherein the edges of the uppermost ramp of each vertical structure are substantially contiguous to the edges of the uppermost ramp of the adjacent vertical structures, and so on for the next to uppermost ramp.

119. The current invention introduces a wave farm system, comprising: (FIGS. 30, 31, 32)
a. at least two piles
b. a flow deflection structure attached around at least two of the farm of piles 120. The current invention introduces a wave farm, comprising:
a. At least one unipile,
b. A ramp (140, 146)
c. A water collection area at the top of the ramp operative to direct the water downwards into at least one turbine. (144, 148)

121. The current invention introduces a system for controlling wave flows, comprising:
a. at least one superior platform, (165, 167, 169)
b. an energy capture device superior and functionally adjacent to each said platform. (171)

122. The current invention reveals an embodiment of said system 121, further comprising:
c. at least another platform inferior to each said first platform. (166, 168, 170)

123. The current invention reveals an embodiment of said system 121, wherein each said platform is rectangular.

124. The current invention reveals an embodiment of said system 121, further comprising:
d. extensions (174) to the said platform (172) attached by hinges (173) on at least one side.

125. The current invention reveals an embodiment of said system 121, further comprising:
d. a vertical structure attached to each said platform and each said energy capture device. (163)

126. The current invention reveals an embodiment of said system 121, wherein at least the first said superior platform in a farm slopes upwards obtusely to the direction of wave flow. (164)

127. The current invention introduces a system for controlling wave flows, comprising:
a. two rectangular platforms, one superior (165) and one inferior (166), at an obtuse angle to the oncoming flow, with the leading edges of the platforms adjacent to each other, (164)
b. at least one energy capture device (171) superior to and functionally adjacent to the superior platform.

128. The current invention introduces a system for controlling wave flows, comprising:
a. an energy capture device,
b. a microprocessor controller,
c. a platform inferior to the energy capture device and controlled by said controller, said platform operative to remain at a point less than or equal to the ratio of the height of the wave to the length of the wave of 1/7. (169, FIG. 38, 147)

129. The current invention introduces a system for controlling wave flows, comprising:
a. an energy capture device,
b. a platform inferior to the energy capture device and placed at a point less than or equal to the ratio of the height of the wave to the length of the wave of 1/7 for at least 0.01% of waves in that location. (169, FIG. 38, 147)

130. The current invention introduces a device for capturing wave energy adjacent to the floor of the fluid, comprising:
a. at least one paddle with a substantially vertical flat surface, said paddle operative to move substantially horizontally, (104)
b. a generator, operative to create electricity from the movement of the paddle. (103, 14)

131. The current invention reveals an embodiment of said device 131, wherein the floor of the fluid is formed by an artificial platform-like structure. (102)

132. The current invention reveals an embodiment of said device 130, wherein the depth of the fluid is approximately 1/20 or less of the wavelength. (FIG. 38)

133. The current invention reveals an embodiment of said device 131, further comprising:
c. a controller (13), operative to control the depth of the platform-like structure to approximately 1/20 or less of the wavelength, at the point of substantially horizontal waves that move back and forth within the vertical height of said paddle. (FIG. 38)

134. The current invention introduces a subsurface energy capture device, comprising: (FIG. 40)
a. a paddle wheel, weighted so that its superior paddle is no more than 50 centimeters above the fluid surface at all points of the wave,
b. a generator, operating from the spinning of the paddle wheel.

135. The current invention reveals an embodiment of said device 134, wherein the diameter of the paddle wheel is less than the amplitude of the wave.

136. The current invention introduces a system for the capture of energy, the system comprising: (14)
a. a substantially y-axis first supporting structure, (59)
b. a first y-axis rod inserted into said first supporting structure, (60)
c. a first energy capture device (inside 59 in this picture) that operates to generate elctricity from y-axis motion of the rod, said first energy capture device connected to said first rod and first supporting structure,
d. a non-parallel second structure, fixedly connected to said first rod, (62, 61)
e. Said second structure translates vertical motion to said first rod.

137. The current invention reveals an embodiment of said system 136, further comprising:
f. A second energy capture device (61) including a generator (62) attached to the second supporting structure, said second energy capture device capturing energy in a non-parallel direction to the first energy capture device.

138. The current invention reveals an embodiment of said system 136, wherein the second energy capture device is a paddle wheel.

139. The current invention reveals an embodiment of said system 136, wherein the input is a temporally varying flow field.

140. The current invention reveals an embodiment of said system 136, wherein the y-axis supporting structure is positioned relative to the earth surface.

141. The current invention reveals an embodiment of said system 136, wherein the y-axis supporting structure is positioned relative to the sea floor.

142. The current invention reveals an embodiment of said system 136, wherein the first and second supporting structures are substantially perpendicular.

143. The current invention reveals an embodiment of said system 136, wherein the x-axis bar is rotatable on its own axis.

144. The current invention reveals an embodiment of said system 136, wherein the y-axis bar is rotatable on its own axis.

145. The current invention reveals an embodiment of said system 136, wherein the x-axis supporting structure is rotatable on its own axis.

146. The current invention reveals an embodiment of said system 136, wherein the y-axis supporting structure is rotatable on its own axis.

147. The current invention reveals an embodiment of said system 136, wherein said system is inserted into a substantially fluid environment.

148. The current invention reveals an embodiment of said system 136, wherein said second energy capture device floats on the surface of a fluid.

149. The current invention reveals an embodiment of said system 136, wherein the second rod connects paddle wheels on each side of the y-axis structure.

150. The current invention reveals an embodiment of said system 136, wherein the same number of paddle wheels are present on each side of the y-axis structure.

151. The current invention reveals an embodiment of said system 136, further comprising a catch means on the y-axis support and y-axis rod, whereby the y-axis movement of the y-axis rod is limited.

152. The current invention reveals an embodiment of said system 136, wherein the y-axis structures can tilt in a z-axis.

153. The current invention reveals an embodiment of said system 136, further comprising:
at least one flow deflection structure, drawn from the group of a wing-like structure, a ramp, or a combination of a ramp and wing-like structure, that is located underneath the lower surface of and in functional congruity to the second energy capture device. (120, 124)

154. The current invention reveals an embodiment of said system 136, further comprising:
a microprocessor and device attached to said system that controls the orientation of the said system and its components in x, y, and/or z axes. (13)

155. The current invention reveals an embodiment of said system 136, further comprising:
an attachment means (113) connecting the first y-axis supporting structure (112) to a second y-axis supporting structure. (110)

156. The current invention reveals an embodiment of said system 155, wherein the second y-axis supporting structure is attached to the bottom of a body of liquid. (110)

156. The current invention reveals an embodiment of said system 155, wherein the second y-axis supporting structure is attached to the bottom of a body of liquid. (110)

157. The system of claim 155, wherein said attachment means operates to move the first y-axis supporting structure vertically and/or horizontally.

158. The current invention introduces a polypile system for capturing energy in a body of water, comprising:
a. a first energy capture system, whose base is the highest in the system (112) (119)
b. a second energy capture system, whose top is lower than the first y-axis structure (121)
c. a first attachment mechanism, (113)
d. a second attachment mechanism,
e. a y-axis structure (115, 110), attached to the first energy capture system by the first attachment mechanism and attached to the second energy capture system by the second attachment mechanism.

159. The current invention reveals an embodiment of said system 158, wherein at least one of the energy capture devices is a paddle wheel device.

160. The current invention reveals an embodiment of said system 158, comprising at least a third energy capture device at a lower height than the second energy capture system.

161. The current invention reveals an embodiment of said system 158, wherein each said attachment mechanism is electronically controlled.

162. The current invention introduces a wave farm energy capture system, comprising:
a. at least two "unipile" systems with one unipile horizontal energy capture system spaced horizontally apart from the farthest horizontal extension of an adjacent unipile horizontal energy capture system of the same type. (FIGS. 26, 27, 28)

163. The current invention reveals an embodiment of said system 162, wherein the horizontal energy capture systems are adjustable in their orientation relative to the wave flow.

164. The current invention introduces a wave farm energy conversion system, comprising:
a. at least two unipiles,
b. a ramp system attached to the y-axis structure of each unipile.

165. The current invention reveals an embodiment of said system 164, wherein each ramp extends in a substantially horizontal axis at least to the substantially outermost horizontal points of the unipiles and their attachments.

166. The current invention introduces a system for preventing ice on the surface of the water surrounding a wave farm, comprising:
a. at least two substantially fixed surface structures (160), and surrounding at least one energy capture device, (162)
b. at least one heating structure, connected to each fixed surface structure and placed below and on the surface of the water. (161)

167. The current invention reveals an embodiment of said system 166, further comprising:
c. A physical barrier to ice formation, attached to the fixed surface structures. (163)

168. The current invention introduces a system for energy capture on a liquid surface, comprising:
a. an energy capture device connected to a generator, (151)
b. a flotation device (152) connected to the generator-energy capture device combination,
c. a microprocessor operative to control the flotation device. (13)

169. The current invention reveals an embodiment of said system 168, wherein the microprocessor is connected to sensors obtaining data drawn from the group of wave amplitude, device height in the water, wave speed, and wave direction.

170. The current invention reveals an embodiment of said system 169, wherein instructions are written onto the memory of the microprocessor that adjust the amount of flotation in accordance with input from the sensors.

171. The current invention reveals an embodiment of said system 168, wherein a paddle wheel system is the energy capture device.

172. The current invention reveals an embodiment of said system 171, wherein the flotation device elevates the paddle wheel system so that its point of rotation remains in the gas above the fluid surface.

173. The current invention introduces a system for the control of a wave energy capture system, comprising
a. a wave energy capture system,
b. a flow deflection device functionally adjacent to said wave energy capture system,
c. a microprocessor operative to sense and control the position of the flow deflection device. (13)

174. The current invention reveals an embodiment of said system 173, wherein the microprocessor's memory contains instructions operative to control the flow deflection device's position based on input of at least one of the group of distance from the surface, distance from the wave energy capture system, wave amplitude, wave speed, and angle in relation to the horizontal.

175. The current invention introduces a system for the orientation of devices to fluid motions, comprising:
a. a sensor system,
b. a microprocessor, connected to input from the sensor system,
c. an energy capture system,
d. A means, connecting to the energy capture system and to the microprocessor, for orienting the energy capture system to face the horizontal flow of the fluid. (13)

176. The current invention introduces a flow deflection device, comprising:
a. a platform, (69)
b. a vertical support (67) connected by attachment means to the platform,
c. a hole (68) in the middle of said platform, with said middle hole surrounding the vertical support.

177. The current invention reveals an embodiment of said device 176, wherein said hole is sufficiently large to enable tilting of the platform less than 90 degrees without impedance from the vertical structure and other attached structures and said attachment means are moveable.

178. The current invention reveals an embodiment of said device 176, wherein the said hole has an extension on one side sufficiently large to enable tilting of the platform in a direction without impedance from the vertical structure and other attached structures and said attachment means are moveable. (71)

179. The current invention introduces a system for the capture of energy from waves, comprising:
a. a vertical generating system (6,7), operative to generate energy from a substantially vertical movement of fluid, said system comprising a supporting structure, means to capture the energy, and means to convert it into electricity,
b. said means comprises an object floating on the waves and moving vertically,
c. a ramp inferior to and functionally adjacent to said means. (10)

180. The current invention reveals an embodiment of said system 179, further comprising:
d. said ramp is less than 1/20 the wavelength of the wave from the surface
e. a generating system located immediately superior to the ramp, said system possessing at least one paddle wheel. (14)

181. The current invention introduces a system for capturing energy, comprising:
a. An energy capture device capturing energy from x-axis motion,
b. At least a second energy capture device capturing energy from y-axis motion,
c. A connection between the first and second devices that translates motion of the first device to the second.

182. The current invention reveals an embodiment of said system 181, wherein the source of energy is waves.

183. The current invention introduces a system for capturing energy, comprising at least two connected energy capture devices that move in at least two separate directions simultaneously with a connection between the first and second devices that translates motion from the first device to the second.

184. The current invention introduces a generator system for the capture of energy, comprising:
a. A system for the capture of substantially horizontal movement,
b. A system for the capture of substantially vertical movement,
c. A connection between the first and second systems that translates motion from the first device to the second.

185. The current invention introduces a system for the capture of energy, comprising:
a. A system for the capture of substantially linear movement,
b. A system for the capture of substantially rotational movement,
c. A connection between the first and second devices that translates motion from one system to the other.

186. The current invention introduces a system of power generation, comprising:
a. an energy capture device in a liquid,
b. a flow deflection device in functional contiguity to the energy capture device.

187. The current invention introduces a method of maintaining an energy capture device on the surface of a wave, comprising: (FIG. 38)
a. placing an energy capture device with at least one paddle in the liquid,
b. orienting said device towards the fluid flow,
c. floating said device in the liquid with flotation means so that the lowest point of the energy capture is located superior to the halfway point of the wave's amplitude and the majority of each paddle is below the surface.

188. The current invention introduces a method of installing the appropriate height of the piston component of a uni-pile, comprising:
a. collecting data for wave amplitude and ocean depth in a specific location,
b. determining the height of the piston component so that the fully extended height of the piston component is greater than or equal to the amplitude of 95% of the waves in that location.

189. The current invention introduces a method of obtaining maximum energy from an energy capture device in the water, comprising:
a. setting an energy capture device in the water functionally adjacent to a flow deflection device in the location of the fastest flow of kinetic energy.

190. The current invention introduces a method of controlling waves in a wave farm, comprising:
a. setting the height of a ramp in a wave energy device or farm in relation to the wave amplitude to prevent breaking of the wave in accordance with the formula for waves breaking at height/wavelength being greater than or equal to 1/7.

191. The current invention introduces a method of increasing the amplitude of waves in a wave farm, comprising:
a. setting the depth of a ramp from the surface at its highest point in a wave energy system or farm to less than the amplitude of the waves.

192. The current invention introduces a method of placing multiple structures on a vertical structure in a wave farm, comprising:
a. determining the vertical spacing of energy capture devices on vertical structures placed in the water according to parameters chosen from the group of real-time water conditions such as wave speed, wave wavelength, and wave height; wind speed; and typical diurnal and seasonal data on water conditions, wind speed, and wave amplitude.

193. The current invention introduces a method of increasing energy capture from a flow of energy, comprising:
a. locating a flow deflection structure in functional contiguity to an energy capture device,
b. powering a generator with said flow.

194. The current invention reveals an embodiment of said method 193, wherein the flow is from a wave.

195. The current invention reveals an embodiment of said method 193, wherein the said energy capture device is in the water.

196. The current invention introduces a method of increasing power output from waves, comprising:
a. placing a paddle wheel with at least one paddle under the surface of the fluid,
b. collecting real-time data on wave amplitude in the area of the paddle wheel,
c. adjusting the paddle length to wave amplitude, wherein the diameter of the paddle structure is less than the amplitude of the wave.

197. The current invention introduces a method for the capture of energy from waves, comprising the steps of:
a. providing an energy capture component on or near the surface,
b. rotating the energy capture component from the horizontal and/or rotational movement of the waves,
c. rotating a rod attached to the energy capture component in a generator,
d. producing electricity in the generator and its housing,
e. moving a vertical structure, using the vertical motion of the system, consisting of the housing, generator, rod, and energy capture device, on the wave,
f. generating electricity in a second generator operating from the movement of the vertical structure.

198. The current invention reveals an embodiment of said method 197, wherein the energy capture component is a paddle wheel.

199. The current invention reveals an embodiment of said method 197, further comprising:
g. providing at least one flow deflection structure functionally adjacent to the first generating system on the surface.

200. The current invention reveals an embodiment of said method 197, further comprising:
h. providing at least one ramp inferior to the first generating system.

201. The current invention introduces a method of capturing energy from waves, comprising:
a. providing an energy capture device responsive to the horizontal/rotational movement of waves,
b. providing a sensor obtaining data on the direction of the waves,
c. orienting the direction of the energy capture device according to data on wave direction.

202. The current invention introduces a method of exposing a paddle on a paddle wheel, comprising:
a. constructing a paddle of flexible size,
b. weighting the external edge of the paddle,
c. attaching the paddle to a central cylinder,
d. retracting a paddle automatically when superior to the horizontal,
e. extending a paddle automatically when inferior to the horizontal.

203. The current invention introduces a method of obtaining energy from waves, comprising:
a. providing an energy capture device on or near the wave surface,
b. increasing the flow velocity with a flow deflection structure functionally adjacent to the energy capture device,
c. producing electricity from the energy capture device.

204. The current invention introduces a method for the generation of energy from waves, comprising
a. providing a vertical structure,
b. attaching a generator operating from its vertical movement,
c. attaching a separate energy capture device to the vertical structure on or adjacent to the surface,
d. producing electricity from the generator.

205. The current invention reveals an embodiment of said method 204, wherein the energy capture device is a paddle wheel.

206. The current invention introduces a method for the capture of energy from waves, comprising:
a. placing an energy capture device on or near the wave surface,
b. connecting the energy capture device to a rod,
c. providing a joint attaching to the energy capture device on one side and to the rod on the other side, said rod operative to move vertically at the joint,
d. attaching at least one generator system to the other side of said rod, operative to generate energy from the motion of the rod,
e. producing electricity from the generator.

207. The current invention introduces a method for the capture of wave energy, comprising:
a. placing at least one flow deflection device functionally adjacent to an energy capture device.

208. The current invention reveals an embodiment of said method 207, wherein the flow deflection device is a ramp.

209. The current invention reveals an embodiment of said method 207, wherein the energy capture device is a paddle wheel.

210. The current invention introduces a method of increasing paddle wheel torque from a flowing substance, comprising:
a. providing a paddle wheel in the flowing substance, wherein the paddle presents a convex face to and curves away from the oncoming flow from the paddle wheel center to at least mid-periphery of the paddle, and whose periphery has a piece facing the flow that is congruent with the center.

211. The current invention introduces a method of decreasing resistance on the return trip of a paddle wheel system, comprising:
a. providing a paddle on a rotating structure with means for the paddle to slip in and out from the force of gravity.

212. The current invention introduces a method of decreasing resistance on the return trip of a paddle wheel system connected to a generator, comprising:
a. shielding the paddles on their return trip.

213. The current invention introduces a method of maintaining an energy capture device at a desired depth relative to the surface of a fluid, comprising:
a. attaching a weight adjusting mechanism to the housing of the energy capture device.

214. The current invention introduces a method of maintaining an energy capture device at a desired depth relative to a wave, comprising:
a. attaching a weight adjusting mechanism to the housing of the energy capture device.

215. The current invention reveals an embodiment of said method 214, wherein the energy capture device is located within the wave.

216. The current invention introduces a method of adjusting a paddle wheel to capture the areas of greatest energy in a wave, comprising:
a. extending and withdrawing the paddles from a central housing for different sizes of waves.

217. The current invention reveals an embodiment of said method 216, further comprising:
b. providing a control system operative to increase the length of the extension for larger wave amplitudes and decrease it for smaller wave amplitudes.

218. The current invention introduces a method for adjusting the height of a wave energy capture system, comprising:
a. providing a vertical structure,
b. attaching an energy capture system to the vertical structure,
c. providing a means for adjusting the height of the energy capture system on the vertical structure.

219. The current invention introduces a method for creating a flow deflection structure functionally adjacent to an energy capture device in a fluid, comprising:
a. providing at least two platforms of similar size, one superior and one inferior, the platforms being either of one piece or of separate pieces,
b. adjusting the heights and/or angles of the platforms.

220. The current invention reveals an embodiment of said method 219, wherein the leading edge of the first platform is in substantial congruity with the leading edge of the second platform.

221. The current invention introduces a method of adjusting the position of a flow deflection device, comprising:
a. connecting electronically a flow deflection structure-positioning controller to a flow deflection device.

222. The current invention introduces a method of creating a flow deflection device in a fluid, comprising:
a. providing at least two flow deflection devices,
b. apposing at least one edge of said flow deflection devices.

223. The current invention introduces a method of increasing the energy captured by an energy capture device from the vertical motion of a wave that appears above the fluid surface, comprising:
a. placing a ramp-like flow deflection structure in the fluid at a depth less than the amplitude of the wave, said structure functionally adjacent to the energy capture device,
b. placing an energy capture device responsive to vertical motion superior to the flow deflection structure.

224. The current invention introduces a method for increasing vertical wave flows to energy capture devices, comprising:
a. providing an object on the surface connected to a vertical energy capture device,
b. providing a microprocessor controller,
c. placing a platform inferior to the energy capture device and controlled by said controller, said platform adjusted to a point less than or equal to the ratio of 1/7 of the height of the wave to the length of the wave,
d. converting the vertical wave movement into electricity.

225. The current invention reveals an embodiment of said method 224, wherein said platform is placed at a point less than or equal to the ratio of 1/7 of the height of the wave to the length of the wave for at least 0.01% of waves in that location.

226. The current invention introduces a method for capturing wave energy in shallow fluid adjacent to the floor of the fluid, comprising:
a. placing at least one paddle with a substantially vertical flat surface, said paddle operative to move substantially horizontally,
b. connecting the paddle to a generator, operative to create electricity from the movement of the paddle,
c. moving the paddle from the waves in a back and forth direction.

227. The current invention reveals an embodiment of said method 226, further comprising:
d. placing a platform-like structure underneath the surface of the fluid.

229. The current invention reveals an embodiment of said method 228, further comprising:
e. connecting a controller, operative to control the depth of the platform to approximately 1/20 or less of the wavelength, to the platform.

230. The current invention reveals an embodiment of said method 228, wherein the depth is approximately 1/20 or less of the wavelength of the wave.

231. The current invention introduces a method for turning wave energy into electricity, comprising:
a. placing a subsurface paddle wheel, weighted so that its superior paddle is substantially below the fluid surface at all points of the wave, in the fluid.
b. connecting said paddle wheel to a generator.

232. The current invention reveals an embodiment of said method 231, wherein the diameter of the paddle wheel is less than the height of the wave.

233. The method of making a wave farm, comprising:
a. securing a vertical structure to stay substantially vertical in a fluid,
b. attaching at least two separate wave energy capture systems at different heights to the same vertical structure so that the two systems do not interfere with each other.

234. The method of claim 233, wherein the location of each said attached system is electrically controlled.

235. The current invention introduces a method of creating a flow deflection structure in a fluid, comprising:
a. placing adjacent substantially rectangular ramps functionally contiguous to each other's edges.

236. The current invention introduces a method for preventing the formation of ice on water surface turbines, comprising:
a. attaching the turbine to a vertical surface,
b. submerging the turbine below the ice level.

237. The current invention introduces a method for preventing ice for forming on water surface turbines, comprising:
a. surrounding the turbines with a barrier on the surface,
b. providing at least one heating structure on the inside of the barrier,
c. sweeping the turbine structures on the surface of the water.

238. The current invention introduces a method for positioning an energy capture device on a liquid surface, comprising:
a. connecting an energy capture device to a generator,
b. connecting a flotation device to the generator-energy capture device combination,
c. connecting a microprocessor to the flotation device, d. connecting the microprocessor to sensors obtaining data from wave conditions such as those drawn from the group of wave amplitude, device height in the water, wave speed, wave length, and wave direction,
e. writing instructions onto the memory of the microprocessor that adjust the amount of flotation in accordance with input from the sensors.

239. The current invention reveals an embodiment of said method 238, wherein a paddle wheel system is the energy capture device.

240. The current invention reveals an embodiment of said method 238, wherein the flotation device elevates the paddle wheel system so that its point of rotation remains in the gas above the fluid surface.

241. The current invention introduces a method for increasing the energy captured by a wave energy capture system, comprising:
a. placing a flow deflection device functionally adjacent to a wave energy capture system,
b. connecting to the device a microprocessor operative to sense and control the position of the flow deflection device,
c. moving the flow deflection device in accordance with data from the microprocessor.

242. The current invention reveals an embodiment of said method 241, wherein the microprocessor's memory contains instructions operative to control the flow deflection device's position based on input of at least one of the group of distance from the surface, distance from the wave energy capture system, wave amplitude, wave speed, wave length, and angle in relation to the horizontal.

243. The current invention introduces a method for the orientation of energy capture devices to fluid motions, comprising:
a. providing a sensor system in the fluid to sense the flow direction,
b. connecting a microprocessor to input from the sensor system,
c. connecting said microprocessor to an energy capture system,
d. orienting the energy capture system through the microprocessor to face the horizontal flow of the fluid.

244. The current invention introduces a method for capturing energy, comprising:
a. directing a first energy capture device for wave energy at the surface at a horizontal axis,
b. directing a second energy capture device at a vertical axis,
c. connecting the first and second devices operative to translate vertical motion from the first device to the second.

245. The current invention introduces a method of power generation, comprising:
a. placing an energy capture device in a liquid,
b. placing a flow deflection device in functional contiguity to the energy capture device,
c. producing increased electricity from the increased flow.

246. The current invention introduces a method for capturing energy, comprising:
a. placing an energy capture device directed at an axis substantially planar to the energy source.
b. placing at least a second energy capture device simultaneously moving substantially perpendicular to the surface plane of the energy source.
c. translating motion from a connection between the first and second devices to the second.
d. creating electricity from said translated motion.

247. The current invention introduces a method for the capture of energy, comprising a. providing a system for the capture of substantially horizontal movement,
b. providing a system for the capture of substantially vertical movement,
c. connecting the first and second systems to translate motion from the first device to the second,
d. creating electricity from the motion of the second device.

248. The current invention introduces a method for the capture of energy, comprising:
a. providing a system for the capture of substantially linear movement,
b. providing a system for the capture of substantially rotational movement,
c. connecting the first and second devices to translate motion from the first system to the other,
d. creating electricity from the motion of the second system.

249. The current invention introduces a method of extracting energy from a substance with a rotational energy pattern, comprising:
a. Capturing the energy in one direction with a first device,
b. Capturing the energy in a substantially perpendicular direction with another device.

250. The current invention reveals an embodiment of said method 249, wherein the energy in captured in both directions simultaneously.

251. The current invention introduces a method of increasing the flow of energy into a paddle wheel, comprising:
a. setting the angle between the flow and the vane at 40-60 degrees.

What is claimed is:

1. An energy capture system for transforming wave energy of a body of water into harnessable mechanical energy comprising:
   a. a flotation device including a rotatably mounted rod having at least one paddle wheel or propeller at least partially submerged beneath a surface of the body of water such that flowing water impinging on said paddle wheel imparts harnessable rotational-mechanical-energy motion to said rod;
   b. a substantially vertical, support shaft anchored underneath the body of water, said flotation device being slidingly connected with said support shaft so as to ascend and descend along said support shaft as the height of a wave carrying said flotation device varies;
   c. a linkage arrangement connected with said flotation device for transforming vertical motion of said flotation device into harnessable, linear-mechanical-energy.

2. The system of claim 1, further comprising:
   d. at least one flow deflection structure placed in proximity to said paddle wheel or said propeller of said flotation device, said flow deflection structure having a slight convex upper surface so as to accelerate a flow of water deflected by said upper surface prior to impinging on said paddle wheel or said propeller.

3. The system of claim 2, wherein the flow deflection structure is connected to said energy capture system.

4. The system of claim 2, wherein said flow deflection structure is connected to said support shaft.

5. The energy capture system of claim 1, wherein said linkage arrangement is implemented as said rotably mounted rod.

6. The energy capture system of claim 1, wherein said linkage arrangement protrudes from said flotation device.

7. The energy capture system of claim 1, wherein said linkage arrangement includes a universal joint.

8. The energy capture system of claim 1, further comprising at least one platform, defined as a substantially planar structure on its superior aspect, inferior to the rotational turbine, and attached to the support shaft.

9. The energy capture system of claim 8 further comprising at least a second platform, substantially parallel to the direction of fluid flow in the x-axis and inferior to the first platform.

10. The energy capture system of claim 9, further comprising at least a second, adjacent system of claim 9.

11. The energy capture system of claim 8 further comprising a microprocessor controller, operative to adjust said at least one platform to a depth below the level of causing breaking of the majority of the waves at the location of the rotational turbine and close enough to the surface to be functionally adjacent to the rotational turbine (or blades).

12. The energy capture system of claim 11, wherein the microprocessor controls the platform movement in accordance with input of at least one of the group of distance from the surface, distance from the wave energy capture system, wave amplitude, wave speed, wave direction, wave length, and angle of the ramp in relation to the horizontal.

13. The energy capture system of claim 1, further comprising a depth-adjusting device attached to the flotation device, operative to adjust the depth to which the rotational device sits in the water.

14. The energy capture system of claim 1, wherein the paddle contains a means for mechanical extension and retraction.

15. A method of transforming wave energy of a body of water into harnessable mechanical-energy comprising:
  (a) causing at least one paddle wheel or a propeller connected with a rod mounted in a flotation device to be at least partially submerged in the body of water so that flowing water of the body impinging on said paddle wheel or said propeller imparts harnessable rotational-mechanical-energy to said rod; and
  (b) moving a linkage arrangement connected with said flotation device vertically in accordance with changes in height of a wave in the body of water carrying said flotation device so as to provide harnessable, linear-mechanical-energy.

16. The method of claim 15 further comprising a step of accelerating the flowing water prior to impinging on said paddle wheel or said propeller as the flowing water is deflected by a slightly convex upper surface of a flow deflection structure disposed in proximity to said paddle wheel or said propeller.

* * * * *